US008863497B1

(12) United States Patent
Legare

(10) Patent No.: US 8,863,497 B1
(45) Date of Patent: *Oct. 21, 2014

(54) CONTROL METHODS FOR IMPROVED CATALYTIC CONVERTER EFFICIENCY AND DIAGNOSIS

(76) Inventor: Joseph E. Legare, Southfield, MI (US)

(*) Notice: Subject to any disclaimer, the term of this patent is extended or adjusted under 35 U.S.C. 154(b) by 569 days.

This patent is subject to a terminal disclaimer.

(21) Appl. No.: 13/026,321

(22) Filed: Feb. 14, 2011

Related U.S. Application Data

(60) Division of application No. 10/657,188, filed on Sep. 9, 2003, now Pat. No. 7,886,523, which is a continuation-in-part of application No. 09/722,273, filed on Nov. 28, 2000, now Pat. No. 6,651,422, which is a continuation of application No. 09/379,357, filed on Aug. 23, 1999, now abandoned.

(60) Provisional application No. 60/097,557, filed on Aug. 24, 1998.

(51) Int. Cl.
F01N 3/00 (2006.01)

(52) U.S. Cl.
USPC ............ 60/274; 60/286; 60/295; 60/324

(58) Field of Classification Search
USPC .................... 60/286, 295, 324, 274
See application file for complete search history.

(56) References Cited

U.S. PATENT DOCUMENTS

| 3,785,151 | A | | 1/1974 | Holl ............................. 60/277 |
| 4,736,725 | A | * | 4/1988 | Iwaki et al. ................. 123/480 |
| 5,211,011 | A | | 5/1993 | Nishikawa et al. |
| 5,230,320 | A | * | 7/1993 | Hitomi et al. ............. 123/559.1 |
| 5,289,678 | A | | 3/1994 | Grutter |
| 5,339,628 | A | | 8/1994 | Maus et al. |
| 5,355,671 | A | | 10/1994 | Maus et al. |
| 5,357,928 | A | | 10/1994 | Ohtsuka |
| 5,385,016 | A | | 1/1995 | Zimlich et al. ................. 60/274 |
| 5,414,994 | A | | 5/1995 | Cullen et al. |
| 5,428,956 | A | | 7/1995 | Maus et al. |
| 5,435,172 | A | | 7/1995 | Pelters et al. |
| 5,497,617 | A | | 3/1996 | Bagley et al. |
| 5,591,905 | A | | 1/1997 | Fujimoto et al. ............ 73/118.1 |
| 5,592,815 | A | | 1/1997 | Jelden et al. |
| 5,600,948 | A | | 2/1997 | Nakajima et al. |

(Continued)

FOREIGN PATENT DOCUMENTS

| JP | 04-308311 | 10/1992 |
| JP | 09-088663 | 3/1997 |

OTHER PUBLICATIONS

Se H. Oh, "Thermal Response of Monolithic Catalytic Converters During Sustained Engine Misfiring: A Computational Study", SAE, 1988.

(Continued)

Primary Examiner — Kenneth Bomberg
Assistant Examiner — Brandon Lee
(74) Attorney, Agent, or Firm — Wolff Law Offices, PLLC; Kevin Alan Wolff

(57) ABSTRACT

A controlling method for adjusting concentrations of, for example, individual cylinder's exhaust gas constituents to provide engine functions such as catalytic converter diagnosis, increased overall catalytic converter efficiency and rapid catalyst heating, before and/or after initiating closed loop fuel injection control, using a selected temperature sensor location within a low thermal mass catalytic converter design.

20 Claims, 8 Drawing Sheets

(56) References Cited

U.S. PATENT DOCUMENTS

| | | | |
|---|---|---|---|
| 5,606,959 A | 3/1997 | Maki et al. | 123/673 |
| 5,610,844 A | 3/1997 | Maus et al. | 700/274 |
| 5,626,014 A | 5/1997 | Hepburn et al. | |
| 5,630,315 A | 5/1997 | Theis | |
| 5,649,420 A | 7/1997 | Mukaihira et al. | |
| 5,657,625 A | 8/1997 | Koga et al. | |
| 5,661,971 A | 9/1997 | Waschatz et al. | 60/247 |
| 5,675,967 A | 10/1997 | Ries-Mueller | |
| 5,706,652 A | 1/1998 | Sultan | |
| 5,715,676 A | 2/1998 | Schnaibel et al. | 60/274 |
| 5,727,383 A | 3/1998 | Yamashita et al. | 60/276 |
| 5,732,549 A | 3/1998 | Treinies et al. | |
| 5,842,340 A | 12/1998 | Bush et al. | 60/274 |
| 5,845,492 A | 12/1998 | Isobe et al. | 60/284 |
| 5,896,743 A | 4/1999 | Griffin | |
| 5,945,597 A | 8/1999 | Poublon et al. | |
| 5,974,790 A | 11/1999 | Adamczyk et al. | |
| 5,974,793 A | 11/1999 | Kinugasa et al. | |
| 5,983,627 A | 11/1999 | Asik | |
| 6,014,859 A | 1/2000 | Yoshizaki et al. | |
| 6,148,808 A | 11/2000 | Kainz | 123/673 |
| 6,202,406 B1 | 3/2001 | Griffin et al. | 60/274 |
| 7,886,523 B1 * | 2/2011 | Legare | 60/285 |

OTHER PUBLICATIONS

Clifford D. Tyree. "Emission Levels and Catalyst Temperatures as a Function of Ignition-Induced Misfire", U.S. Environmental Protection Agency.

T. Ma, N. Collings, T. Hands, "Exhaust Gas Ignition (EGI)—A New Concept for Rapid Light-Off of Automotive Exhaust Catalyst".

Wei Cai and Nick Collings, "A Catalytic Oxidation Sensor for the on Board Detection of Misfire and Catalyst Efficiency".

Collings, Cai, Ma, and Ball, "A Linear Catalyst Temperature Sensor for Exhaust Gas Ignition (EGI) and on Board Diagnostics of Misfire and Catalyst Efficiency".

O'Sullivan and Will, "The Effect of Intermittent Engine Misfire and Air to Fuel Ratio Excursion on Exhaust Catalyst Temperature".

Legare and Tamai, "High Temperature Measurements for On-Board Diagnostics of LEV/ULEV Systems", SAE Technical Paper Series, Oct. 17, 1994.

Kato, Ikoma, and Nishikawa, "Exhaust Gas Temperature Sensor for OBD-II Catalyst Monitoring", SAE, pp. 129-135, 1996.

Eade, Hurley, Rutter, Inman and Bakshi, "Fast Light-Off of Underbody Catalyst Using Exhaust Gas Ignition (EGI)", SAE, pp. 127-133, 1995.

Hepburn and Meitzler, "Calculating the Rate of Exothermic Energy Release for Catalytic Converter Efficiency Monitoring", SAE, pp. 189-206, 1995.

* cited by examiner

CONTROL METHODS FOR IMPROVED CATALYTIC CONVERTER EFFICIENCY AND DIAGNOSIS

RELATED APPLICATIONS

This application claims priority to each of the following related applications and is a divisional of U.S. patent application Ser. No. 10/657,188, filed on Sep. 9, 2003, now U.S. Pat. No. 7,886,523 which is a continuation-in-part of U.S. patent application Ser. No. 09/722,273, filed on Nov. 28, 2000, now U.S. Pat. No. 6,651,422 which is a continuation of U.S. patent application Ser. No. 09/379,357, filed on Aug. 23, 1999, and which claims benefit of U.S. provisional patent application Ser. No. 60/097,557, filed on Aug. 24, 1998. Each of the aforementioned prior applications is hereby incorporated by reference for all purposes.

BACKGROUND

1. Field of Invention

The present invention relates to catalytic conversion of exhaust gases for internal combustion engines, and more particularly to improved diagnosis and efficiency performance characteristics of catalytic converters using various control systems and methods.

2. The Related Art

Various new techniques are being developed for reducing total vehicle exhaust emissions over an automobile's lifetime. An emerging field of invention pertains to the sensing and control of an engine's individual cylinders' for improving synergies with catalytic converter operation to minimize toxic air pollutants entering the atmosphere. Previously, most approaches focused on controlling the aggregate of exhaust gases or total output from all engine cylinders, such as the typical application of using one oxygen sensor to provide closed loop fuel control feedback for multiple cylinders. Using the aggregated engine emissions reduction approach requires greater system costs due to increases in catalyst size or precious metal loading or necessitates adding additional hardware, such as external systems for exhaust gas recirculation or secondary air injection, for realizing further reductions in automobile tailpipe pollutants. This aggregate technique becomes increasingly expensive, as regulated automobile air pollutant levels are approaching a zero emissions level, while mandated vehicle emission system warranty lifetime periods are being greatly increased. These two contradictory requirements of reducing engine emissions towards zero over longer warranted lifetimes have thus necessitated significantly improved on-board vehicle diagnostics methods, particularly for catalysts and catalytic converters. As the mandated warranted life of an automobile increased towards equivalent periods reaching between 10 and 20 years, the importance of onboard diagnostics has become critical for minimizing air pollution emitted over an automobile's useful lifetime. Both diagnostics and the rapid heating of an automobile's catalytic converter immediately following cold engine starts have become very important techniques for reducing the total pollutants generated by an internal combustion engine.

An emerging field of invention is focused on increased synergy between engine and catalytic converter operation. Increased synergy is provided by controlling all conditions of individual engine cylinder's output gases plus how these conditions can aid the catalyst in reducing total air pollutants. Adopting such a synergistic approach allows smaller catalytic converters, using reduced precious metals, mounted closer to the engine's cylinders for providing quicker catalyst heating after cold starts. Rapid catalyst heating is one important area since a major portion of total vehicle emission of toxic pollutants can be produced during the first few minutes when the engine is cold. Many of the recent reductions in air pollutants, from newer automobiles, are occurring by more quickly heating a catalytic converter and thereby converting pollutants into non-toxic gases sooner after engine starting. However, these improvements in engine control and catalyst synergy, such as early catalyst heating technology, also results in the overall reductions of toxic air pollutant now becoming more dependent on an automobile's catalytic converter. Early catalyst heating further increases the dependency on the catalytic converter since most air pollution is created during the first 60 seconds following cold engine starts.

High pollution levels, after engine cold starts, result because most catalyst surfaces must reach temperatures above 100° C. before becoming activated and allowing conversion of toxic exhaust gases into non-toxic forms. Therefore reducing time delays before a catalyst's surfaces reach temperatures allowing exothermic chemical activity further increases the dependency on proper catalytic converter operation for total emission reductions. Since more than 50 percent of total air pollutants can occur while the catalyst is too cold a typical approach has been to reduce the time the catalyst remains below chemical activation temperatures. However, this also increases dependency on the catalytic converter as the primary source of pollutant reductions when total amount of air pollutants eliminated by the catalyst increases. So now, in the event of catalytic converter deterioration, even more air pollutants are allowed into the atmosphere unless an accurate, cost effective catalyst diagnosis technique is available. These factors have increased the importance of more accurate, continuous diagnosis of the catalytic converter's pollution reduction performance to be allied with synergistic engine systems aiding improved overall catalyst performance. Improving the accuracy of onboard vehicle diagnostics provides added confidence that an automobile's tailpipe pollutants remain only slightly changed during the vehicles lifetime. It is especially advantageous to invent engine control techniques to further reduce overall toxic air pollutants exiting the catalyst while also being readily integrated with catalyst diagnostic systems, yet adding minimum engine hardware.

A number of techniques have been disclosed that use modifications of engine control software algorithms for providing early catalyst heating following a cold start. However, most of these techniques are possible only after the closed loop engine control system can be activated. As is known to one skilled in the art, an engine typically operates rich during the open loop fuel control period prior to closed loop engine control being enabled. As a result, shortly after engine cold starts, a zirconia, switching type oxygen sensor is usually inactive or saturated in the rich state beyond the sensor's range of stoichiometric detection and thus prevents feedback for individual cylinder fuel control by methods taught previously. Delaying catalyst heating, necessitated by the activation of the closed loop fuel system, allows additional pollutants to be exhausted from an automobile's tailpipe. Examples of some methods requiring the activation of the oxygen sensor and closed loop fuel control system for allowing catalyst heating include U.S. Pat. Nos. 5,974,785, 5,462,039, 5,661, 971, 6,202,406 and 5,974,790.

Activating catalyst heating during the period of open loop fuel control operation, prior to enabling cold loop fuel control, is particularly advantageous in reducing tailpipe emissions. This is because more than half of total vehicle pollutants can be generated during the first minute of cold engine operation. However, all the earlier teachings of catalyst heating techniques solely dependent on an oxygen sensor to provide air-fuel ratio cycling are therefore unable to operate during open loop fuel control while the cold engine runs rich for stabilizing operation and preventing stalls. In addition, the magnitudes of catalyst heating possible are typically limited in these prior teachings since they are dependent upon closed loop fuel control operation where fuel cycling perturbations beyond 10% may lead to engine control stability concerns. These stability issues result because a typical switching type zirconia oxygen sensor can only detect gas characteristics within a few tenths of one air-fuel ratio around the stoichiometric control point. Outside this narrow stoichiometric range, a switching type oxygen sensor can only resolve rich or lean characteristics. Operation outside this narrow range leads to control feedback gain instability because the switching oxygen sensor can no longer differentiate actual air-fuel ratio errors using the methods taught previously. U.S. Pat. Nos. 5,675,967 and 6,202,406 require the oxygen sensor to provide output, indicating operation near stoichiometric, and this is typically unavailable in systems disclosed in previously using switching type oxygen sensors during rich engine operating conditions.

It is particularly beneficial to be able to heat the catalyst as early as possible following cold engine starting without adding costly engine hardware. Providing techniques having simple and reliable diagnostic methods are also advantageous for assuring proper system operation for minimizing air pollution. A number of techniques have been disclosed in various patents for improving catalyst heating. However, all the related rapid heating techniques disclosed in prior patents, such as U.S. Pat. Nos. 5,974,790, 5,974,785, 5,661,971, 5,600,948, 5,462,039, 5,357,928, fail to teach methods of early catalyst heating during the time period preceding engine closed loop fuel control activation. Further, heating methods dependent on closed loop fuel control become increasingly ineffective as lower thermal mass catalysts are moved closer to the engine exhaust manifold. These low thermal mass catalysts become chemically active within the first 30 seconds of engine cold starting while closed loop fuel control may still be disabled. All the aforementioned references are dependant upon waiting until closed loop fuel control is activated and are thus nonfunctional during the critical time period when an inactive oxygen sensor may allow only open loop fuel control operation. Each of these teachings also fail to disclose how control of each individual cylinders' exhaust gases is accomplished since they depend upon aggregate control of air-fuel ratios from a common oxygen sensor, and thus only during closed loop fuel control engine operation. There is no synchronization of the exhaust gases' measurements for each individual cylinder with corresponding control air-fuel ratio levels from these same cylinders, such as by correlation with the oxygen sensor's output, disclosed in these previous teachings to eliminate detrimental factors such as control system feedback time delays. Some of the previous techniques disclosed also require modifications or addition of new engine hardware to provide early catalyst heating, such as requiring an in-cylinder fuel injection system required in Kaneko's U.S. Pat. No. 6,041,591. While such added hardware provides additional benefits for the methods disclosed herein, such as extending lean limits of operation, they also require use of a more costly in-cylinder fuel injection systems.

Some methods to detect individual cylinder air-fuel ratio variations due to manufacturing tolerances and component degradation have been disclosed in teachings such as U.S. Pat. No. 6,148,808. These teachings require the use of a more costly wide range linear oxygen sensor to synchronize sampling of sensor output with the correct engine cylinders in order to adjust individual cylinder's exhaust gas errors closer to stoichiometric conditions for improving catalyst efficiency. U.S. Pat. No. 6,148,808 also proposes an alternate method of using a switching oxygen sensor by a method of successively indexing an estimated individual cylinder fuel correction and then detecting minimum A/F variations at the oxygen sensor. This method is disadvantaged by potentially long indexing periods before estimated individual cylinder fuel corrections are properly indexed with the correct cylinder and also sensitivity to unexpected A/F variations that can occur during normal engine operation. The focus of these teachings is to improve catalytic converter performance during steady state engine operation by reducing individual cylinder fuel injection quantity variations.

Some methods disclose modifications in engine fuel and spark ignition timing control to rapidly heat the catalytic converter shortly after a cold engine start. Typically, these approaches use significant ignition timing retard until closed loop fuel activation allows cycling between rich and lean exhaust conditions at the catalyst. Such methods provide limited improvements in catalyst exothermic heating because of waiting too long after cold starting and are primarily dependent upon enabling closed loop control thus limiting increases in rates of heating. In addition, dependence of these methods on closed loop control activation using switching type oxygen sensor feedback results in limited magnitudes of fuel changes due to both stability concerns and of causing increased pollutants if the catalyst hasn't reached sufficient temperatures. For example, increases in total air pollutants may result by activating the fuel control methods taught in U.S. Pat. No. 6,041,591 before the catalyst has reached temperatures sustaining exothermic chemical heating. More rapid heating using aggressive catalyst heating fuel control methods is allowed only during "active" catalyst conditions at temperatures above 400° C. to prevent the potential of increasing total air pollutants. Most catalyst heating is therefore provided by hotter engine exhaust gases caused by ignition retard, and results in increased fuel consumption.

Vehicle fuel economy can be improved by advancing ignition timing when using more effective, earlier enabled fuel control catalyst heating methods by actively detecting initiation of catalyst exothermic heating. Earlier enabling of fuel control changes for catalyst heating, as disclosed in this invention, provides significantly greater rates of heating than ignition retard without the undesired loss in fuel economy. Prior teachings disclosing methods using more aggressive fuel control changes to increase catalyst heating rates such a U.S. Pat. No. 6,041,591 can inject almost raw fuel into the catalyst. Such methods fail to detect initiation of catalyst exothermic heating and therefore can only be used when catalyst temperatures are above 400° C. to prevent the potential of higher air pollutants. Therefore these methods must wait too long after a cold start since they are disabled until reaching an estimated light-off catalyst temperature that can change significantly over operational lifetime. Otherwise, these catalyst heating methods may cause significantly increased air pollutants in the event that catalyst hasn't reached temperatures sustaining chemical exothermic heating. Previously disclosed methods of catalyst heating such as U.S. Pat. Nos. 5,249,560, 6,202,406 and 5,845,492 also wait too long before providing increased heating after a cold engine start. These methods use either too limited or more aggressive engine control techniques, such as disabling fuel to some cylinders, which can also cause significant engine roughness. U.S. Pat. No. 6,202,406 discloses a method of early heating until reaching an estimated catalyst light-off temperature by using a rich A/F, but with no method of providing oxygen to the catalyst for rapid heating, after a cold engine start. Use of an estimated catalyst light-off temperature, as taught in U.S. Pat. No. 6,202,406, can result in significant delays before methods of exothermic catalyst heating are enabled due to the widely varying temperature range for initiation of a catalyst's exothermic heating over operational lifetime. This method also waits too long for effective rapid early catalyst heating under some conditions by using only a static temperature threshold for enabling heating to approximate a widely varying range of light-off catalyst temperatures over a vehicle's lifetime. And U.S. Pat. No. 6,202,406 determining of catalyst light-off temperature based upon modeling data requiring A/F input dependency creates the potential of large diagnostic and fuel control errors when model data is inaccurate due to unanticipated operational conditions. These prior teachings fail to disclose methods of diagnosing catalytic converter performance and heating methods while the engine is operated under non-stoichiometric cold start conditions using a catalyst temperature sensor.

Other patents, for example U.S. Pat. Nos. 5,675,967, 5,715, 676 and 6,202,406, disclose methods of diagnosing catalytic converter performance at approximately the time when a catalyst first becomes chemically active, shortly after a cold engine start. These disclosures teach methods of detecting a catalyst's light-off by comparing detection algorithm determination conditions to oxygen sensor fluctuation data or from temperatures obtained from either catalyst temperature modeling algorithms or fixed predetermined estimates of anticipated light-off temperatures. Use of oxygen sensor fluctuations or an estimated catalyst light-off temperature, as taught in all these US patents, can result in significant delays. This is because there is no oxygen sensor fluctuation data during non-stoichiometric engine operation when a switching oxygen sensor is saturated, for example, after cold starting when rich operation causes the sensor to be at its rich limit. Use of an estimated catalyst light-off temperature from modeling algorithms, before enabling methods of exothermic catalyst heating, also delays early heating due to the widely varying temperature range for initiation of a catalyst's exothermic heating over operational lifetime. And there are no accurate temperature modeling algorithms that are able to predict the changing temperatures when exothermic heating first occurs as a catalyst deteriorates over time. Therefore these prior methods result in higher total air pollutants since they cannot account for the wide range of actual, non-static factors influencing this catalyst activation temperature, such as aging and when condensation occurs on close coupled catalyst active surfaces during some normal environmental operational conditions and delay activation. Engine control methods based upon use of static catalyst temperature thresholds don't account for constantly changing operational conditions such as the delayed initiation of catalyst exothermic heating, such as catalytic converters deteriorate over their useful lifetimes. These prior teachings typically use modeled data or static enabling thresholds in the methods disclosed, such as use of coolant or a fixed catalyst temperature that can change significantly over a vehicle's operational lifetime and delay more rapid catalyst heating or diagnosis. It remains impractical to model catalyst temperatures during many actual operational conditions, such as delayed heating due to condensation on metal foil surfaces of the catalyst, that many prior methods depend upon for implementing catalyst diagnosis and heating. However, such conditions can have significant impact on actual total air pollution when non-adaptive methods control algorithms are unable to properly adapt for such factors as catalyst condensation during normal engine operation.

Catalysts for engine exhausts are used to convert unburned or partially reacted gases that are mostly made up of hydrocarbon (HC), carbon monoxide (CO), and nitrogen oxides ($NO_x$) components. Gases leaving the exhaust manifold of an internal combustion engine enter the inlet of a device called a catalytic converter. A catalytic converter is the device made up of multiple catalyst elements that provides an expansive area where these gas components are oxidized to carbon dioxide ($CO_2$), nitrogen ($N_2$), and water vapor ($H_2O$) by catalyst materials such as platinum (Pt), palladium (Pd), and rhodium (Rh). The conversion of these toxic gases into $CO_2$, $N_2$ and $H_2O$ results in an exothermic chemical reaction at the catalyst surface and causes an increase in the temperature of the gases leaving the outlet side of the catalyst element. Intentionally increasing the steady state concentrations of unburned or partially reacted gases entering the catalyst will result in a temperature rise that can be used to determine the catalyst's conversion efficiency as well as to heat it as described herein. Each catalyst may have different oxidation characteristics for more completely converting gases entering from the engine's exhaust manifold into less toxic gases.

Various methods for monitoring the catalyst's conversion efficiency by monitoring the level of the chemical or exothermic reactions occurring within a catalytic converter have been proposed. Detection of the catalyst's efficiency with a chemical method usually incorporates the use of two oxygen sensors placed at the inlet and the outlet portions of the catalytic converter catalyst elements being monitored. The voltage versus time characteristics of the two oxygen sensor's output signals provides an indication of the catalyst's ability for storing oxygen for chemical oxidation reactions. The catalyst's oxygen storage capacity causes a difference between the inlet and outlet oxygen sensor signals. Since the catalyst's oxygen storage capacity decreases after extended high temperature operation, the sensors output voltage versus time characteristics become more similar as the catalyst's ability to store oxygen drops to zero. The accuracy of oxygen sensor based diagnostic methods have become less satisfactory as allowed levels of total pollutants from an automobile exhaust into the atmosphere have been subsequently decreased by new regulations to levels almost approaching zero.

Exothermic energy released in the catalytic converter causes a temperature increase at the surface of the catalyst's substrate and also in the exhaust gases flowing past this surface. Monitoring of this temperature increase, caused by chemical exothermic energy release, provides another method for measuring the catalytic converter's overall chemical conversion performance. Two primary methods have been proposed for monitoring a catalyst's gas conversion capability by using a catalyst's temperature characteristics to determine its level of exothermic energy release. The first method uses two or more temperature sensors to passively monitor the temperatures of both the gases entering and exiting the desired portion of the catalytic converters being monitored. Within the catalytic converter, each catalyst element's outlet gas temperature increases to a steady state level above its inlet's gas temperatures depending on amounts of exothermic energy released at the catalyst's surfaces. Under some relatively steady state vehicle operating conditions, the temperature differences between the gases entering and exiting the portion of the catalytic converter being monitored provides an indication of the catalyst's condition. Methods covered by U.S. Pat. Nos. 5,592,815 and 5,630,315 apply this first method of catalyst temperature detection during periods of steady state engine operating conditions. The steady state temperature difference between the inlet and outlet catalyst temperature sensors, in a properly functioning catalytic converter, can be about 50-80° C. This may compare with a catalyst having insufficient conversion efficiency producing an indicated temperature sensor difference (outlet minus inlet) of between 10 and 40° C. Closely matched sensors, with stable, long-term error characteristics, are required to discern between good and bad catalytic converter conversion efficiency using such a technique.

A second method of temperature based catalyst monitoring uses a momentary disabling of the ignition system voltage to the engine's spark plugs to cause an unburned fuel and air mixture to exit the engine's exhaust. The time period of disabling the ignition system must be short in order to prevent the torque change from the engine to be noticed by the vehicle's driver. Engine operation typically must be selected during only lightly loaded conditions, such as during vehicle deceleration or engine over run, to prevent noticeable changes in engine smoothness to the vehicle's operator when disabling of the ignition occurs to generate an exhaust gas pulse with high levels of chemical energy. This pulse of unburned fuel and air mixture subsequently enters the catalyst and causes a sudden, small temperature rise in some portion of the catalytic converter's catalyst elements for a short time period. Quick responding temperature sensors are required to monitor this sudden and brief temperature rise at various portions within the catalyst where the unburned fuel and air mixture is oxidized exothermically at the catalysts' surfaces. Temperature sensors must also be placed at the proper location where the unburned exhaust pulse will be oxidized since most catalytic converters have multiple catalyst elements with a different precious metal catalyst makeup. The location where the pulse will be oxidized is dependent on many factors, such as the instantaneous temperatures of each catalyst element and the gas concentration levels at the catalyst's surface. Since engine operation may not be stable during the required light load engine enabling conditions, such as engine over run, the consistency of the chemical energy levels entering the catalyst may also be more variable than desired and degrade catalyst diagnostics accuracy. Identification of the instantaneous catalyst element temperatures and the location where the unburned exhaust pulse is oxidized can require multiple temperature sensors to be placed at various locations within the catalytic converter. Prior methods related to this second method are documented under U.S. Pat. Nos. 5,339,628, 5,435,172, 5,355,671, 5,610,844 and related documents.

A variation in this second method is disclosed in U.S. Pat. No. 5,715,676. In this disclosure the catalyst is mainly diagnosed with a catalyst temperature sensor during its warm-up phase shortly after cold starting by using an exothermic heating method employing rich A/F and a catalyst oxygen source from either a secondary air injection pump system or by operating some cylinders lean. However, the critical factor of when to enable the disclosed exothermic heating method, since a catalyst's characteristics are significantly changing in real time during warm-up as well as over the catalyst's operational lifetime, is not disclosed in U.S. Pat. No. 5,715,676. The diagnostic method proposed in this disclosure depend upon when in the catalyst warm-up phase, shortly after cold starting, that the diagnostic method disclosed is enabled and this is noted by its requirement that steady-state operating conditions should prevail for some time before and during the evaluation. However, some low thermal mass close-coupled catalyst systems can be fully heated in less than 30 seconds and this leaves little margin for error in the enabling time for the diagnostic method disclosed. An alternate solution proposed to resolve this critical enabling time issue in prior methods is by the use of a second catalyst temperature sensor to measure gas temperatures at the catalyst's inlet but adds more cost.

These two methods are dependent upon the ability of temperature detection devices or temperature sensors to be able to accurately detect small temperature differences with magnitudes between 10 and 40° C. or require very quick response characteristics. Monitoring of the catalyst's condition is typically performed during short time periods between 2 to 30 seconds when engine speed and load conditions are relatively stable. Normal temperature fluctuations, caused by engine exhaust gases entering the catalyst during the catalyst efficiency monitoring time period, are sometimes difficult to be accurately differentiated from temperature changes caused by the catalyst's exothermic reactions. Multiple temperature sensors are sometimes required with these methods to more accurately discern only temperature changes associated with the desired exothermic chemical activity. Other techniques, such as disclosed in U.S. Pat. No. 5,896,743, propose the continuous passive monitoring of high catalyst temperatures that can cause early deterioration of a catalyst's conversion efficiency performance. Accuracy of this technique is improved by incorporating additional methods to discern catalyst performance. One disclosed additional technique is determining the light-off temperature of a catalyst following a cold start by measuring the time to reach a predefined fixed temperature threshold that approximates initiation of exothermic catalytic activity. The method disclosed in U.S. Pat. No. 5,896,743 using only a single predefined fixed catalyst temperature threshold, for determining when a catalyst becomes active and begins generating exothermic heating, introduces a significant error in such diagnosis technique since the catalyst's activation temperature changes significantly over an automobile's useful lifetime. Many factors, such as contaminants of the catalyst's surfaces or condensation thereon and actual catalyst light-off temperatures, that vary over the automobile's lifetime, limit such catalyst diagnostic method's accuracy when using such fixed temperature thresholds and multiple unrelated testing methods.

SUMMARY

Generally, the present invention is directed to providing systems and methods for improving the efficiency and/or performance of catalysts and diagnosis of catalysts. One aspect of the invention provides various techniques for increasing the speed of heating a catalyst from an initial cold start condition so that the catalyst is converting various gases more quickly. Another aspect of the invention provides various techniques for easily and accurately diagnosing the catalysts conversion capability so as to identify when the catalyst capability has degraded below a desired level of performance.

Various embodiments of the claimed invention provide methods of controlling exhaust gases from an engine's individual cylinders to improve overall catalytic converter performance, and may do so while also diagnosing proper operation in order to reduce overall toxic automobile pollutants emitted into the atmosphere during its operational lifetime. Such controlling of individual cylinder output gases may thus provide an associated method for diagnosing the performance of the catalytic converter while improving overall catalyst conversion efficiencies of converting toxic gases into non-toxic forms.

In another embodiment, a method of controlling each individual cylinder's concentrations of gases, or concentrations of HC, $H_2$, CO, $CO_2$, $O_2$ and $NO_x$ components, may be used to both diagnose and improve overall catalyst performance. Key advantages over prior teachings are discussed in more detail below.

When the mass ratio of air to fuel is at chemical stoichiometric conditions, the amount of air and fuel are in chemical balance to allow carbon dioxide, nitrogen and water vapor to be the main end products. A common terminology used to describe when the amount of fuel and air entering the engine's cylinders is in chemical balance is to use a value of $\lambda=1$ for denoting the engine is operating at stoichiometric conditions. Correspondingly it's common to describe a lean condition with $\lambda>1$ when there is less fuel than needed to meet chemical stoichiometric requirements and resulting in excess oxygen in the exhaust gases. A rich operating condition is then said to have $\lambda<1$ when there is more fuel than needed to meet chemical stoichiometric requirements and results in excess CO to be available in exhaust gases. Here, the value $\lambda$ is defined as the ratio of each cylinder's exhaust gas air-fuel ratio to the chemical stoichiometric air-fuel ratio.

It is typically advantageous to perform multiple engine control functions with minimum added hardware for reasons of both cost and reliability. Employing sensors that can be used for multiple control system functions minimize both costs and additional hardware while allowing common diagnostic performance checks to be accomplished for all engine control and diagnostic functions. There are advantageous of integrating both catalyst heating and diagnostic techniques while requiring the addition of only a simple catalyst temperature sensor to provide significant overall catalyst efficiency improvements for reducing air pollutants. One of the features of the claimed invention is heating of the catalytic converter by using an existing engine control system for causing a temporary step change in conditions of steady state engine exhaust gas concentrations. This resulting step change subsequently temporarily changes steady state catalyst exhaust gas conditions and thereby modifies the potential exothermic energy levels available within the catalytic converter. The resulting engine operational change causes the exhaust gases feeding into the catalytic converter to produce increased amounts of released energy from exothermic chemical gas reactions. Subsequent heating from such exothermic reactions can be advantageously used for multiple engine control system functions. Previous teachings have not disclosed methods of catalyst diagnostics by use of techniques for actively changing between steady state controlled rates of catalyst heating to thereby cause catalyst temperature changes that allow determination of catalytic converter malfunctions.

Such active control of exhaust gas concentrations can be used to increase catalyst efficiency by both earlier, more rapid heating and providing synergistic air-fuel control methods for improving pollutant reductions while also enabling a catalyst efficiency diagnostics technique. The present invention provides methods of controlling exhaust gases from each individual engine cylinder entering into a specific catalyst element to improve overall catalytic converter performance during a vehicle's useful lifetime. Specifically, in one embodiment a system is provided for controlling defined changes in the energy levels of exhaust gases entering the catalytic converter, such as by control of fuel to individual selected engine cylinders so as to cause conditions alternating between richer and leaner than stoichiometric. Such control changes are allowed during engine operation both before and after closed loop fuel control system operation, e.g. shortly after actively detecting initiation of catalyst chemical exothermic heating and thus provide improvements in catalyst heating, compared to prior teachings. By adding only a temperature sensor to the catalytic converter, for monitoring the catalyst's current state and detecting temperature changes resulting from engine control modifications, an indirect method of diagnosing the catalyst's pollutant reduction performance is also attained. Further, by employing an advantageous technique of implementing a temporary, yet significantly long time period for controlling large changes in steady state exhaust gas conditions, diagnosis of the catalytic converter's efficiency can be determined using readily available high temperature sensors. It is these large modifications in exhaust energy conditions over an extended time period, that allow using temperature sensors for monitoring heating characteristics changes, and one of the features that differentiates the claimed invention from other systems and methods.

Availability of cost effective temperature sensors with either, or both, long term accuracy stability and quick response to changes in the measured gas temperatures remains as one of the main challenges associated with prior methods of catalyst efficiency detection employing temperature monitoring. However, heating effects from step changes in a catalyst's exothermic exhaust gas energy level conditions can be more easily monitored when the duration of the heating conditions becomes longer than a temperature sensor's time constant characteristics. Typically there are tradeoffs between a temperature sensor's response time characteristics with its durability and cost. Using the present invention, temperature sensors with, for example, response time characteristics of between 5 to 10 seconds provide sufficient catalyst performance diagnosis capability. Emerging sensor designs capable of reliably detecting catalyst temperatures between 20 and 1000° C., while having quicker response time characteristics below 5 seconds, are particularly advantageous for monitoring catalytic converter conditions following a cold start. These sensor designs help by more precisely monitoring a catalyst's heating characteristics following control changes in exhaust gas energy levels, such as during catalyst diagnostics or after cold engine starting. Such sensor improvements also potentially reduce the duration of changes where higher exhaust gas exothermic energy levels must be maintained for diagnosing catalytic converter malfunctions. Therefore, further improvements in catalyst temperature sensor designs, having quicker temperature response time characteristics, provide further enhancements in the present invention.

Continuing improvements in emission system technology may provide direct assistance for meeting the above objectives by their overall ability for reducing tailpipe automobile pollutants. Various other new technologies have been developed in an effort to further reduce the toxic pollutants following start of a cold engine. Thin walled catalytic converters, advanced ignition and fuel injection systems, variable engine valve timing and other techniques like improved engine control algorithms for reducing engine out emissions are being continually developed to attain this goal. Many of these new technologies may also enable significantly improved methods in heating and diagnosing catalytic converter performance and provide enhanced capabilities for methods using air-fuel cycling and catalyst temperature sensors. For example, technologies such as high energy ignition systems and in-cylinder fuel injection systems provide an expanded range for lean engine operation to both reduce fuel consumption and expand the allowed range of exhaust gas air-fuel ratio cycling without concern for engine misfiring, especially during cold engine operation. Such systems allow lean engine operation almost immediately following cold engine starting and allow rapid catalyst heating by controlling selected engine cylinders to operate rich. Systems providing for electronic exhaust gas recirculation control and variable engine valve timing further enable the ability to cause step changes in engine exhaust manifold levels of NOx gases during many engine operating conditions. Such methods of controlling amounts of residual exhaust gases during the engine's intake stroke enable an expanded range of catalytic converter performance checks for systems using catalyst temperature sensors by diagnosing catalytic converter efficiency performance.

It is particularly advantageous to use the new designs of thin walled ceramic and metal catalysts, having low thermal mass, to speed catalyst heating and improve the ability to discern initiation of catalyst exothermic heating. These new catalyst designs allow rapid heating to chemical activation temperatures within less than 30 seconds after a cold start while an engine may still be operated rich for stability under open loop fuel control. Designing pollutant reduction systems using such low thermal mass catalysts to allow earlier, more rapid catalyst heating by enabling fuel control changes earlier, so ignition retard can be phased out more quickly, are some methods disclosed in this invention.

While there are a number of techniques that illustrate how to estimate catalyst temperatures, without need of a temperature sensor, these techniques do not provide accurate catalyst temperatures during unanticipated or abnormal engine operating conditions. It is exactly these unexpected catalyst operational conditions that effective diagnostic systems must monitor in order to be accurate. Most of the catalyst temperature estimation techniques are insufficient for providing the level of accuracy and precision required for functions such as active catalyst heating and diagnosis by such methods controlling changes in exhaust gases chemical energy levels. These fail to teach the important method of detecting initiation of catalyst chemical activity, where exothermic heating can first occur at a point in time, and thus when fuel control modifications first become effective to aid catalyst exothermic heating. Detecting initiation of catalyst exothermic heating allows more effective fuel control magnitude changes to be used for aiding more rapid catalyst exothermic heating with less concern for causing higher pollutants.

These also fail to teach methods of actual detection of exothermic heating activation, when a catalyst first becomes chemically active, and are less effective than methods using systems designed with low thermal mass catalyst systems that can operate under non-stoichiometric cold start conditions as disclosed in this invention. They don't disclose methods, such as designing catalyst and temperature sensor systems using low thermal mass catalyst designs that are capable of detecting actual catalyst chemical heating activation. Such teachings also fail to allow earlier, more rapid heating by using methods detecting actual initiation of catalyst exothermic activation that employ an expanded range of engine air-fuel ratio control reaching the detectable limits of engine misfire while minimizing perceptible engine roughness yet not requiring cylinder fuel disabling. These teachings also fail to disclose methods of integrating heating with detection or diagnosing of actual catalyst conversion effectiveness and are therefore unable to heat the catalytic converter to maximum efficiency in the shortest times possible by modifying fuel control methods based upon its continuing change in catalytic converter characteristics. Deterioration in the catalyst can more than double the time delay after cold engine starting before actual initiation of catalyst exothermic heating occurs. In such a situation it may require an indication of catalytic converter malfunction rather than enabling fuel control changes for heating that could increase total air pollutants due to a malfunctioning catalyst. Methods of providing catalyst heating, such as described in the present application do provide methods to allow the beneficial earliest heating during open loop fuel control while adaptively controlling catalyst heating rates to the maximum possible levels for minimizing total air pollutants produced. The method disclosed below in the invention herein, regarding detecting initiation of catalyst chemical exothermic heating, may also provide a solution to resolve the enabling timing issue when using low thermal mass close-coupled catalyst systems that can be fully heated in less than 30 seconds related to the diagnostic.

BRIEF DESCRIPTION OF DRAWINGS

The above and other objects, advantages and features of the present invention will be apparent from the following description taken in conjunction with the accompanying drawings, in which.

Figure 1:
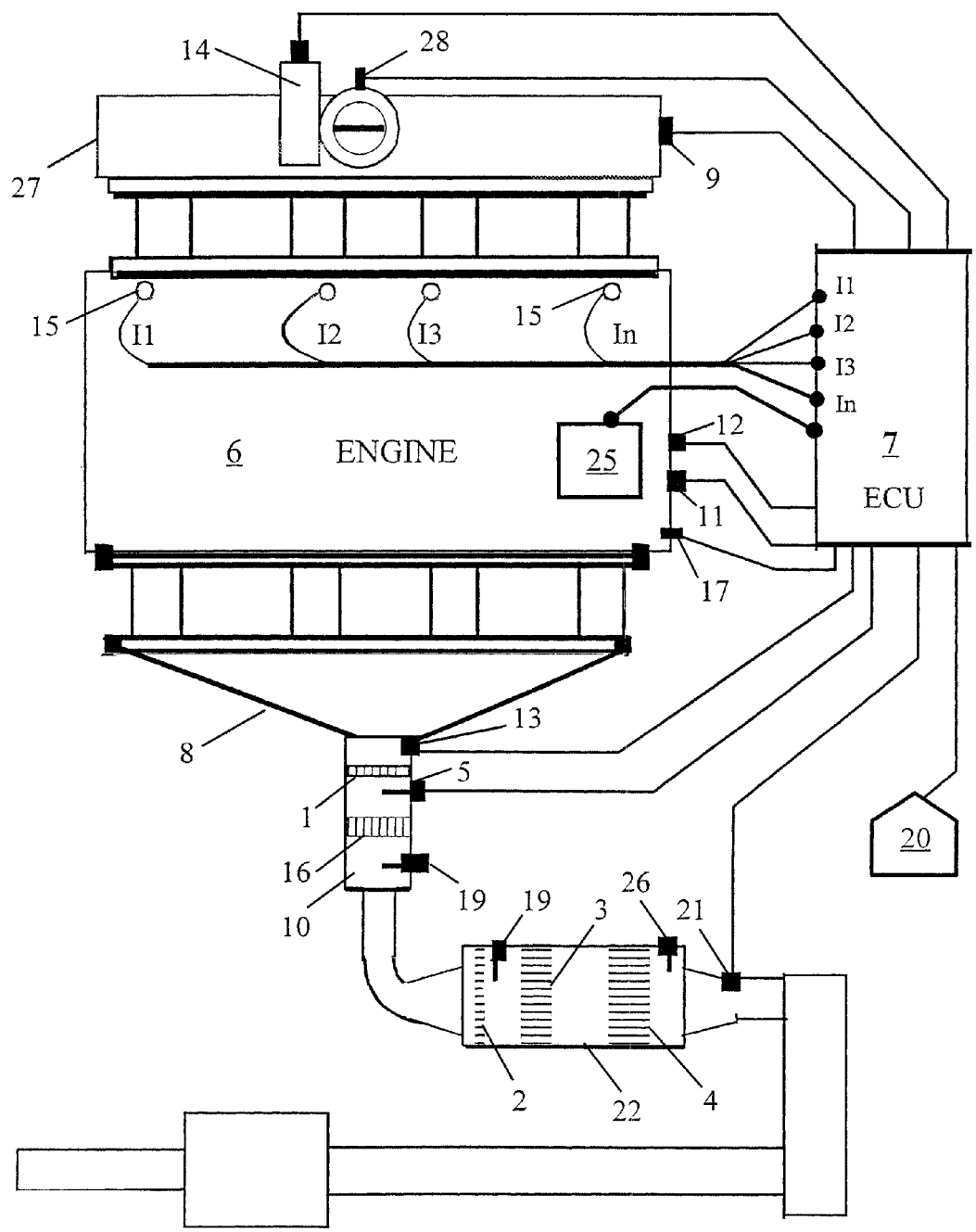
FIG. 1 shows a diagram of one preferred embodiment of the internal combustion engine catalytic converter heating, efficiency monitoring and verification system of the present invention.

These figures are included for the purpose of illustrating the invention. It should be understood to one skilled in the art that the invention is not limited to the depictions used in the figures for explaining these inventive concepts in a timely manner.

DETAILED DESCRIPTION

It is especially advantageous to provide methods for determining the catalyst's performance and also to provide more rapid earlier heating during the period immediately following cold starting. Adding a temperature sensor to the catalytic converter also provides a further advantage for actual monitoring of abnormal conditions potentially causing overheating of the catalyst's precious metal surfaces. These unexpected catalyst operational conditions are among those that effective diagnostic systems must monitor in order to be accurate. One objective of the present invention is providing a method for controlling individual concentrations of an engine's exhaust gases under steady state conditions during a controlled time period to cause catalyst heating. Changing such steady state exhaust gas conditions may produce a significant change in a catalyst's operating conditions over extended time periods by inducing large, chemical exothermic temperature changes that maybe consistently monitored using durable, economical and practical temperature sensors. Another objective is providing a method for temporarily controlling defined changes of individual exhaust gas concentrations to produce consistent catalyst temperature changes and allow diagnosis of catalytic converter malfunctions. Catalyst malfunctions can be indicated, such as when there's low catalyst conversion efficiency detected for various exhaust gas components.

A further objective of the invention is for increasing the rate of catalyst heating, both during open and closed loop fuel control, at the earliest time when a catalyst's temperature is sufficient to allow sustainable exothermic reactions at portions of its active surfaces. This may be accomplished by using the catalyst temperature sensor, together with other engine control parameters, for detecting the initiation of catalyst chemical exothermic heating, thus enabling earlier catalyst heating methods than taught by other known methods. A still further objective is to integrate other methods, disclosed herein, together with other synergistic techniques to further improve overall catalytic converter efficiency. Examples of these include integrating early catalyst heating by use of catalyst diagnosis methods to modify fuel control methods for normal deterioration in a catalytic converter. These fuel control methods need to provide their designated functions while maintaining normal engine functioning, for example by assuring imperceptible changes in engine smoothness. Another objective of the present invention is providing methods to improve air-fuel ratio control during transient engine operating conditions so a catalyst can operate closer to the stoichiometric levels, where its conversion efficiency is greatest, for longer periods. An additional objective is to provide methods that may use alternate engine configuration embodiments having an in-cylinder fuel injection system and other engine hardware changes that further increase the capabilities of the various previously mentioned objectives. Of course, one or more of the previously identified objectives may be combined with one another, in various combinations, to achieve systems and methods with improved catalytic converter efficiency characteristics and diagnosis methods.

New regulations require improved accuracy for determining the conversion efficiency of catalyst elements within an exhaust system's catalytic converter of an internal combustion engine. One such system is shown in FIG. 1. The engine shown, labeled 6, is an in-line cylinder configuration and can also represent a single cylinder bank on other engine configurations, such as a 'V' type or opposed cylinder, with various numbers of cylinders feeding into a single or multiple catalytic converter(s). This depiction of a grouping of engine cylinders coupled to their respective catalyst elements, e.g. catalytic converter 10, is important because these are the two main synergistic components forming the system required for reducing total air pollutants. In V-type engine configurations there are two banks of cylinders, for example on a V-8 engine there's 2 banks of inline 4-cylinder groupings and their exhaust gases may each be connected to 2 or more separate catalytic converters or combined together into one or more catalytic converters. So from this example, it may be seen the engine configuration shown in FIG. 1 may represent many different engine configurations, from an exhaust gas control viewpoint, of the engine-catalyst system. Control of individual cylinders' exhaust gas characteristics is done from the catalyst's perspective of how these gases' affects the catalyst's ability to reduce pollutants, or to be diagnosed. Therefore, this subgroup of the catalyst elements and the engine cylinders connected to them compose the pollutant reduction and diagnostic systems subsequently discussed.

The catalytic converter assembly in FIG. 1 may be composed, for example, of a preheat catalytic converter 10 attached to the exhaust manifold 8 using a single or multiple catalyst bed elements 1 and 16 plus a main catalytic converter 22 mounted a further distance from manifold 8. Exhaust gases exiting each individual engine cylinder enter manifold 8 after flowing through each engine cylinders' exhaust valves controlling the timing of the gases entrance into manifold 8 and then into catalytic converters 10 or 22. The main catalytic converter 22 may contain one or more additional catalyst bed elements 2, 3 and 4, etc. as required by design. Catalyst element 2 may be located in either catalytic converter 10 or 22 depending on system design requirements. This alternately located catalyst element is designated as 16 when located in the preheat converter 10. In some configurations the preheat catalytic converter 10 mounted directly to the exhaust manifold 8 might be eliminated due to system design factors such as space limitations or it may be more closely integrated into 8, the exhaust manifold.

A catalyst temperature sensor 5 may be positioned at the exit of the first catalyst bed element 1 or alternately at the exit of second catalyst bed element (2 or 16) or third element 3. The catalytic converters 10 and 22 may also use sensor 19 as a second temperature measurement when catalyst configurations make this desired. The gases exiting from the final catalyst element 4 in the main catalytic converter 22 and into the vehicle's tailpipe, labeled 18, determine the overall level of emissions for hydrocarbon, carbon monoxide, nitrogen oxides and other toxic type pollutants that enter the atmosphere. The engine catalytic converter, for example, of an automobile is used to convert toxic emissions into safe gases when it's working properly. In order to meet new pollution control regulations many engines may be equipped with multiple catalytic converters, e.g. converters 10 and 22, that are placed close to an engine's exhaust manifold, 8, as well as further downstream from the engine. Some catalytic converters may be integrated into the exhaust manifold housing to decrease the time the catalyst remains below its chemical activation temperature after a cold engine start. Monitoring of the catalyst's operating efficiency will be required to alert the driver when high levels of toxic exhaust gases are being emitted through the use of a catalyst malfunction indicator, 20. The present invention may be used in many alternate devices and vehicle configurations having an engine that use catalytic converters, such as an automobile.

As shown in FIG. 1, the internal combustion engine's exhaust manifold 8 may be attached to a typical catalytic converter assembly and the engine 6 may be controlled by an engine control unit 7 (ECU). The engine control unit 7 (ECU 7) may be an electromechanical or an electronic device that controls many functions such as spark ignition timing, engine airflow demand levels, residual or engine cylinder exhaust gas recirculation levels and the amount of fuel delivered to the cylinders feeding. For example, a microprocessor type control unit having an electronic memory capability to allow storage for control values that are selected based upon engine and vehicle system dependent variables with formats such as a multidimensional lookup table(s), constants, or equations, having multiple input parameters, modeling the desired output characteristics. Defined threshold conditions or calibrated values may be stored in the ECU memory that may be, for example, non-volatile memory formats such as ROM or EEPROM. The ECU 7 uses, for example, a digital control system with the sensor inputs and other parameters, such as engine intake airflow provided from device 14, to determine initiation and duration of each fuel injector's 15 injection opening time. These injector opening times subsequently determine resulting fuel quantities injected into each individual engine cylinder for its combustion cycle. Predetermined values for the amount of fuel delivered to each cylinder are retained in digital memory storage in the form, for example, of a multidimensional table lookup values based upon various ECU 7 input operating parameters.

The ECU 7 has the ability to process control system input operating parameters such as engine speed, temperatures, load and other parameters used to control the engine's operation by selecting the appropriate dependent values stored in ECU memory or by calculating them from related sensor outputs. ECU 7 controls the timing and quantities of fuel delivered by each individual cylinder's fuel injectors located at 15, and labeled I1-In, that may either inject into the engine's intake port or alternatively directly inject fuel into the cylinder. Air is delivered into each individual cylinder through an intake valve by way of an intake manifold 27 and then through each cylinders' individual intake ports in order to provide the needed oxygen to cause combustion of the injected fuel. A crankshaft engine timing sensor 12 may be used for identifying when each cylinder is on either its compression or exhaust phase in the case of a 4-cycle engine type. Sensor 11 and 12 provide inputs to ECU 7 that may be used to determine an indication of actual engine crankshaft position or crankshaft angle, relative to a fixed reference point, at any engine operating time. This signal may come from, for example, a once per 2 crankshaft revolutions signal from a camshaft sensor, an in-cylinder pressure sensor or a spark plug ionization current detection system (that may be also employed for misfire detection). Speed sensor 11 may also provide input into ECU 7 for determining speed changes related to engine cylinder misfiring. The engine timing signal from sensor 12 allows ECU 7 to identify and correlate each individual cylinders' combustion cycle events that may be used, for example, identifying individual cylinder misfiring.

Misfire diagnosis may be possible for most engine operational conditions and may identify individually misfiring cylinders. Misfire diagnosis methods may be employed in the present invention to allow implementing corrective engine control actions, when possible, for minimizing potential catalyst damage and air pollutants. Misfire is undesired since it can cause inconsistent catalyst heating rates that would affect the accuracy of the catalyst efficiency monitoring, increase pollutants and affect smooth engine operation. Fortunately, by dynamically detecting misfire by use of various techniques, such as from evaluating engine speed fluctuations or monitoring spark plug ionization current characteristics, methods for fuel control, such as catalytic converter heating and diagnosis, may operate within measured limits of detected misfire. ECU 7 monitors subsequent engine cylinder misfire characteristics after controlling changes in fuel quantities for various engine control functions. After making such fuel changes ECU 7 modifies the controlled levels of fuel, for example, if any incipient or momentary misfire conditions are detected. ECU 7 doe this by selecting the appropriate change magnitudes for engine operational conditions to assure incipient misfire levels remain outside a calibrated threshold range stored in the ECU 7 memory.

The ECU 7 controls the quantity of fuel delivered to each individual fuel injector devices $I1, I2, I3, I_n$, based upon information from various ECU 7 control system input parameters. These may include, for example, the engine's load sensor 9, engine speed sensor 11, engine coolant temperature sensor 17, inlet air temperature sensor 28 and the closed loop fuel control oxygen sensors 13 and/or 21. During normal engine closed loop fuel control, sensors 13 and/or 21 provides feedback to the ECU 7 for maintaining the average air-fuel ratio of exhaust gases entering the catalytic converter to be at stoichiometric chemical conditions. Oxygen sensor 21, located at the outlet of the catalytic converters 10 or 22, may be used to trim the closed loop control point based upon the oxygen level after the catalysts. Sensors 13 and or 21 may be a zirconia, switching type oxygen sensors providing only a discrete indication of rich or lean conditions of the exhaust gas air-fuel (A/F) ratio relative to stoichiometric levels. However, sensors 13 and or 21 may also be a wide range type sensor that provides a linear output signal detecting the actual exhaust A/F ratio over a measurement range that may exceed 10 to 20 A/F ratios. This wide range sensor, sometimes called universal exhaust gas oxygen (UEGO) or linear oxygen sensors, provides ECU 7 with information allowing control operation outside the stoichiometric range.

ECU 7 can also be used to control the engine load condition using an optional electronic air flow control mechanism 14 based upon operator or driver power demands. Device 14 may include an actuator system, such as a motorized throttle system or an electronically controlled variable engine valve lift system. In an electronically controlled variable engine valve lift system, an actuator mechanism allows, for example, varying the lift or controlled motion of the intake and exhaust valves of each cylinder. In such a system, ECU 7 may be used to control airflow to individual cylinders based upon operator power demands by control of the actuator mechanism that modifies engine valve lift for all cylinders. This variable valve lift system thus may eliminate the throttle valve controlling airflow into the intake manifold 27. The actuator device 14 may allow filtering of rapidly fluctuating changes in driver power demands or may directly follow the driver accelerator pedal inputs depending upon control signal from ECU 7. Device 14 may also be used to compensate for changes in engine torque levels caused by engine control changes implemented by ECU 7 so these changes may remain imperceptible to the driver.

Commanded levels of engine airflow may be provided by device 14 to ECU 7, from an internally integrated sensing method, such as from using an engine throttle position sensor or other indicator of controlled engine intake airflow levels. Engine power demands from an operator or the vehicle's driver may also be provided to ECU 7 from device 14 by another internal sensor such as a position sensor. This pedal position sensor is used for determining the engine operator's desired power demands and may alternately be placed inside the vehicle, for example, determining position of the vehicle's accelerator pedal. This device 14 is not specifically required to diagnose the state of the catalyst's conversion efficiency though it may be used to improve catalytic converter efficiency and also enhance the accuracy of catalyst diagnostics. Device 14 may also be used to filter rapidly fluctuating changes in driver power demands after engine cold starts or during transient engine load changes to improve engine control. Driver or engine operator power demands may be filtered by modifying the time rate of changes allowed for electrically controlled engine airflow changes. ECU 7 may adjust time rate of changes in electrically controlled engine airflow changes by, for example, depending upon operator power demand changes. This may be accomplished by determining allowed rate of engine airflow change depending upon the associated imminent changes in operator power demands. These characteristics of device 14 control may be stored in ECU 7 memory in a format such as a multidimensional look-up table.

Under normal operating conditions, sensors 13 and 21 are used by the ECU 7 to provide closed loop fuel control so that the gases exiting manifold 8 may be at stoichiometric conditions with $\lambda=1$. Under this condition the three way catalyst elements (e.g. 1 and/or 2 or 16, etc.) are able to convert toxic exhaust gases into $CO_2$, $N_2$ and $H_2O$ more effectively. The output of coolant sensor 17 provides input into the ECU 7 and may also be used with temperature sensors 5, 19 and/or 28 to determine one of the engine operating conditions or to enable and disable various fuel control functions. An intake air temperature sensor 28 measures air temperature entering the intake manifold 27 for providing temperature compensation for various engine control functions, for example, transient and cold start fuel control. An inlet air temperature sensor 28 as shown in FIG. 1 may also be used to provide more accurate indications of engine conditions rather than sensor 17 alone.

A first objective of this invention is providing a method for controlling individual concentrations of an engine's exhaust gases to produce a significant, defined change in a catalyst's operating conditions over extended time periods by inducing large exothermic temperature changes that may be consistently monitored using durable, economical and practical temperature sensors. Creating a predetermined change in the steady state chemical energy levels of exhaust gases entering the catalyst will cause a subsequent change in the temperature characteristics exiting the catalyst element as these gases are oxidized by catalytic action. Controlling conditions of these chemically reactive gases in a pre-established manner for providing a reliable and consistent method for heating the catalyst. Causing such a controlled change in exhaust gas conditions allows the resulting catalyst temperature characteristics to be monitored and compared to known catalyst element characteristics with acceptable and unacceptable conversion efficiency. Likewise controlling conditions of gases can be used to heat the catalytic converter more quickly after cold start conditions. Monitoring the temperature change characteristics of the gases exiting selected catalyst elements provides an indication of the magnitude of the catalyst's exothermic reactions or alternately, the effectiveness of the catalyst's oxidation capability. Typically, most of the chemical oxidation of CO and HC gases will occur in the catalyst element with the highest catalytic activity.

One method of controlling a change in exhaust gas concentrations is by cycling selected individual cylinders' air-fuel conditions between predetermined rich and lean states. ECU 7 is used to control each injector's 15 flow rate to selected individual or groupings of cylinders. Controlling the fuel flow to one or more of each individual cylinder, or groups of cylinders, from a rich to lean to rich conditions, in a cyclic manner produces an exhaust gas flow with higher concentrations of oxygen, CO and hydrogen based fuel molecules in the gases entering the first catalyst 1 or 2. Cylinders operated rich provide increased levels of CO and hydrogen based gases while cylinders operated lean provide increased oxygen level concentrations in the exhaust gases entering the catalyst, as compared to when individual cylinders are controlled at stoichiometric levels. Exothermic chemical energy is subsequently produced to cause heating when these gases react near chemically active surfaces within the catalyst. This process of cycling the injector's fuel rates to produce alternating rich and lean conditions is herein termed "cyclic fuel control" to differentiate it from normal engine fuel control. Cyclic fuel control may be activated during both engine open and closed loop fuel control operation periods. Fuel rate cycling is preferably performed over an appreciable defined time period, such as during catalyst diagnostics, based upon stored values in ECU 7 memory to allow the catalyst's temperature sensor 5 to measure a sufficiently significant change. Changes in the catalyst's temperature versus time characteristics at the specified catalyst location may then be monitored during this defined period, from a time near initiating fuel cycling and through an ECU 7 calibrated time period subsequent to disabling the air-fuel fluctuations. Cyclic fuel control may be disabled before the end of this calibrated period when a properly functioning catalyst's temperature rise exceeds another calibrated or predetermined threshold that allows heating to be ended early.

Cyclic fuel control results in a higher than normal level of chemically reactive exhaust gases that are subsequently oxidized in a normally functioning catalyst element for causing a large step change in its outlet temperature. See, for example, the dash-dotted temperature line 234 in FIG. 2 that illustrates cyclic fuel control causing a large temperature rise of a catalyst with good conversion efficiency compared to a corresponding low efficiency catalyst also shown by the respective dotted temperature line (233). This step change in outlet temperature is selected to far exceed the short term transient catalyst temperature output fluctuations resulting from normally varying catalytic converter inlet gas temperature and air-fuel ratio conditions. Further, cyclic fuel control's effect on the respective individual cylinder's exhaust gas air-fuel ratios entering the catalyst's inlet are illustrated in FIG. 3.

Figure 2:
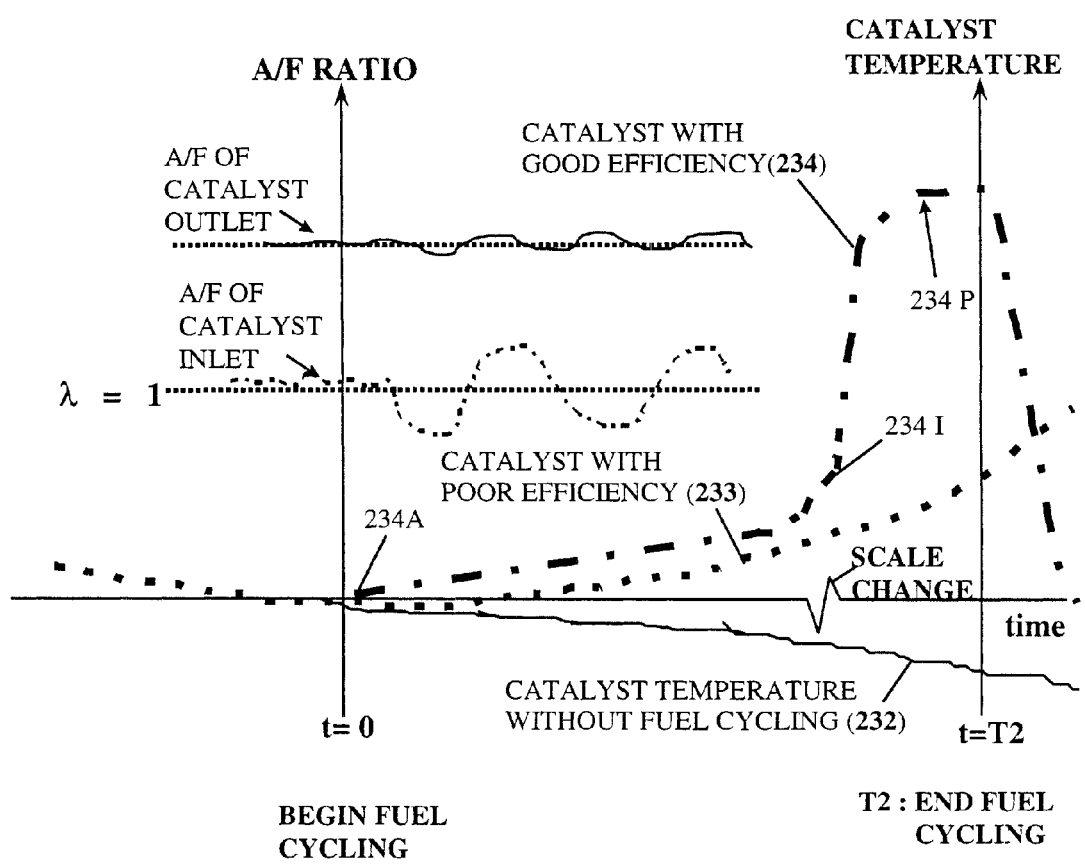
FIG. 2 shows a graph illustrating the effects on the catalyst's temperature due to cycling the fuel rate to groups of engine cylinders that feed exhaust gases into the selected catalytic converter, according to one preferred embodiment of the present invention.

FIG. 2 illustrates the effects of cycling the fuel rate to selected groups of engine fuel injectors. The output of sensor 5 and/or 19 monitoring the selected catalyst element(s) (1, 2, 16, etc.) shows typical temperature versus time characteristics of a catalyst with good and poor conversion efficiency as illustrated in FIG. 2. Both the magnitude and time rate of change of the temperature profile from 5 and/or 19 following the enabling and disabling of rich-lean cyclic fuel control are monitored for subsequently determining when catalytic converter conversion efficiency performance is unacceptable. The solid temperature line 232 in FIG. 2 illustrates a catalyst's temperature characteristics declining between time t=0 and t=T2 and shows what occurs when fuel cycling is not enabled. Conditions like these, with stable or slightly decreasing catalyst temperatures, are the preferred criteria for deciding when to enable fuel cycling since they may provide improved catalyst monitoring accuracy. By comparison, when fuel cycling of individual cylinders is enabled at t=0, a good catalyst's temperature rise shown by the dash-dotted temperature line 234 in FIG. 2 attains a significantly higher maximum temperature. This maximum temperature shown by 234P is maintained until the time t=T2, when fuel cycling is terminated. In comparison to the dotted temperature line 233, illustrating the characteristics of a catalyst with marginal conversion efficiency and low exothermic heating activity, a significant difference may be seen compared to curve 234 of a catalyst in good condition.

FIG. 2 uses an expanded time scale since the rate of temperature rise is dependent on factors such as catalyst thermal mass (volume, etc.), engine system design, sensor 5 and/or 19 response time characteristic, and exothermic activity and may take an extended time period. This period thereby may require many cylinders' rich-lean cycling events before the temperature would reach steady state characteristics. The small temperature rise between points 234A and 234I of FIG. 2 illustrate these effects of the associated thermal lags. Temperature characteristics in the operational catalytic converter 10 or 22 being evaluated may be compared to characteristics stored in memory of ECU 7 from, for example, known catalysts with good and inadequate conversion efficiency performance. In vehicles that use only a small close coupled catalytic converter 10, or no catalyst element 1 at all, the catalyst temperature sensor 5 may be placed, for example, at the exit of catalyst elements 2, 3 or 16 depending on catalyst configurations used. Sensor 19 shows a possible alternative location for sensor 5 in some catalytic converter configurations where this location is more preferable. Sensor 19 may also be used for a second catalyst temperature measurement when catalyst configurations make this desired.

Figure 3:
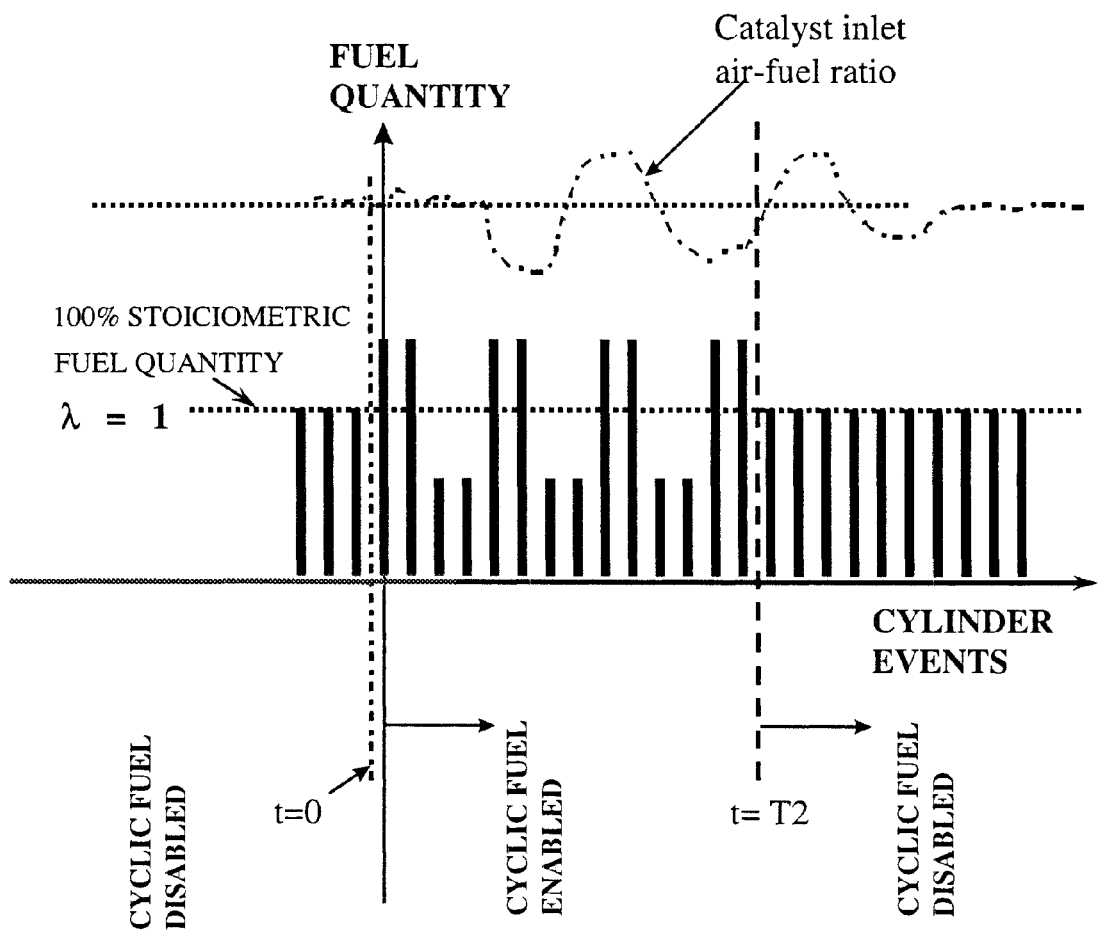
FIG. 3 shows one of the various alternate methods to cycle the magnitude and frequency of fuel rates for individual cylinder events to obtain alternating conditions between rich to lean and returning to rich for one complete rich-lean exhaust gas air-fuel ratio cycle entering the catalyst's inlet, according to one preferred embodiment of the present invention.

FIG. 3 illustrates one of the various alternate methods to cycle the fuel rate between individual cylinder events to obtain alternating air-fuel (A/F) ratio conditions between rich ($\lambda$<1) to lean ($\lambda$>1) and returning to rich ($\lambda$<1) to complete one complete rich-lean exhaust air-fuel ratio cycle. Once again, the value $\lambda$ indicates exhaust gas air-fuel ratio characteristics relative to the chemical stoichiometric conditions ($\lambda$=1). For illustration purposes, the dash dotted line shows the air-fuel ratio characteristics of the respective cylinders' exhaust gases, that feed into the catalyst element, while the cylinders' input fuel quantities are varied. The illustration shows an approximate delay caused by using a 4-stroke engine operating cycle.

Each pulse shown in the bar chart of FIG. 3 represents an individual fuel injector(s) 15 ($I_n$) delivering a specified fuel quantity to each engine cylinder. Magnitudes of the bar chart indicate individual cylinder injection fuel quantities. The selected number of cylinders with rich or lean conditions may be arranged in symmetric or asymmetric groupings by varying both magnitude of fuel changes from stoichiometric conditions and the cylinder groupings with common fuel rates. Consistency of selected cylinder groupings' effects on the catalyst heating, during cyclic fuel control, may be some of the factors for determining different combinations of cylinder groups. The average air-fuel ratio of one complete rich-lean exhaust gas cycle may typically be controlled at or near stoichiometric conditions during fuel cycling operation. Cyclic fuel control can be used during engine operation with either open or closed loop fuel control. Closed loop fuel control operation may be possible by using reduced feedback gain based upon the output of switching oxygen sensors 13 and/or 21. This may be accomplished by adjusting the air-fuel ratios of the respective cylinder groups and allowing use of closed loop engine fuel control, with a reduced level of control feedback gain for stability, while injector fuel quantities are cycled to cause catalyst heating. An alternative configuration is to use a wide range or linear oxygen sensors at either of locations 13 and 21 to allow ECU 7 controlling the mean exhaust gas A/F ratio in manifold 8 to almost any defined level. During cyclic fuel control enabling the proportional control step, typically used during closed loop feedback fuel control to toggle a switching oxygen sensor's 13 output, may be modified to improve catalyst heating consistency or discernment of specific efficiency characteristics such as $NO_x$ conversion.

The gradual degradation in the absolute temperature accuracy characteristics, typical of most high temperature sensors over hundreds of hours of operation, does not significantly affect the accuracy of catalyst efficiency monitoring using the present invention. This is because the measurement period is in the "range of seconds" while the temperature sensor's accuracy typically takes hours to change appreciably. Therefore, any absolute temperature reading error is mostly canceled out in the formation of the delta temperature term used to assess the level of catalyst activity. The delta temperature term is created by the subtraction of the two near steady state operating temperature conditions caused by enabling and then disabling of cyclic fuel control that results in an abrupt change in the catalyst's operating conditions. The two measured catalyst operating temperatures conditions resulting from these two discrete states of exothermic heat generating conditions caused by cycling and not cycling the exhaust gas air-fuel ratio produces this delta temperature change. The delta temperature change in catalyst temperature versus time, following a change in the state of cyclic fuel control, is one of the characteristics used by ECU 7 to assess the catalyst's condition. This delta temperature term, created by the subtraction of peak measured values in the two catalyst operating temperature caused when enabling cyclic fuel control. Points 234I and 234P in FIG. 2 indicate this peak temperature difference. Peak catalyst temperature changes after enabling rich-lean cycling may be one of the characteristics used to diagnose catalytic converter malfunctions and also adjust the magnitude of rich-lean A/F cycling amplitudes.

A second objective is providing a method for controlling individual exhaust gas concentrations to cause consistent catalyst temperature changes and allow accurate diagnosis of catalyst efficiency for various exhaust gas components. Creating a transient step change in the steady state conditions of unburned inlet gas concentrations entering catalysts 10 or 22 allows monitoring the degradation of a catalyst's chemical conversion efficiency by measuring the resulting temperature change of the gases exiting the catalyst. One method of causing a change in steady state exhaust gas conditions is enabling of rich-lean cyclic fuel control that raises the levels of CO and oxygen at the catalyst surfaces. Catalyst malfunction detection or diagnosis is then determined, for example, by causing large catalyst temperature changes through control of fuel quantities to selected grouping of cylinders from the application of a specified voltage time period controlled by ECU 7 to each of the individual fuel injectors 15 ($I_n$). Calibrated thresholds may be stored in ECU 7 memory to determine conditions for enabling and disabling rich-lean cyclic fuel control and may be established based upon prior controlled measurements of reference catalysts with marginal conversion efficiency. Enabling and disabling thresholds may be dependent on ECU 7 control system input parameters for each vehicle and engine configuration. Past and present engine and vehicle operating conditions, that determine when to enable rich-lean cyclic fuel control, may include parameters such as engine speed characteristics, load, driver airflow demands, coolant temperature, catalyst temperature characteristics, vehicle speed, transmission gear position, engine airflow or throttle position, prior operational conditions like measured catalyst efficiency, and other parameters establishing consistent monitoring conditions. Detecting a malfunctioning catalytic converter may be performed during such established engine conditions providing consistent changes in the target catalyst's temperature characteristics.

When engine conditions are within operational ranges providing consistent diagnostic test results for the catalyst, ECU 7 begins measuring temperature characteristic of a selected catalyst element during a period when a baseline steady state engine operational conditions, such as load and exhaust gases' concentrations, are acceptably stable for temperature monitoring. ECU 7 then controls a change to cause a second steady state exhaust gas condition, with different exhaust gases' concentrations, and subsequently their chemical energy levels entering the catalyst for a controlled time period, such as by enabling rich-lean cyclic fuel control. Subsequent changes in the catalyst's temperature characteristics while, for example, ECU 7 controls rich-lean exhaust A/F cycling, may then be compared to previously measured temperature characteristics during the first steady state exhaust gas conditions, when for example stoichiometric closed loop fuel control was enabled.

Typically, stoichiometric engine closed loop fuel control operation may be selected as one of the steady state conditions of exhaust gas concentrations and energy levels. ECU 7 may then determine whether the target catalytic converter 10 or 22 is malfunctioning by comparing changes between the first and second temperature characteristics. These temperature characteristics from the first and second operating conditions include the catalyst temperatures versus time and the first and second derivatives of these temperature values with respect to time. ECU 7 may enable rich-lean cyclic fuel control for a selected time period or until a defined catalyst temperature change has occurred. After disabling rich-lean cyclic fuel control, ECU 7 may monitor the subsequent catalyst temperature characteristics to determine whether they return to the first steady state exhaust gas conditions when engine operational conditions remain within a defined range of stable operation. Such subsequent temperature characteristic monitoring may improve diagnostic test accuracy by, for example, confirming the first steady state exhaust conditions have remained constant and all temperature characteristic changes resulted from rich-lean cycling.

Temperature change characteristics, detected by sensor 5 and/or 19, of the catalyst element's 1, 2 or 16 may be monitored from a period ranging from just near the time of enabling cyclic fuel control until a short ECU 7 calibrated period following the subsequent disabling of rich-lean cycling. These monitored temperature characteristics may be subsequently compared with reference characteristics stored in ECU 7 memory to determine if a catalyst's conversion efficiency is acceptable. One or both of the magnitude and transient time rate of change characteristics of the monitored catalyst element outlet's temperature may be used to decide the catalyst's conversion efficiency.

Enabling cyclic fuel control causes both a sudden and large catalyst temperature change as detected by sensor 5 and/or 19. Sensor 5 and/or 19 may be positioned at one or more locations near the exit of the catalyst element(s), for example 1, 2 or 16, in order to provide close correlation between overall catalytic converter conversion efficiency and the monitored characteristics of temperature versus time after enabling cyclic fuel control. The desired location of catalyst sensor 5 and/or 19 may be determined based upon prior measurements of temperature versus time characteristics as measured in known reference versions of degraded catalytic converters 10 or 22. Such reference converters may be measured during conditions, such as, following both engine cold starting and after controlled changes in air-fuel ratio conditions after enabling rich-lean cyclic fuel control.

Magnitudes of the air-fuel ratio deviations from stoichiometric may be controlled by, for example, by use of calibrated or predetermined multipliers for modifying the fuel injection time period or fuel injection quantity of each respective engine cylinder. These multipliers are stored in ECU 7 memory and selected as a function of present and past ECU 7 input parameters such as catalyst element temperature, coolant and air inlet temperature, load, engine speed and ECU 7 generated time dependent values resulting from these parameters, like catalyst condition and heating rates. Sensors, such as 17 and/or 28, may also be used, together with 5 and/or 19, in selecting magnitudes of the engine's exhaust air-fuel ratio fluctuation levels entering the catalyst to generate chemical heating energy and also to adjust fuel injection quantities during engine load transients. Such requirements may be calibrated for each engine design configuration and stored in ECU 7 memory for fuel control temperature compensation. Air pollutants can be minimized by selecting the engine and vehicle operating conditions for initiating cyclic fuel control and the resulting magnitudes of the air-fuel fluctuations so that most CO, HC and nitrogen oxide gases may be oxidized before exiting the last catalytic converter's outlet into tailpipe 18.

Both the monitored target catalyst's (1, 2 or 16) average time rate of temperature change and the maximum temperature change occurring since the initiation of fuel rate cycling may be measured by the ECU 7 after, for example, a calibrated or predetermined time period to account for the system's thermal lag. Alternately, ECU 7 may monitor the rate of catalyst temperature change to determine when magnitudes of catalyst exothermic heating have changed significantly following changes in engine fuel control such as is shown by the area 234I in FIG. 2. Similar temperature change characteristics may also be measured after disabling rich-lean cyclic fuel control for ECU 7 to further improve catalytic converter diagnostics accuracy. Temperature characteristics from sensors 5 and/or 19 together with ECU 7 generated time dependant characteristics, such as their first and second derivatives of temperature versus time, may then be compared to respective values obtained from previously measured reference catalytic converters and stored in ECU 7 memory. Referring to FIG. 2, the rate of catalyst temperature change versus time increases significantly near the inflection point at a time indicated by 234I as a result of rich-lean A/F cycling conditions at the catalyst surfaces. ECU 7 may then generate a comparison catalyst temperature characteristic profile based upon measured values from the monitored catalyst 10 and/or 22 temperature characteristics obtained during the two steady state conditions monitored with differing magnitudes of exhaust gases' concentrations.

These comparison catalyst temperature characteristic profiles may then be compared to reference catalytic converters measured during similar steady state conditions representative of the two states using differing magnitudes of exhaust gases' concentrations comparable with those measured on the target catalyst. Such ECU 7 stored comparison values and thresholds may be obtained, for example, from prior measurements of known representative degraded reference catalysts selected to be at a defined threshold level of gas conversion effectiveness with similar air-fuel ratio fluctuations or theoretical derivation. The stored thresholds may be functions of the actual engine 6 operating conditions based upon ECU 7 input parameters such as speeds, temperatures and load. Both the magnitude and frequency of the air-fuel ratio perturbations from stoichiometric conditions flowing into the said catalyst may be selected from stored values in ECU 7 memory depending on past and present ECU 7 input operating parameters. These values are preferably selected to also simultaneously minimize concentrations of CO, HC and nitrogen oxide gases exiting tailpipe 18. Maximum and minimum changes in catalyst temperature, induced by rich-lean cyclic fuel control, may be determined based upon measured temperature characteristics of both good and marginally effective catalytic converters.

Catalyst element design and sensor location are selected to provide, for example, a catalyst delta temperature change following rich-lean cyclic fuel control, with a catalytic converter at the low efficiency limit, to have measured values that may provide reliable levels of discernment of catalyst malfunction during normal engine operation. Selection of a consistent minimum value of unacceptable, degraded catalyst temperature change, for example, at least 40° C. below those when using a catalytic converter with adequate gas conversion efficiency performance, will depend on many engine design factors and must be evaluated for each systems configuration. Comparisons of measured values from the monitored catalyst 10 and/or 22 temperature characteristics, between the two steady state conditions with different magnitudes of exhaust gases' concentrations, may then be compared to associated pre-defined reference characteristics stored in ECU 7 memory for determining indications of catalytic converter malfunctions.

One or more checks may be performed on the catalyst, to verify malfunctioning under various engine operational conditions and then may be combined with other ECU 7 generated inputs from other catalyst diagnostic tests, such as catalyst cold start temperature characteristics, before a catalyst state malfunction indicator 20 is activated. A catalyst malfunction indicator may also be activated based upon only comparing the relationship between the actual catalyst temperature measurements and ECU 7 stored characteristics under certain conditions. Indicator 20 activation may be accomplished by, for example, updating the magnitude of a catalyst diagnostic flag counter value stored in the ECU 7 memory with a value determined by comparison of monitored temperature characteristics from sensors 5 and/or 19 to pre-defined reference characteristics stored in ECU 7 memory. A catalyst malfunction indicator 20, such as a diagnostic error code stored in ECU 7 memory, may be activated when the catalyst diagnostic flag counter value reaches a predetermined value for each of the specific environmental conditions, engine and exhaust system design configurations.

Location of sensors 5 and/or 19 plus design factors, such as length, orientation and volume of the catalyst elements to be monitored, are together selected to provide a close correlation between the actual measured overall catalytic converter's gas conversion (chemical) efficiency with its temperature profile characteristics following specified test conditions. These test conditions may include the following engine operating conditions: 1.) initiation of detected catalyst exothermic heating after a cold start and, 2.) a step change in exhaust gas concentrations such as $NO_x$ or CO and oxygen. The present invention allows the use of a single catalyst temperature sensor when the design of the engine and catalyst system is easily reconfigured. Multiple sensors such as 5 and 19 may also be used, when desired, if some vehicle requirements place restrictions on catalyst and sensor design configurations, such as vehicle-engine packaging issues.

Temperature sensor location is also selected to correlate the temperature change characteristics caused by enabling cyclic fuel control with a defined level of catalyst activity degradation necessitating catalytic converter replacement. Sensor 5 and/or 19 may be placed near the gas exit for one of the properly designed catalyst elements (1, 16, 2, 3, etc.) to allow discernment of when the overall catalytic converter's efficiency falls below a defined threshold. The sensor's location 5 and/or 19 are selected so it may monitor catalytic conversion efficiency during conditions, such as, transient warm-up after cold engine starting as well as changes in catalyst temperature characteristics for new and marginal performing catalysts after enabling rich-lean cycling conditions. The selected location of sensor 5 and/or 19 also partially determines the magnitude of temperature change that occurs from a catalyst with unacceptable conversion efficiency after cyclic fuel control modulation is enabled or disabled. Sensor location and catalyst design, for example, are preferably selected to allow monitoring for determining whether the catalytic converter's performance is at malfunction limits based upon actual testing with known reference components having degraded levels of the overall conversion efficiency.

Normal engine operation causes a gradual degradation of the catalyst's gas chemical conversion activity due to high operating temperatures and contamination of the catalyst metals. The changes in the catalytic converter temperature, caused by exothermic reaction at the catalytic surface areas, decrease as the catalyst's performance degrades. The volume, and particularly the length, of the catalyst element in the direction of the gas flow are preferably selected to provide a good correlation between the monitored catalyst element's outlet gas temperature change characteristics, after enabling and disabling cyclic fuel control, and the overall level of catalytic conversion capability.

Magnitudes of catalyst temperature increases can be controlled between 20-250° C. by the use of various methods for controlling exhaust gas concentration disclosed in this invention, when applied to a properly functioning catalytic converter. Rapidly inducing a catalyst temperature change of this magnitude reduces the potential for incorrect catalyst efficiency detection caused by varying engine operational conditions. Normal engine operation can cause many exhaust gas temperature fluctuations under 40° C. magnitudes that may occur at frequencies below 0.5 Hertz. Controlling large induced catalyst element temperature increases, during appropriately selected, defined test periods, provides decreased sensitivity to such error sources caused by normal engine operation such as transient air-fuel ratio fluctuations.

In the present invention, the time period selected to cycle the exhaust gas air-fuel conditions and cause an elevated catalyst operating temperature may be controlled typically between 10 and 100 seconds, and sometimes longer. The defined time period for catalyst heating depends upon factors such as the response time of the catalyst sensor 5 and/or 19, catalyst element thermal mass characteristics and other engine or vehicle system design characteristics. The duration of the detection period used for diagnosing catalyst efficiency performance is selected to be, for example, a value equal to approximately 400% of the time constant value for the catalyst's temperature sensor. This duration allows the sensor's output to stabilize near a steady state value during catalyst temperature monitoring. With a long monitoring time period and large controlled temperature changes, momentary engine load transients and changes in the temperature sensor's response time characteristics can be less significant sources of measurement errors.

Alternatively, during some engine operational conditions shortening the test period during which controlled catalyst heating causes changes at 5 and/or 19 can also improve diagnostic accuracy when fast responding sensors and catalyst designs are available. Temperature responses at 5 and 19 are significantly affected by both the conductivity and thermal masses of catalysts (1, 2, 16 etc.). It is preferable to use catalytic converter designs having thin walled ceramic and metal catalysts, used for improving rapid heating capabilities. These thin walled catalysts may be incorporated into the design of a system to significantly improve measured temperature response times. This allows controlled catalyst temperature changes to be more readily discerned from temperature fluctuations, such as caused by normal engine operation, and also allow discerning catalyst temperature changes caused by initiation of catalyst exothermic heating after cold start conditions. It is advantageous to use such fast responding sensor and catalyst designs with low thermal mass to improve catalyst heating and diagnostics using methods disclosed within this invention. The specific time duration of the diagnostic period is selected based upon engine, vehicle and the exhaust system's component design characteristics. This monitoring time period may be further reduced when improvements in catalyst sensors 5 and 19 and thermal masses of catalysts (1, 2, 16 etc.), due to the state of art, allow improved system time response characteristics.

ECU 7 uses input results from various diagnostic tests performed to assess the catalytic converters overall conversion efficiency performance, such as from catalyst temperature characteristic profile comparisons resulting from measurements recorded before and after enabling and disabling rich-lean cyclic fuel control. These test results may be preferably combined together with tests measuring a catalyst's warm-up characteristics after an engine cold start to better assess whether the catalytic converter may be malfunctioning. Additional diagnostic testing of catalyst element's $NO_x$ conversion efficiency can also be done to more accurately discern catalytic converter performance characteristics. This is accomplished by incorporating a device on the engine allowing exhaust gases' $NO_x$ to be modified by ECU 7 control. A system device 25 may be included in engine 6 that allows ECU 7 to control residual exhaust gas recirculation levels within a cylinder's intake charge gases.

This may be done by using system device 25 such as a variable valve timing control or an externally mounted exhaust gas recirculation system. With this system device, catalyst input NO levels can be temporarily changed by ECU 7 controlling device 25 to change concentrations of exhaust gases in a cylinder's intake charge gases. Device 25 may include an actuator controlled by ECU 7 to vary a position, for example, of a camshaft or valve controlling the flow of exhaust gases entering the engine's cylinders. This actuator in device 25 may also include a source of internal feedback output to ECU 7 from, for example, an internal sensing device such as a position sensor providing a close estimate of actual device actuator position. ECU 7 may, for example, obtain a direct indication of exhaust gas flow levels into the cylinder from device 25 or calculate exhaust gas levels entering the engine's cylinders. When ECU 7 calculates residual cylinder exhaust gas levels these may be obtained, for example, from the detected actuator position output of device 25 together with various engine operating parameters. These parameters may include values, such as speed and load, that provide indication of operational pressure differences between intake manifold 27 and exhaust manifold 8.

To improve accuracy of such NO efficiency diagnostics, an additional temperature sensor 26, may be placed at the outlet of catalyst element 4 that is preferably designed with precious metals to improve mainly $NO_x$ conversion into nitrogen gas, and thus improve this diagnostic test's accuracy. Enabling and disabling conditions for causing a change in exhaust gas $NO_x$ levels may be selected by ECU 7, based upon engine operational conditions providing consistent catalyst temperature changes, using methods similar to those previously described for catalyst heating changes using rich-lean cyclic fuel control. Specifically, $NO_x$ levels may be temporarily increased by controlling device 25 to decrease residual cylinder intake gases charge levels of exhaust gas recirculation. After modifying exhaust gases levels entering engine 6 cylinders, subsequently recorded values of the resulting catalyst temperature characteristic changes, detected at 5, 19 or 26, may be compared to corresponding reference values stored in ECU 7 memory for providing an indication of $NO_x$ catalyst conversion efficiency.

Alternately, temperature characteristic changes from sensor 5, 19 or 26 can be monitored after device 25 causes a decrease in catalyst exhaust gases $NO_x$ levels by increasing cylinder exhaust gas recirculation quantities into the engine's cylinders. The resulting catalyst temperatures characteristic changes from 5, 19 and 26 may then provide an indication of $NO_x$ catalyst conversion efficiency when exhaust gases concentration changes of $NO_x$ are the only ECU 7 controlled changes caused. These temperature characteristic changes must be first adjusted to compensate for catalyst inlet gas temperature changes caused by modifying intake levels of exhaust gas recirculation quantities into the engine's cylinders so that only temperature changes due to catalyst exothermic energy release are considered. Large controlled changes in NO levels are typically required since heat released during its chemical conversion into $N_2$ gas is low compared to exothermic energy released when forming $H_2O$ from HC or $CO_2$ from CO and oxygen gases. Therefore, it is preferable to select engine operational conditions when HC and CO levels are minimally affected when the selected ECU 7 controlled change in engine out $NO_x$ levels occurs. This can be done in order to improve discernment accuracy of catalyst $NO_x$ conversion efficiency from effects caused by changes in HC and CO gas concentrations during catalyst diagnostics testing.

Compensation of individual cylinder A/F variations from the stoichiometric control point, using a method disclosed later, by modifying magnitudes of closed loop fuel control proportional control steps for individual cylinders may be preferable to provide CO reductions. These CO gas reductions during catalyst $NO_x$ conversion efficiency diagnostics may improve the accuracy of catalyst diagnostics. Preferably, making controlled increases in engine out NO levels can be implemented during conditions of high $NO_x$ catalyst conversion efficiencies, in other portions of the catalytic converter such as catalyst elements 3 and 4, so all toxic NO gases are fully converted to nitrogen gas before exiting the tailpipe 18. Engine power output changes, caused by modifying intake charge levels of exhaust gas recirculation quantities into the engine's cylinders, may preferably be compensated. This may be accomplished by corresponding ECU 7 controlled changes in engine airflow by use of airflow control device 14 so that engine operating conditions remain stable during diagnostic testing. Device 14 can also be used to filter rapidly fluctuating changes in operator power demand by making more gradual changes in controlled levels of engine airflow so diagnostics accuracy may be improved.

Figure 7:
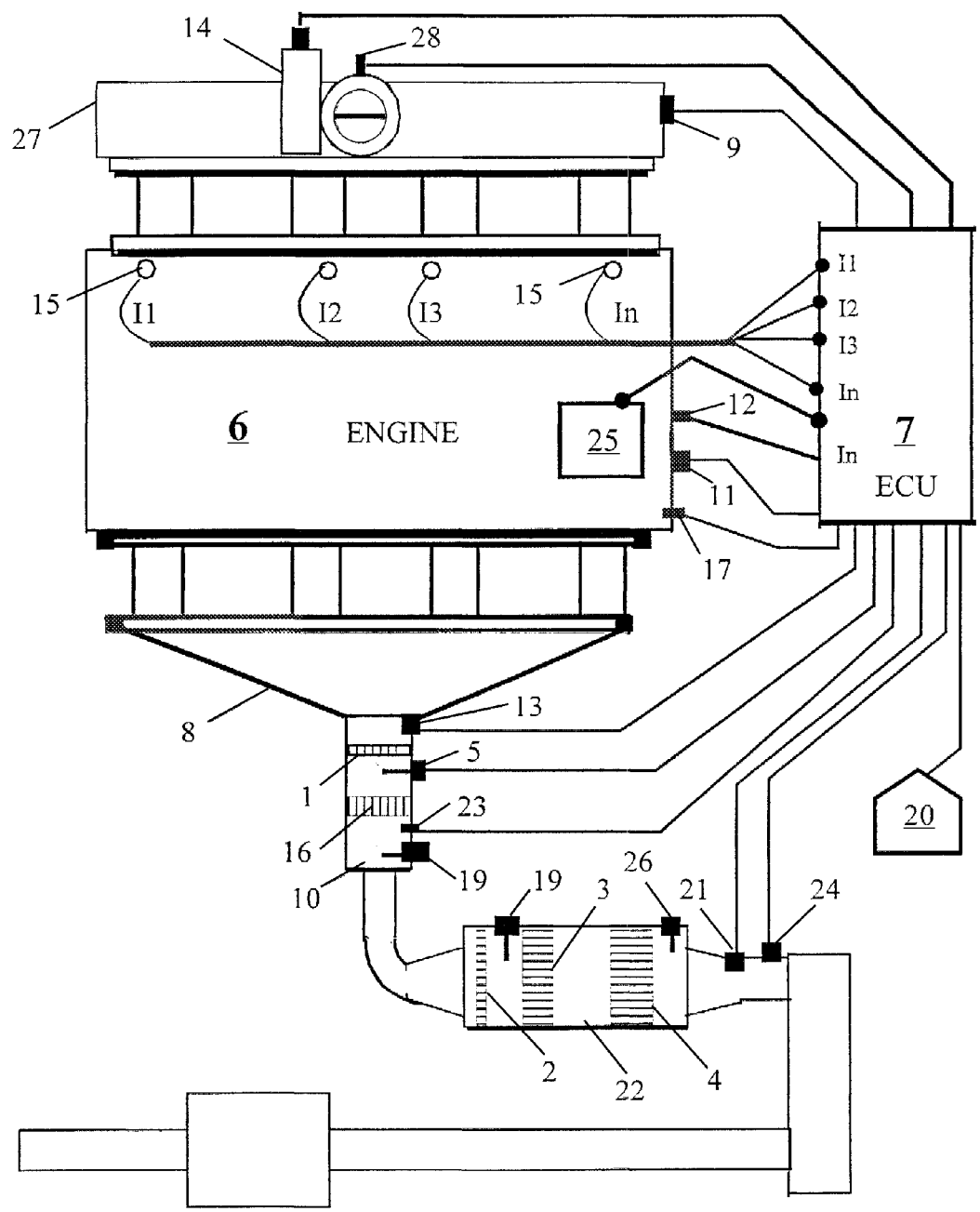
FIG. 7 shows an alternative embodiment having an in-cylinder fuel injection system and using additional exhaust gas sensors 23 and 24 to monitor concentrations of HC or $NO_x$.

Accordingly, using the methods described above, the catalyst's (1, 2, 3, 4, 16) temperature characteristics can be changed and a malfunctioning catalytic converter can be diagnosed by causing consistently controlled changes in the exhaust gases' concentration of CO, HC, $NO_x$ and oxygen entering converters 10 and/or 22. Sensor 5 and/or 19 outputs may provide additional information to ECU 7 regarding the catalyst's warm-up characteristics after an engine cold start to further assess a catalytic converter's overall conversion efficiency performance. Catalyst diagnostic criteria may be modified based upon results of multiple tests such as catalyst temperature characteristics resulting from controlled changes in $NO_x$ levels and after an engine cold start to more accurately assess overall malfunctioning characteristics of the catalytic converter. Estimates of the overall catalytic converter gas conversion efficiency characteristics may also be determined based upon results of multiple diagnostic tests by assessing changes in catalyst temperature characteristics from all the tests and cross correlating such results with other engine parameters also providing data on catalyst related changes. Output of oxygen sensor 13 and 21 may be assessed by ECU 7 to provide another indication of catalyst condition that may be used to modify the overall assessment of catalytic converter condition. In an alternate embodiment, for example, gas sensors as shown in FIG. 7 may be used to provide additional catalytic converter condition diagnostic information. In FIG. 7, one of the differences from FIG. 1 is the added use of gas sensor(s) that may be used for detecting concentrations, for example, of either HC or NO gases and are located at one or both locations indicated by 23 and/or 24. These gas sensors provide the ability to more accurately detect the onset of catalyst exothermic heating and also allow improved diagnosis of catalytic converter efficiency characteristics during both cold start warm-up and steady state engine operation. This may include data from sensors 13 and 21 or by use of gas sensors 23 or 24 as in an alternative embodiment shown in FIG. 7.

A third objective of the present invention is for increasing the rate of catalyst heating after an engine cold start. It is important to allow catalyst heating both during open and closed loop fuel control to allow a catalyst's temperature to reach levels, sufficient to produce sustainable exothermic reactions at its chemically active surfaces, at the earliest possible time. During low temperature operation of the catalytic converters 10 or 22, cyclic fuel control fuel may be used to raise the catalytic converter temperature so it may quickly reach high levels of gas conversion efficiency. Designs of thin walled ceramic and metal catalysts may be incorporated into the catalyst system design to significantly improve rapid heating capabilities and improve measured temperature response times. Doing so allows subsequent controlled catalyst temperature changes to be more readily discerned from temperature fluctuations, such as caused by normal engine operation.

Exothermic catalyst heating can first occur under non-stoichiometric A/F conditions during open loop fuel control when an engine is idling shortly after being cold started. Catalytic converter designs with selected low thermal mass catalyst components can allow heating to high catalyst chemical conversion efficiencies within the first 30 seconds of engine idling after a cold start. Delays of only a few seconds, before a catalyst reaches temperatures sustaining chemical exothermic heating, can cause measurable changes in total air pollutants. This is one advantageous reason for actively detecting the onset of exothermic heating and controlling the magnitudes of rich-lean cycling for most rapid catalyst heating. Actively identifying the initial onset of catalyst exothermic heating and enabling cyclic fuel control during non-stoichiometric operation allows the catalytic converter's temperature to rise to maximum conversion efficiency in a shorter time period after engine starting. Cyclic fuel control can be enabled using adaptively determined rich-lean magnitudes as soon as catalyst exothermic chemical activity is initially detected to accomplish this improvement over other methods.

A catalyst's capability to oxidize gases, for example, does not reach its maximum conversion capability until after the catalyst's temperature exceeds 100° C. for many catalysts. The gases leaving an inactive, or cold, catalytic converter under 100° C. are similar to the exhaust gases that are entering the catalyst from manifold 8 and the engine 6. Preferably, under such low temperature operating conditions, cyclic fuel control can also be used to increase the catalyst's rate of heating or temperature rise by enabling rich-lean cyclic fuel control when the catalyst's surfaces first becomes chemically active. This can be beneficial shortly after engine starting when catalyst temperatures are below normal operating temperature. Cyclic fuel control can be used to heat the catalyst more rapidly after engine starting without the use of an additional electrically or belt driven auxiliary air pump. Air pumps are used for some engines to inject air directly into the exhaust system, at locations such as the exhaust manifold 8 or into the catalytic converters 10 or 22. This injected air provides the necessary oxygen needed to fully oxidize a rich exhaust gas mixture having an excess of CO and hydrogen based fuel molecules. Tailpipe 18 emissions can be reduced significantly by providing excess oxygen to oxidize CO or hydrogen based fuel molecules. There are various methods disclosed in the present invention on ways to provide oxygen to the exhaust gases entering the catalyst, for example, producing changes in catalyst heating rates or improving catalyst efficiency.

The position of the temperature sensor at 5 and/or 19 behind the front surface of the catalyst bed element can be selected to detect a sudden rate of catalyst temperature rise after cold engine starting. In the absence of a significant engine operational condition changes, such as speed or load, a sudden rate change in the catalyst's temperature increase can indicate a higher level of exothermic chemical conversion activity within the catalyst. Engine idle conditions after a cold start provide stable operational conditions where sudden rate changes in a catalyst's temperature characteristics can be used to identify initiation of catalyst exothermic heating activity. This may occur when a cold catalyst reaches its chemical activation temperature, typically above 100° C., when the onset of exothermic catalyst heating first occurs after a cold engine start. Monitoring for the first occurrence of this temperature rate increase, for example, the first and second derivative of temperature versus time from signals of sensor's 5 and/or 19, may provide one of the indications for identifying initiation of catalyst exothermic energy release. Detection of off-idle conditions resulting from operator power demands, after a cold start, may provide less stable operation where sudden rate changes in a catalyst's temperature characteristics are used to identify initiation of catalyst exothermic heating activity. However temperature modeling algorithms, that provide estimates of catalyst temperature changes, may identify initiation of catalyst exothermic heating activity during off-idle conditions also with appropriate engine control changes.

Estimates from such modeling algorithms are based upon, for example, temperature changes caused by non-exothermic catalyst energy sources from engine 6 heat sources. This heat source is dependent upon various engine parameters such as speed, load, dynamic exhaust A/F ratio conditions, elapsed engine run time after cold start and initial start temperatures. These modeling algorithms accuracy may be improved by using device 14 to filter rapidly fluctuating changes in driver power demands after engine cold starts to improve estimates of expected catalyst temperature. By using ECU 7 control of factors affecting catalyst temperature changes from energy sources not associated with catalyst exothermic heating, some temperature modeling algorithm's accuracy may be improved. Minimizing rapidly fluctuating changes in engine airflow, caused by driver power demands after cold starts, helps to reduce, for example, engine load and exhaust A/F fluctuations that may increase errors in catalyst temperature modeling algorithms.

Driver or engine operator power demands may be filtered by modifying the time rate of changes allowed for electrically controlled engine airflow changes. ECU 7 may accomplish this by, for example, adjusting allowed rate of changes for device 14 to cause more consistent transitions in electrically controlled engine airflow levels than from direct operator control of engine airflow changes. This may be done by, for example, modifying electrically controlled engine airflow level changes, based upon operator power demand changes after cold starts, in order to improve estimates of expected catalyst temperatures without catalyst exothermic heating energy. Initiation of catalyst exothermic heating may then be more accurately identified, for example, by a sudden divergence between this estimate of expected catalyst temperature and actual temperature detected from sensor 5 and/or 19 outputs. Determining catalyst exothermic heating activation based upon temperature estimates using the above described changes to modeling algorithms may provide an improvement over prior methods of activating fuel control of catalyst heating. These prior catalyst temperature estimating methods don't compensate for catalyst deterioration and real world conditions, such as water condensation on the catalyst's surfaces, when determining the time for activating fuel control methods of catalyst heating.

Methods of actively detecting the conditions indicating onset of sustainable catalyst exothermic heating are especially advantageous because of the significant changes in these conditions during an automobile's lifetime. Such active detection methods are particularly advantageous when an engine is cold started and run for only a short time period so the engine and catalyst temperature may be in a transient thermal state. Upon restarting the engine, it may be difficult for ECU 7 to estimate catalyst temperature due to many non-measurable environmental parameters and because the duration of time, when the engine 6 is temporarily not operating, may also be unknown. Active detection of catalyst exothermic heating based upon, for example, use of sensor 5 and/or 19 outputs provides a direct determination of whether additional catalyst heating is required to reach maximum catalyst conversion efficiency.

Temperatures measured at the onset of catalyst exothermic heating vary over a wide range during the vehicle's lifetime. Actively sensing of initiation of catalyst chemical activity allows tailoring fuel control techniques to present catalyst conditions for more effective, rapid heating so total air pollutants can be reduced. Active sensing also prevents activating fuel changes for catalyst heating too early, before the catalyst has reached sufficient temperatures to allow use of more effective fuel control heating methods. It also prevents enabling heating too late by detecting the actual time catalyst has reached conditions sustaining exothermic chemical activation. Initiating catalyst heating after actively detecting the onset of catalyst exothermic heating and then tailoring fuel changes based on detected catalyst conditions are particularly unique differences from more delayed, less effective heating methods of the past. Most prior methods significantly delay start of heating by using enabling criteria such as predefined time periods after an engine cold start or by use of fixed temperature thresholds not accurately detecting actual catalyst exothermic activity. Activating catalyst heating during the period of open loop fuel control operation, prior to enabling closed loop fuel control, is particularly advantageous in reducing tailpipe emissions.

Figure 4A:
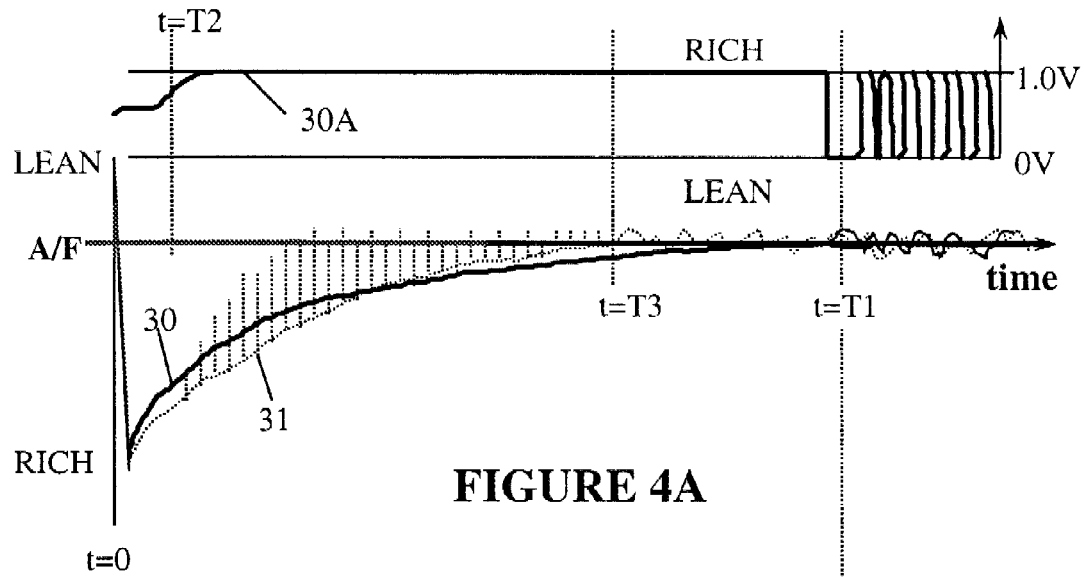
FIG. 4A shows a comparison of the exhaust A/F ratio characteristics of a typical engine in the solid line versus those of the stated invention shown in the dotted line using early A/F cycling caused by enabling cyclic fuel control during open loop fuel engine operation, according to one preferred embodiment of the present invention. Corresponding oxygen sensor output, shown in the bold solid line, illustrate characteristics resulting from exhaust A/F ratio characteristics of an engine in the solid line as controlled by prior methods. These exhaust A/F ratio characteristics are shown as they appear entering the catalytic converter following cold engine starting.

One preferred catalyst heating fuel control method is modifying each individual cylinder's operation to induce rich-lean cycling for creating changes in of individual exhaust gases concentrations, such as CO and oxygen, that can improve heating of catalytic converters 10 and 22. Typically, an engine is operated at conditions richer than stoichiometric during open loop fuel control shortly after a cold start to assure smooth and stable operation while the combustion chamber warms. FIG. 4A illustrates typical catalyst input A/F characteristics, as shown in solid line curve 30, during engine idle conditions after an engine is started cold at time t=0, Solid line 30 in FIG. 4A shows catalyst input A/F conditions versus time after a typical engine start having gradually decreasing rich air-fuel ratio characteristics after cold engine starting until closed loop fuel control is activated at time t=T1. The switching oxygen sensor 13 output voltage shown in curve 30A represents corresponding response to typical cold start A/F characteristics using typical prior fuel control methods associated with solid A/F ratio curve 30. While the exhaust A/F ratio is rich during open loop fuel control, a zirconia, switching type oxygen sensor's output from sensor 13 and/or 21 is saturated at a high voltage indicating rich A/F conditions as shown in 30A of FIG. 4A prior to time t=T1.

Curve 30 in FIG. 4A, prior to time T1, illustrates the non-toggling operation of an oxygen sensor typical of cold start fuel control methods taught previously. Alternately, an oxygen sensor's output may still be inactive during open loop fuel control, due to an insufficient operating temperature, as indicated by an output voltage near 0.5 Volts. This sensor inactivity is similar to that shown at time t=0 in curves 30A or 31*b*. These conditions prevent A/F ratio fuel control using previous catalyst heating methods that are dependent upon an oxygen sensor's output for closed loop fuel control. Since sensor 13 is saturated rich during initial periods of open loop fuel control prior to time t=T1, as is known by one skilled in the art, such catalyst heating methods that are dependent on closed loop fuel control to speed catalyst heating are also disabled. FIG. 4A illustrates a comparison of the exhaust A/F ratio characteristics of the claimed invention, using the dotted curve 31 with early A/F cycling enabled at time t=T2, versus those of typical engine control methods shown in the solid line curve 30. There are significant differences between curves 30 and 31. Dotted curve 31 shows brief lean A/F transients of increasing magnitude beginning at time t=T2 when cyclic fuel control is enabled. FIG. 4A shows curve 31 superimposed on curve 30 catalyst input A/F characteristics to illustrate the richer cold start A/F ratio and brief lean transients commanded by ECU 7 during cyclic fuel control. These individual cylinder cyclic fuel control changes shown in curve 31 are used to increase catalyst heating rates versus those depicted in curve 30. Curve 30 shows catalyst input A/F characteristics that are typically found using some previous fuel control methods for catalyst heating.

Figure 4B:
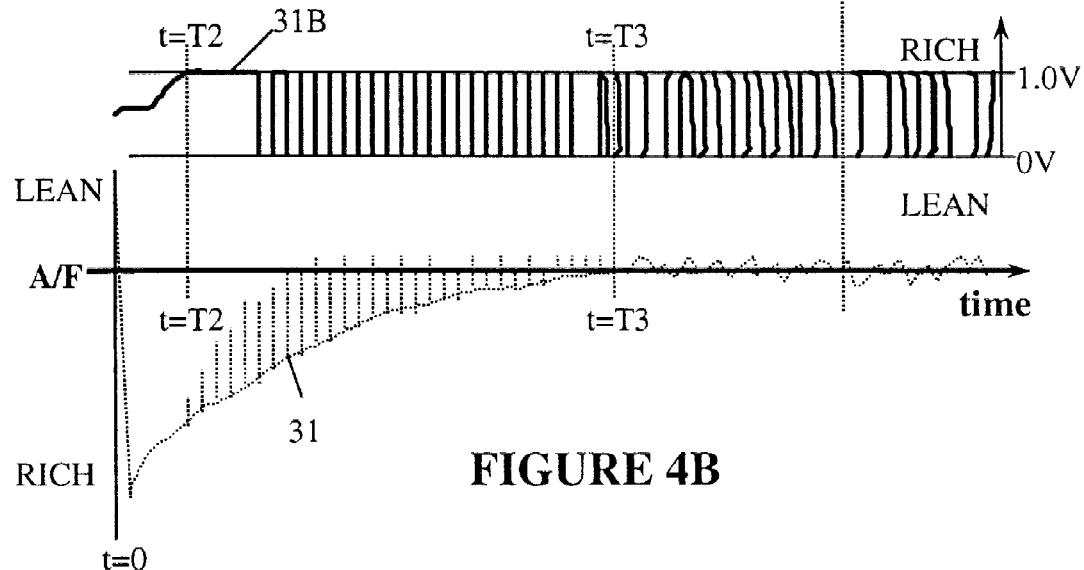
FIG. 4B shows only the exhaust A/F ratio characteristics of the stated invention shown in the dotted line using early A/F cycling caused by enabling cyclic fuel control during open loop fuel engine operation versus the corresponding oxygen sensor output in the bold solid line using, according to one preferred embodiment of the present invention. These exhaust A/F ratio characteristics are shown as they appear entering the catalytic converter following cold engine starting.

For further clarity, FIG. 4B shows only the exhaust A/F ratio characteristics of the claimed invention. FIG. 4B shows the same dotted line curve 31, as shown in FIG. 4A, with A/F cycling enabled at time t=T2 and corresponding oxygen sensor 13 output voltage shown in 31B associated with A/F ratio curve 31 based upon the present invention's method of cold start fuel control. The oxygen sensor 13 output toggling, occurring shortly after time t=T2 in FIG. 4B, is caused by enabling cyclic fuel control that causes brief lean A/F fluctuations about stoichiometric during open loop fuel engine operation and provides oxygen to the catalyst. In FIG. 4B cyclic fuel control may also be enabled before actual ECU 7 detection for onset of catalyst exothermic heating, such as by use engine parameters providing good correlation with heating onset. This can be done by, for example, correlating detected conditions of catalyst exothermic heating initiation with past and present outputs of catalyst temperature sensors 5 and/or 19 during prior cold starts.

Early enabling of cyclic fuel control with gradually increasing lean magnitudes is based upon, for example, outputs of sensors 5 and/or 19 during prior measurements of cold engine start conditions, that are stored in ECU 7 memory. The ECU 7 stored values for determining cyclic fuel control enabling conditions and fuel control characteristics for subsequent starts are determined from various engine parameters, for example, prior determinations of initiation of catalyst exothermic heating. Stored values for these enabling and control characteristics may be updated in ECU 7 memory characteristic maps based upon each acceptable prior engine start measurements. Under some conditions it may also be desired to enable catalyst heating after a specified change in at least one engine control parameter, such as engine run time or catalyst temperature, following actual determination for initiation of catalyst chemical exothermic activity. The ECU 7 stored values may also provide an initial cyclic fuel control characteristics from previously stored values for controlling injectors based upon present engine parameters. This allows tailoring early cyclic fuel control characteristics to the engine and catalyst's present capabilities based upon previously determined values.

The gradually increasing magnitudes of brief lean transients in curve 31, as shown in FIG. 4B beginning shortly after time t=T2, may be selected from ECU 7 stored calibration values to correspond with detected catalyst condition and temperature characteristics, such as from sensors 5, 9, 11, 19 and/or 17. These values may be selected by ECU 7 from stored memory characteristic maps based on ECU 7 input parameters. Detecting the onset of sustainable catalyst exothermic heating provides the earliest indication of when to activate a modified cyclic fuel control method for further accelerating catalyst heating rates. Effects of early catalyst heating on exhaust air-fuel ratios are shown in the dotted line curve 31 of FIG. 4B when cyclic fuel control is activated at time t=T2. ECU 7 controls selected operating cylinders to cause exhaust gas A/F characteristics to briefly cycle lean about stoichiometric, from predominantly rich cold start conditions, beginning at time t=T2. Cyclic fuel control causes these brief lean excursions, due to ECU 7 selected cylinders being operated lean shortly after exothermic catalyst heating is detected after cold engine starting. This may be done, for example, by controlling a group of consecutive cylinders to operate lean while inertia from an engine's flywheel prevents any significant loss in engine rotational speed. These brief lean A/F excursions, caused by cyclic fuel control, may also provide a method to cycle the oxygen sensor's output during rich cold start operation.

Early toggling of oxygen sensor 13 and/or 21, from their typical rich saturated state following cold engine starts, can be advantageous for providing additional information confirming initiation of catalyst chemical conversion. This early toggling of sensors 13 and/or 21, during open loop fuel control, that provides data confirming initiation of catalyst exothermic heating, is only possible because of controlling brief lean A/F excursions into the catalyst during otherwise predominantly rich cold start operation. Catalyst input A/F conditions after an engine cold start, when using previous fuel control methods, are saturated rich as shown by 30A in FIG. 4A. The oxygen sensor's output shown in 30A corresponds to exhaust A/F ratio conditions shown in curve 30, almost until time t=T1 as is known by one skilled in the art. Prior teachings using fuel control methods, dependent on closed loop fuel control or sensor 13 toggling high or low, are therefore also not operational until time t=T1.

Depending on sensor 13 for controlling fuel changes for catalyst heating thereby significantly delays start of rapid exothermic catalyst heating. More rapid catalyst heating using cyclic fuel control may also enable earlier closed loop fuel control operation beginning at time t=T3 as shown in curve 31 of FIG. 4B, corresponding to the beginning of sensor 13 cycling depicted in curve 31b. In comparison, some typical prior fuel control methods of catalyst heating, dependent on closed loop control, must wait until time t=T1 as shown in curve 30 of FIG. 4A. Depending on sensor 13 toggling for prior catalyst fuel control heating methods, cause a significant delay from time t=T3 before any heating improvements from fuel control changes are possible. This is shown by the time difference between time t=T1 and time t=T3 that is provided by the present invention's method of fuel control during open loop fuel control. Spark ignition timing retard may be reduced beginning at time t=T3 for improving fuel economy due to early and higher rates of catalyst exothermic heating provided by cyclic fuel control shown in curve 31. Typically, the energy released during catalyst exothermic heating may be more than double the heating energy available from retarded ignition timing.

A difference in the switching characteristics between sensors 13 and 21, as previously taught, can be applied for confirming initiation of chemical conversion within parts of the catalyst primarily due to enabling rich-lean cyclic fuel control shortly after engine cold starting. Rich-lean exhaust A/F cycling during open loop engine control may allow the oxygen sensors to toggle momentarily during predominantly rich exhaust conditions after cold starts. Therefore, ECU 7 may detect sensor 13 and 21 switching characteristics for determining catalyst activity. This is only possible during rich cold start conditions because cyclic fuel control controls selected cylinders to operate lean enough to toggle oxygen sensors 13 and/or 21 from their typical conditions using prior methods having a rich output voltage state. Detection of catalyst activity from oxygen sensor 13 and 21 may thus provide another method for confirming initiation of catalyst activity during rich cold start conditions.

In an alternative embodiment of this invention using an engine equipped with an in-cylinder injection system, ECU 7 may also control exhaust gas excursions to be briefly rich when the engine is normally operated leaner than stoichiometric after cold start operation. FIG. 7 shows another system useful in this embodiment. Gas sensors with the capability of detecting changes in concentrations of HC or $NO_x$ gases occurring as the catalyst's conversion efficiency increases after a cold engine start may also be used to detect or confirm initiation of exothermic activity. A sudden decrease in detected gas concentrations of HC or $NO_x$ by gas sensor 23 and/or 24 (as shown in FIG. 7) may provide indication of increasing catalyst conversion efficiency after initiation of chemical exothermic heating begins. Sensor 23 and/or 24 can also provide additional inputs to ECU 7 for making more accurate assessments of overall catalytic converter condition. These concepts are expanded further below in the detailed description as another embodiment of this invention.

Selecting catalytic converter designs having catalyst elements with thin walled ceramic and metal catalyst elements provide a preferable configuration for detecting the first occurrence of chemical exothermic catalyst heating with temperature sensor at 5 and/or 19. A number of methods for detecting these first occurrences of chemical exothermic catalyst heating have been already briefly described, and will be further described with reference to FIG. 5.

Figure 5:
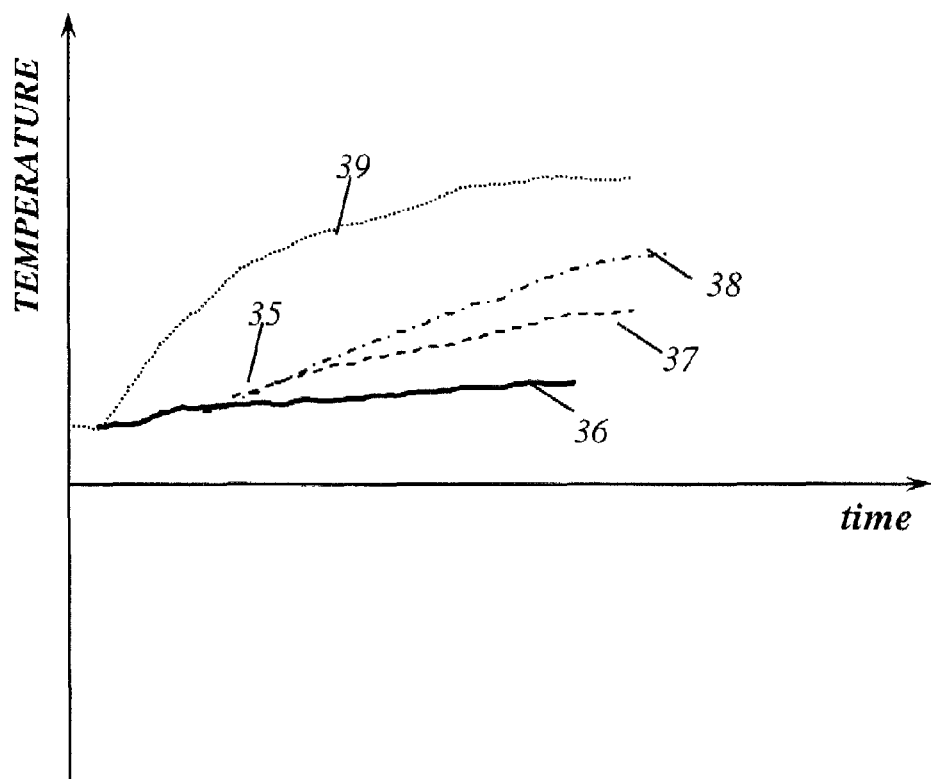
FIG. 5 illustrates a comparison of various catalyst temperature characteristic profiles including initiation of exothermic catalyst heating during engine idle immediately after a cold engine start, according to one preferred embodiment of the present invention.

FIG. 5 illustrates the methods using temperature characteristics from sensor 5 and/or 19. The dotted curve 39 in FIG. 5 shows the temperature of exhaust gases, entering inlet of catalyst 1, 2 or 16, rapidly rising after a cold engine start during idle conditions. This catalyst inlet gases' temperature rise subsequently causes an associated rise in outputs from sensor 5 and/or 19 as shown in curves 36, 37 and 38 that are all depicted versus time on the x-axis of FIG. 5. Solid line curve 37 shows time rate of temperature change characteristics, from catalyst sensor 5 and/or 19, noticeably increasing at point 35 on a vehicle having a normally functioning catalytic converter. Point 35 shows the approximate time when the onset of catalyst chemical exothermic heating first occurs after a cold engine start for curves 37 and 38. A temperature inflection or an increased rate of catalyst temperature rise occurs at point 35, from sensor 5 and/or 19, due to large amounts of chemical exothermic catalyst heating energy being released into exhaust gases. For comparison purposes, curve 36 illustrates a malfunctioning catalytic converter showing a significantly slower rate of temperature rise occurring at point 35 versus curves 37 and 38. No large change or temperature inflection point is apparent on curve 36. The lack of temperature inflection point for this deteriorated catalyst is due to exothermic heating being significantly delayed beyond the time period displayed in FIG. 5 when exothermic heating may later occur. By further comparison, curve 38 illustrates an increased rate of temperature rise, versus curve 37, shortly after point 35 when rich-lean cyclic fuel control is enabled after detecting exothermic catalyst activation as disclosed in this invention. It is the earlier enabling of rich-lean cyclic fuel control for catalyst heating at point 35 of FIG. 5, when exothermic catalyst heating first occurs, that results in catalytic converter heating occurring earlier than was possible with earlier systems and methods.

Detecting initiation of catalyst exothermic heating and then enabling more effective heating methods by fuel control changes in ECU 7 is accomplished by using outputs of sensors 5 and 19, together with other past and present engine control parameters. Both the first and second derivatives of sensors 5 and/or 19 temperature characteristics change significantly near the point 35 with respect to time, as shown in FIG. 5, due to increased rates of exothermic catalyst heating. Catalyst and sensor 5 and/or 19 design characteristics, such as thermal mass, determine the actual delay after point 35 when temperature changes are first detected. The first and second derivative values are also preferably used with other engine control parameters in discerning the onset of exothermic heating. It is preferable to use the minimum value of the delta time differentiation period for establishing the first and second derivative values while still producing consistent measurements. Alternate methods of confirming initiation of catalyst chemical exothermic activity may include use of sensor 13 and 21 or gas sensors at 23 or 24 as shown in FIG. 7. Selection of design for the catalytic converter configuration at 10 or 22, catalyst temperature sensor 5 and/or 19 and their design locations may be chosen to improve identification of initiation of exothermic heating after cold starting and overall diagnostics testing measurement accuracy in determining a malfunction condition.

The level of excess CO and oxygen due to non-stoichiometric operation during cyclic fuel control may also be adaptively controlled to match the ability of the warm active portions of the catalyst to fully oxidize the gases into non-toxic forms. This may be accomplished by adjusting the magnitudes of fuel correction multipliers to selected cylinders. Selected cylinders are controlled for producing lean exhaust A/F conditions and others may be operated richer to speed catalyst heating based upon ECU 7 generated parameters, such as catalyst temperature characteristics, prior misfire detection levels and/or prior diagnostic test results of catalyst condition. Selected engine parameters are then monitored, for example sensors 13 and 21, to determine whether the excess oxygen and CO entering the catalytic converter is being completely consumed before reaching the tailpipe 18 as toxic air pollutants. Alternately the magnitudes of the fuel correction multipliers to individual cylinders may be modified slightly from previous cold start condition in order to determine the effects of the modifications on catalyst temperature rise characteristics. ECU 7 monitors selected engine parameters, for example sensors 5, 13, 19 and/or 21, when enabling cyclic fuel control for catalyst heating in order to determine magnitudes of A/F cycling conditions that prevent gases reaching the tailpipe 18 as toxic air pollutants.

ECU 7 may be used to control magnitudes of the catalyst's inlet air-fuel ratio fluctuations after enabling rich-lean cyclic fuel control by using adaptively calibrated values stored within the ECU 7 memory that are dependent upon engine operating parameters. Enabling criteria and magnitudes of the cyclic fuel control perturbations, when a catalyst's temperature is below 500° C., may be controlled using a calibrated multiplier stored in ECU 7 memory and dependant upon various ECU 7 control parameters. Enabling criteria and magnitudes of the multipliers used for cyclic fuel control rich-lean perturbations from stoichiometric A/F conditions may be selected based upon past and present engine control parameters. These control input parameters, for example, the catalyst temperature 5 and/or 19, coolant temperature 17, load 9, engine speed 11, prior misfire detection levels and first and second derivatives of catalyst temperature characteristics and catalyst exothermic activation temperatures recorded during prior catalyst warm-up phases, may be used to determine ECU 7 control values for individual cylinder fuel changes. Catalyst heating after a cold start using cyclic fuel control is typically disabled once overall catalyst temperatures reach approximately 500° C. Thus, the present invention can be used to quickly heat the catalytic convert adaptively by detecting initial catalyst activation and then tailoring cyclic fuel control characteristics for maximum catalyst heating rates based upon presently detected capabilities. ECU 7 fuel control for improved catalyst heating rates may be based upon continuous measurements of catalytic converter efficiency characteristics. This helps to provide gases' concentration levels tailored to the catalyst's oxidation capacity as the catalyst deteriorates as it ages and thus minimize total air pollutants over the automobile's lifetime. This may be accomplished, for example, by ECU 7 reducing the magnitudes of rich cyclic fuel control cylinders A/F ratios to account for a catalyst that is unable to convert toxic pollutants as effectively as in a new catalytic converter.

Catalyst monitoring may be used to determine the appropriate time for indicating low catalytic efficiency. Malfunctioning may be indicated when changes in the target catalyst's temperature characteristics during specified test conditions differ significantly from associated reference characteristics stored in ECU 7 memory. These stored values are established by test measurements on known reference catalytic converters with unacceptable conversion efficiency. The catalyst diagnostic criteria may also be modified if the catalyst's temperature characteristics, at the time of an initiation of catalysts' 1, 2 or 16 exothermic oxidation reactions following cold engine starting, significantly differ from characteristics stored in ECU 7 memory. Catalyst diagnostic criteria may also be further modified based upon monitoring outputs of oxygen sensors placed before and after catalytic converter 10 or 22 while controlling temporary changes in exhaust gas conditions to provide detectable changes in oxygen sensor 13 and 21 outputs. Accuracy of catalyst efficiency monitoring may be further improved by also considering the maximum measured rates of catalyst temperature rise during heating, both after a cold engine start and after a controlled change in exhaust gas concentrations has occurred.

The time required after a cold start, before exothermic reactions first begin, provides an indication of the catalyst's rate of temperature rise while heating but may not be sufficient in determining a catalytic converter malfunction. Time for a catalyst to reach a specified temperature may not be sufficient to determine a catalyst's condition. Since normal operating conditions may distort diagnostic testing during the inherently transient nature of engine and catalyst warm-up conditions after an engine cold start, such as condensation formation on the catalyst's active surfaces that may delay temperature increases, various methods must be used to confirm a catalytic converter's condition. If condensation formation were the only potential distortion in catalyst diagnostic testing after cold engine starting solutions could be implemented. This may be done by, for example, monitoring the time period when the catalyst temperature sensor remains below 100° C. for extended periods that would indicate potential condensation evaporation. However, other operational conditions may also affect diagnosing catalytic converter malfunctions primarily during transient cold start conditions.

While condensation formation on the catalyst's active surfaces may be more prevalent on close coupled catalytic converters using metal foil catalysts, resolving this issue alone might not assure sufficient catalyst diagnostic accuracy during transient warm-up conditions based on catalyst cold start temperature characteristics alone. Rate of catalyst heating may be advantageously detected in other, more consistent ways, such as from the step change in catalyst temperature characteristic profile following a change when cyclic fuel control is enabled or disabled. This is illustrated by the points 234I and 234P in FIG. 2, resulting from an increased rate of catalyst exothermic heating that may be used to better assess the condition of the catalyst element(s) (1, 2, 16) conditions. Complete catalyst temperature characteristics versus time may be considered as necessary in any evaluation of catalyst condition. Determining catalyst malfunctioning primarily based on cold start temperature characteristics are preferably confirmed by other diagnostic methods previously mentioned in the present invention.

Parameters, such as catalyst temperature characteristics at time of catalyst exothermic heating initiation generated by ECU 7 from outputs of sensor 5 and/or 19, provide inputs for ECU 7 to more accurately detect overall catalytic converter efficiency and determine when converter 10 or 22 is malfunctioning. Another method of determining a catalytic converter's efficiency is by recording a selected catalyst element's temperature versus time characteristics and the required time period after a cold engine start before detecting the onset of exothermic catalyst heating. By comparing these temperature determinations to respective ECU 7 stored characteristics it is claimed to be possible to diagnose catalytic converter malfunctions. Some methods of catalyst diagnosis during cold start have been disclosed in prior patents. However, the method by themselves can provide erroneous results due to normal engine operation such as condensation forming on the catalyst's active surfaces and thereby delaying temperature rise. Both the length of time after start before a catalyst reaches its exothermic activation temperature, and the magnitude of its steady state temperature at initiation of exothermic heating activation following cold engine starting, may provide additional indications of the overall state of a catalyst's conversion efficiency. ECU 7 values of temperature characteristics from sensors 5 and 19 may also stored in ECU 7 memory, from previously recorded engine cold starts for comparison to present characteristics. These provide more specific criteria when exothermic catalyst activity is first expected and thereby may improve discernment of heating onset detection accuracy.

It is preferable to select the location and design of the catalyst temperature sensor, used for the methods disclosed in this invention, to provide consistent measurements over the expected lifetime of catalytic converter or the vehicle. Catalytic converter 10 or 22 design characteristics influence the consistency of temperature measurements as the catalysts deteriorate during aging. Preferably, catalyst design characteristics are modified to improve temperature measurement accuracy and consistency. Various methods of improving catalyst design, such as providing even exhaust gases' flow distribution throughout the catalyst, improve temperature measurement correlation for diagnosing malfunctions or detecting initiation of exothermic heating as the catalyst deteriorates. Sensor 5 and/or 19 are preferably located where catalyst temperature measurements are representative of the overall catalytic converter efficiency characteristics based upon actual evaluations with known degraded reference components. Eliminating uneven flow throughout the catalyst's volume minimizes the potential of portions becoming more chemically inactive before the remaining catalyst volume's surface areas deteriorate. In some unique situations it may be desired to install the catalyst temperature sensor at a catalyst location that prematurely deteriorates due to gas flow maldistribution or contaminants. More uniform gas flow distribution throughout the catalyst reduces the increase in toxic air pollutants as the catalyst ages. The following explains some considerations when selecting the location for the catalyst temperature sensor since each engine configuration is different.

There are a number of factors influencing the actual temperature characteristics when the catalyst's surfaces first become chemically active and begin to produce exothermic heating after a cold engine start. Both the thermal mass of the catalyst element and its level of chemical activity determine the amount of exothermic energy released for heating. The level of exothermic heating typically decreases with engine and catalyst operational life time since the catalyst surfaces become less chemically reactive due to many factors, such as high temperature aging effects and from contaminants in exhaust gases. Surfaces of the catalyst element nearest to manifold 8 are also the first to show decreases in catalyst activity or gas conversion efficiency due to contamination and high temperature deterioration of their catalytic materials. It is due to these factors that sensed absolute temperature values at locations 5 and/or 19, when a catalyst's first sustainable initiation of exothermic heating occurs, tends to increase as a catalyst deteriorates depending on sensor 5 location. The reason for this is as follows.

In a new catalyst, its front surfaces nearest manifold 8 are more chemically active first after a cold start and release greater levels of exothermic energy to heat both front, and rearmost portions of the catalyst volume that are farthest from 8. Therefore, higher temperatures gases at the exothermically active front catalyst surfaces are cooled by temporarily inactive rear portions of a new catalyst and thus lower the measured temperatures at sensors 5 and 19 when sustainable exothermic heating first occurs at front catalyst surfaces nearest 8. Higher temperatures detected at the locations of sensors 5 and/or 19 on catalysts with deteriorated front surfaces, when onset of sustainable exothermic catalyst heating first occurs, are partly due to the first catalyst surfaces providing most of the exothermic heating, effectively having moved rearward. Preferably, the location of the catalyst temperature sensor takes into consideration this rearward motion of the catalyst's volumes center of heating activity to increase correlation between detected temperatures and catalyst diagnosis. Under certain conditions this rearward shift in the catalyst's center of heating may be used advantageously for selecting sensor 5 and/or 19 placement. When, for example, sensor 5 is positioned between 2 catalyst elements, such as 1 and 16 in converter 10, both 1 and 16 can influence the temperatures measured by 5 depending on the proximity of the sensor to each catalyst element. Therefore, it is preferable to place sensor 5 closest to the desired catalyst element providing temperature characteristics correlating to catalytic converter conversion efficiency changes. Maintaining sensor 5 farthest from catalyst elements with temperatures not correlating to converter efficiency reduces temperature measurement distortions by cooler or warmer nearby surfaces. The sensing tip of sensor 5 is preferably located towards the center and rear of the active catalyst's surface. This minimizes cooler outer housing surfaces of catalytic converter 10 or 22 from significantly influencing desired temperature measurements. For example, if a hydrocarbon trap, that produces low exothermic heating, were to be installed in the location shown by 16, sensor 5 should be positioned farthest from the cooler surfaces of this hydrocarbon trap. Conversely, a close proximity of sensor 5 to both catalysts 1 and 16 may be desired when catalyst 16 is selected to have a lower exothermic activation temperature than 1 to improve catalytic converter malfunction diagnosis. Each catalytic converter design selection is unique based upon engine and vehicle considerations. Considering the gradual shifting of the catalyst's center of heating in a rearward direction of exhaust gas flow as the catalytic converter ages allows improved selection of sensor 5 location.

This rearward motion of the initial catalyst heat source location, at the onset of exothermic heating, also requires longer engine operating times since the engine must produce more heat to offset reduced levels of exothermic energy released from the deteriorated front portions of the catalyst nearest manifold 8. It is for these reasons, that the first or second large volume (size ~0.5 liter) catalyst element's 1 or 2 are the preferred location for temperature sensor placements 5 and 19 to monitor the temperature change profile for determining when the catalytic converter performance drops below an acceptable level and requires replacement. Aforementioned considerations and characteristics of catalyst aging are important in selecting the location of the catalyst temperature sensor 5 and/or 19 and catalytic converter design configuration in order to improve catalytic converter diagnostic accuracy and detect initiation of exothermic heating.

One method for determining the gas conversion efficiency of a catalyst would be to use the ECU 7 to measure the initial operating conditions and then compare these values to established reference catalytic converter thresholds stored in memory that provide accurate catalyst monitoring. Catalyst monitoring and heating is performed during stable operating conditions that will provide consistent heating for accurate monitoring. The operating parameters used to establish stable conditions for proper evaluation of catalyst's chemical conversion efficiency include ECU 7 control system inputs for both present and prior vehicle and engine parameters. These parameters may include such values as engine rotational speed via sensor 11, load via sensor 9 output (intake manifold pressure or airflow), exhaust oxygen levels via sensor 13 and/or 21 outputs, inlet air temperature via sensor 28, catalyst temperature via sensor 5 and coolant temperatures via sensor 17, driver airflow demand from device 14 position outputs and vehicle speed. When these operating parameters are within their respective defined ranges, enabling or disabling criteria for cyclic fuel control, such as, the monitored catalyst's initial temperature and time rate of temperature change, may be measured and compared to established ranges also stored in ECU 7 memory to provide consistent catalyst heating.

A fourth objective of the present invention is to integrate methods from the prior 3 objectives together with other synergistic technologies to further improve overall catalytic converter efficiency, such as early heating and catalyst diagnosis accuracy, while maintaining imperceptible changes in engine smoothness. The effectiveness of catalyst heating, caused by cyclically varying the fuel flow being delivered to an engine's cylinders as illustrated in FIG. 3, can be further optimized by adjusting the frequency and magnitude of the rich to lean fuel conditions in selected, adjacent cylinders or cylinder groups. Varying the number of cylinders, that are selected to be grouped together to alternately operate at rich and lean conditions, may allow the cycling exhaust gas conditions to better match the frequency response and oxygen storage characteristics of the catalyst system being heated. The frequency of the rich to lean cycling of exhaust gas conditions from manifold 8 are dependent on both the engine speed and the number of cylinders grouped together that are operated at richer and leaner than stoichiometric requirements. As engine speeds increase this means more cylinders would need to be grouped together in order to maintain a constant frequency of exhaust gas air-fuel ratio cycling.

For example, the frequency of rich to lean cycling at a catalyst's surface could be decreased by a factor of 10. This can be attained, for example, by successively controlling 10 cylinders to be grouped together and operated rich while the subsequent grouping of the next 10 successively firing cylinders are operated lean. These 10 cylinders controlled lean by ECU 7 are then followed by another 10 rich operating cylinders and so forth to reduce the A/F cycling frequency by 10 versus controlling each subsequently firing cylinder to switch between rich and lean. So with this exemplary grouping of 10 cylinders, the air-fuel ratio characteristics at the catalyst would only change every 10 successive cylinder combustion events. Such grouping of successively firing rich and lean cylinders also changes the frequency of engine torque fluctuations. When controlled changes in rich and lean magnitudes deviate significantly from stoichiometric conditions, engine torque fluctuation frequencies may be necessary to be modified. Engine torque fluctuation frequencies may be selected by altering rich and lean cylinder groupings to avoid vehicle body component resonance points. This may sometimes be beneficial so that any resulting vibrations remain imperceptible to vehicle occupants. Preferably, frequency and magnitude of air-fuel ratio cycling may be adjusted to maximize the catalyst temperature rise while minimizing total vehicle HC and CO emission levels from the tailpipe 18 discharge. Typically the range of frequencies of cyclic fuel control of the exhaust gases range from, for example, 0.3 Hz to 120 Hz and may be dependent on both engine and catalytic converter configurations used. Selected frequency conditions are dependent on the available surface area of active catalyst material, catalyst temperatures and other factors. The magnitude of the fluctuations in fuel quantities and the selected groupings of engine cylinders may thus be selected to minimize changes in engine torque so they remain imperceptible to occupants in an automobile.

Another objective of the invention is maintaining smooth engine operation, particularly while improving catalyst performance through ECU 7 control changes. This is particularly useful during catalyst diagnostics or heating operation, so any torque changes are mostly imperceptible to the vehicle's occupants. Perceived torque fluctuations may be minimized by a number of methods. One method is by limiting the changes in fuel quantity delivered to each individual cylinder so they do not deviate outside a typical range of, for example, ~10% to 40% beyond normal stoichiometric fuel conditions. This means that cylinder groups with excess fuel would be less than, for example, 140% of the stoichiometric fuel rate while the cylinders with insufficient fuel would not drop below 60% of stoichiometric requirements. These maximum deviations from stoichiometric are approximate and may be limited by each engine's misfire tolerance, resulting when there is either excessive or insufficient fuel for complete combustion.

Improvements in engine designs, such as high energy ignition and in-cylinder fuel injection systems, may expand the controlled range of allowed exhaust A/F ratios beyond the range without incipient misfire while operating under lean conditions. These engine design improvement allow an extended fuel control range for exhaust A/F ratios, without incipient misfire, to allow engine operation by injecting a fuel quantity, for example, approximately 60% of stoichiometric operation and therefore increase control flexibility or increase the effective catalyst heating rates possible. Range of lean engine operation can be extended to over 40 A/F without misfire by the use of in-cylinder fuel injection systems, thereby significantly increasing the available oxygen levels to the catalyst when rich-lean cyclic fuel control is enabled. Extending the lean misfire limits of the engine is particularly advantageous for early catalyst heating, after cold starts, when cyclic fuel control can be used to cycle A/F conditions about stoichiometric values from typically rich conditions. Both the magnitudes and frequencies of the engine cylinders' exhaust air-fuel ratio fluctuations for assisting cold catalyst heating may be selected from stored values in ECU 7 memory, which may depend on past and present operating parameters to minimize tailpipe 18 emissions. Cyclic fuel control enabling thresholds plus magnitudes and frequency of the air-fuel ratio perturbations may be modified as the catalyst's performance degrades, based upon ECU 7 adaptively providing appropriate cyclic fuel control fuel quantities for engine and catalyst conditions based upon values stored in memory.

Another method of improving engine smoothness is by controlling the frequency of any engine torque fluctuations in a predetermined manner. Controlling engine torque fluctuation frequency is important because certain vehicle design characteristics, such as body structure rigidity and mass, can cause certain torque frequencies to result in vehicle components' resonant conditions that significantly amplify engine vibration levels. Such resonant vehicle components' frequencies may be avoided by modifying the frequency of rich to lean cylinder cycling to vary torque fluctuation frequencies and thereby improve perceived engine smoothness. When the effect of such changes on a catalytic converter's conversion efficiency is acceptable, this rich-lean cycling frequency can be optimized to also improve engine smoothness. It's also possible to change the frequency of rich-lean air-fuel cycling over time when this can enhance perceived engine smoothness. Additional methods of improving perceived engine smoothness include may be found in prior teachings. For example, one such method is use of spark ignition timing to dynamically compensate individual engine cylinders for torque changes caused when operating this cylinder significantly outside stoichiometric fuel requirements.

Another method according to the present invention is to gradually transition controlled fuel changes of individual cylinders from or to a defined A/F levels, for example stoichiometric conditions, when enabling or disabling rich-lean cycling, by distributing the initial magnitude of the fuel quantity change over a number of cylinder firing events. This helps to minimize step changes in overall engine torque levels. This can be accomplished by controlling cylinder events near transition points between groupings of rich and lean cylinders to distribute the maximum rich-lean change magnitude's effect on engine torque over more than 2 cylinder events. For example, with a grouping of 10 rich and 10 lean cylinders, the 3 rich cylinder combustion events occurring prior to a lean transition can have rich correction multiplier magnitudes approaching stoichiometric. Similarly, the first 3 cylinders in the lean cylinder group would have lean correction multipliers starting near 1.0, or stoichiometric levels, and then gradually decreasing to the commanded lean multiplier value for the lean group of cylinders. This would then distribute the engine torque change caused by the transition between rich and lean cylinder group operation to be spread over a total of 6 cylinder combustion events.

Grouping selected individual cylinders to be controlled rich and lean also provides an advantageous method to synchronize each measured change in the oxygen sensor 13 output with the respective prior controlled cylinder event causing this rich-lean A/F change. Synchronizing the oxygen sensor 13 output change to each individual cylinder event causing the sensor 13 output change is required for the transient cyclic fuel control method discussed below. Such synchronization is also advantageous to provide compensation for steady state closed loop control A/F fluctuations caused by variations due to individual cylinders' injector or air flows. For example, closed loop control A/F fluctuations from the stoichiometric control point caused by individual injector 15 flow variations, due to factors such as degradation and manufacturing tolerances, can thus be reduced to improve catalytic converter efficiency. Synchronization of the sensor 13 output to each individual cylinder operation allows each injector's 15 flow quantity to be adjusted closer to the stoichiometric control point.

Using the previously explained grouping technique, during rich-lean cyclic fuel control, a method to synchronize cylinder operation with output voltage changes from sensor 13 by only using a switching type oxygen sensor is provided. It is particularly advantageous to be able to provide synchronization with only a switching type oxygen sensor as compared to other methods requiring more costly wide range linear type oxygen sensors. Distinctly controlled lean-rich transitions, provides a method of direct correlation between sensor 13 output voltage and the identification of the correct individual cylinder causing the sensor output change. Sensor 13 output voltage changes, caused by the subsequent exhaust gas lean-rich A/F ratio transition from cyclic fuel control being enabled, thereby allows ECU 7 a direct method of determining the delay between a sensor 13 output change and a suitable reference point within the engine's combustion cycle. Such reference points may be either a specified engine crankshaft position or fuel injection and combustion events. Selecting magnitudes for rich and lean cylinders A/F having a deviation from stoichiometric conditions, greater than most normal exhaust gas A/F fluctuations, allows increased assurance that subsequent sensor 13 changes are solely due to rich-lean cycling.

ECU 7 can select cylinder groupings during lean-rich cyclic fuel control so that each individual injector's effect on sensor 13 may be discerned from the lean-rich A/F transition. By advantageously using large magnitudes of controlled exhaust A/F fluctuations, exceeding all normal A/F variations, sensor 13 and 21 output change synchronization to individual cylinder events may be done without requiring a linear type oxygen sensor necessary in prior teachings. This may be done, for example, by ECU 7 calculating actual crankshaft angle and time delays between a defined reference point in each cylinder's combustion event and determining when such combustion gases may be first entering manifold 8. ECU 7 may obtain this by determining actual exhaust valve timing or using engine design characteristics stored in memory. The resulting time difference, between when such combustion gases are first entering manifold 8 until the time when they cause a resulting change in sensor 13 output, determines the time response characteristic of sensor 13.

Sensor 13 may then be used to directly measure A/F changes from combustion gases caused by the corresponding prior change in an individual cylinder's fuel quantity. Actual sensor 13 delays may be determined by comparing timing of measured sensor 13 output changes with the expected timing of a cylinder's combustion products entering manifold 8. A cylinder's combustion products entering manifold 8 depend upon actual exhaust valve timing control characteristics, such as when using an electronic control device 25, that ECU 7 may determine. ECU 7 determines close estimates of anticipated timing of exhaust gas A/F changes at sensor 13 location based upon known parameters, such as calibrated values stored in memory and/or actual exhaust valve timing control set points stored in memory. Sensor 13 output response delay may then calculated based upon the difference between this anticipated timing of exhaust gas A/F change due to an exhaust valves opening into manifold 8 and actual measured electrical output changes.

Under many conditions it is preferable to measure oxygen sensor 13 response changes during lean to rich transitions. Here, the response time referred to is the actual time delay between cylinder output gases entering into manifold 8 and being detected by a sensor 13, such as by an output voltage response change. This differs from the engine cycle delay caused by the engine's intake, compression, ignition and exhaust strokes plus instantaneous valve timing characteristics that can be readily determined, for example, in engine crankshaft degrees based upon outputs of sensors 11 and 12 together with engine valve timing design characteristics. An oxygen sensor's output voltage lean to rich response time is typically shorter and more consistent than its rich to lean response characteristics. Measured sensor 13 response time delays, from the time exhaust gases enter manifold 8, may be continuously updated during defined monitoring periods and stored in ECU 7 memory, for example, as an average of all cylinders or for each individual cylinder. These averaged or individual cylinder delays may be stored in memory versus selected dependent engine parameter variables for subsequent lookup for future engine control functions. Total delays between sensor 13 output change and selected points in the cylinder's combustion cycle can then be determined from parameters, such as timing of exhaust valve and fuel injection events. In order to more conveniently track the total sensor 13 sampling delay for each cylinder, it's useful to measure the delay in crankshaft angle degrees from a specific timing reference point, such as when the cylinder's piston reaches top dead center (TDC) on the compression stroke. This total sensor 13 sampling feedback delay for each cylinder will be subsequently called $\theta_O$ and will include both the sensor 13 electrical response delay plus the engine cycle delay. This engine cycle delay includes the number of crankshaft rotational degrees after TDC compression before the exhaust valve for the cylinder opens into manifold 8 and may be calculated by ECU 7 from outputs of sensors 11 and 12.

ECU 7 can also convert the measured sensor 13 electrical response time delay into crankshaft angle degrees based upon engine parameters such as rotational speed sensor 11 and load sensor 9 input values when desired. Sensor 13 electrical response time delay is measured between when cylinder output gases enter into manifold 8 and when they are detected by a sensor 13 output voltage response change. Actively detecting oxygen sensor feedback delays $\theta_O$, by monitoring actual values with sensor 13, may improve control stability by partial adaptive compensation. This adaptive compensation partially corrects for such control feedback delays or lags by using ECU 7 measured, correlated and stored delay values. Sampling the oxygen sensor's output at predetermined times or crankshaft angles degrees $\theta_O$ determined from an ECU 7 stored value, may provide a direct indication of sensor 13 changes caused by each individual cylinder's exhaust gas A/F conditions. This may be advantageous and necessary for individual cylinder control during engine transient operation where sensor 13 sampling is required to rapidly reduce A/F fluctuations entering the catalyst as explained later.

The sampling time periods or measurement windows for reading oxygen sensor 13 outputs are, for example, an ECU 7 stored calibrated range of crankshaft degrees, including calibrated periods before and after the feedback delay $\theta_O$, specified in crankshaft angle degrees that includes the measured sensor 13 output voltage response delays. This $\theta_O$ delay determines how long after TDC, or approximately after a cylinder's combustion event, before its resulting gases are exhausted into manifold 8 and detected by sensor 13. The feedback delays $\theta_O$ determines, for example, how long ECU 7 must wait after TDC compression before sampling sensor 13 output, and it also determines when prior cylinder fuel changes are detectable from the oxygen sensor's output. Detecting lean-rich response delays versus engine operating conditions, such as speed sensor 11 and load from sensor 9, may provide ECU 7 a method for adaptive compensation of such factors as engine cycle and sensor 13 response times. ECU 7 stores present and past measured sensor feedback delays $\theta_O$ for selected engine operational conditions and bases future individual cylinder fuel control on appropriately updated values stored in memory. ECU 7 can also determine degradations in sensor 13 response time characteristics by comparing actual measured values of $\theta_O$ delays with predetermined values stored in memory for diagnostic purposes.

Controlling a specified lean-rich A/F changes during normal enabling of cyclic fuel control eliminates requirements for needing more costly, linear oxygen sensors or need for multiple individual oxygen sensors to synchronize each cylinder's gases. Cyclic fuel control operation with groups of cylinders operated lean then rich provide a clear exhaust gas A/F change transition to synchronize sensor 13 response to individual cylinder operation. Actual detection of sensor 13 response delays provides a method for diagnosing the oxygen sensor's condition for ongoing changes caused by engine operational conditions and sensor deterioration. ECU 7 can determine degradation in sensor 13 or 21 by measuring actual delays between a specific cylinder's fuel injection event and the respective oxygen sensor output change. Response time characteristic changes from sensor 13 output voltage, for example, beyond an ECU 7 calibrated range may be used to modify other engine control algorithms using oxygen sensor 13 output or to indicate a malfunction.

Combining various groupings of rich and lean cylinders, while controlling their individual cylinder fuel correction multipliers using ECU 7 selected values, may also provide a wide variety of engine exhaust gas and torque control variations. The selected number of cylinders with rich or lean conditions may also be arranged in symmetric or asymmetric groupings by varying both magnitudes of fuel deviations from stoichiometric conditions and the cylinder groupings with common fuel rates. The average air-fuel ratio of one complete rich-lean exhaust gas cycle of a grouping of cylinders can be controlled at or near stoichiometric conditions during fuel cycling operation. The aggregate engine exhaust air-fuel ratio conditions is maintained close to stoichiometric operation by controlling the average fuel quantity over one complete rich-lean-rich cycle of adjacently firing engine cylinder groups to provide for this result. Sensor 21 can sometimes be used for closed loop feedback fuel control, when cyclic fuel control is enabled and the aggregate of all cylinders is controlled at stoichiometric conditions, to provide improved control stability. Depending on the catalytic converter's oxygen storage capacity and the magnitude of rich-lean A/F cycling from individual cylinders, sensor 21 output may show reduced A/F perturbations as compared to sensor 13 output. Aggregate engine exhaust air-fuel ratio conditions may also be controlled for improved fuel economy by limiting the average fuel rate, among adjacently firing groups of engine cylinders, to be less than stoichiometric fuel conditions when catalyst NOx emissions are of lesser concern. Cyclic fuel control can be used during closed loop fuel control operation by adjusting various ECU 7 control characteristics, such as feedback gain. Alternately, wide range or linear oxygen sensors (UEGO) may be used for 13 or 21 to allow controlling aggregate A/F ratio of an engine's cylinder's cycling between rich and lean at almost any defined A/F control point.

The fifth objective of the present invention is providing methods to improve air-fuel ratio control during transient operating conditions. More accurate A/F control is advantageous so a catalyst can operate closer to stoichiometric levels, for longer periods, where its conversion efficiency is greatest. Cyclic fuel control may be used during most of an engine's operating conditions by control of exhaust A/F cycling magnitudes and frequencies. Preferably, cyclic fuel control characteristics are selected so that closed loop fuel control operation, using modified control characteristics, isn't significantly affected. Cyclic fuel control occurs over short time periods because it only changes a few selected cylinder's fuel injection operations and this is why closed loop fuel control can be not appreciably affected when both systems are enabled. Transient cyclic fuel control may have feedback control gains more than 10 times that of closed loop fuel control, during some engine transient load conditions, since it may be applied only to a few ECU 7 selected cylinders over these brief time periods.

Those skilled in the art are aware that conventional closed loop fuel control methods typically use proportional, integral and derivative (PID control) type fuel corrections based upon feedback from a switching type oxygen sensor that are delivered to all cylinder events. The transient cyclic fuel control method may also use a form of PID control, though on an individual cylinder basis, as explained below.

As previously explained, cyclic fuel control may be used to cause brief lean excursions during rich engine operation, such as after a cold engine start. An earlier example described in FIG. 4B showed how cycling selected engine cylinders lean, shortly after cold starting when a switching type oxygen sensor's output is typically saturated at a richer than stoichiometric condition, can aid catalyst diagnosis and heating. It may also be advantageous to extend the observable range of detected exhaust A/F ratios when using a switching type oxygen sensor at 13 or 21 by controlling select engine cylinders to operate lean during typically rich conditions following an engine load transient. Controlling one or more, selected cylinders to operate significantly lean enough to cause momentary cycling of a rich saturated oxygen sensor's output introduces oxygen to the catalyst to improve CO and HC conversion efficiency. For example during rich exhaust gas conditions, typically following a transient engine load reduction change, it may be advantageous to enable a transient version of cyclic fuel control to quickly cause the oxygen sensor output to toggle lean by using individual cylinder fuel control. What differentiates this fuel control method from prior methods is both using individual cylinder fuel corrections together with a greater control range for magnitudes of the fuel quantity changes. There may also be a higher cycling frequency for these controlled rich-lean fuel changes than normal closed loop fuel control.

Magnitudes of fuel multipliers used to modify injector fuel quantities during transient cyclic fuel control may range from 0 to 1.3 as compared to closed loop fuel correction multipliers that range from 0.9 to 1.1 typically. This larger range of fuel multiplier magnitudes is available since the transient cyclic fuel control (TCFC) correction occurs on only selected individual cylinder injection events after a predefined number of consecutive normal fuel injection events. Using such a modified version of cyclic fuel control allows a switching type oxygen sensor's output signal to be toggled much sooner during transient engine loading changes when the A/F may become too rich. Under some deceleration or over-run engine conditions, typically at higher speeds and light loads where engine output torque is negligible, the levels of fuel delivered to some cylinders may be reduced to zero by using a fuel multiplier near zero. This may be required when the controlled injector opening periods falls into a non-linear range, for example, when A/F control can become erratic as known to one skilled in the art. Causing sensors 13 and/or 21 to toggle during transients causing rich saturation also allows use of the oxygen sensors to determine catalyst oxygen storage levels under some conditions. Outputs of both switching type oxygen sensors at 13 and 21 can then be used for determining dynamic levels of catalyst oxygen storage. Based upon this detected level of catalyst oxygen storage ECU 7 can estimate the number of subsequent cylinders controlled lean and how much leaner than stoichiometric they must be operated for toggling sensor 13 or 21 when it is saturated rich. To improve TCFC compensation it is advantageous to synchronize selected A/F perturbations with the respective engine cylinders' significantly causing rich-lean voltage output changes by sampling sensor 13 after the appropriate feedback delays $\theta_O$ described above.

It may be preferable to use a modified version of cyclic fuel control during engine load transients causing rich operation, detected by oxygen sensor 13 and/or 21, than for lean conditions when $NO_x$ pollution can be more easily controlled in other ways. Some of the reasons for this include the catalyst's oxygen storage ability and fuel economy are both improved when individual cylinders are controlled very lean during rich A/F transients. However, these same benefits are much less significant during the converse type of engine load changes causing lean exhaust gas A/F transients. Engine load transients causing lean conditions at sensor 13 require other methods to compensate for exhaust gas lags that are explained later. These concepts will be better understood by referring to FIG. 6 that illustrates individual cylinder exhaust gas A/F characteristics.

Figure 6:
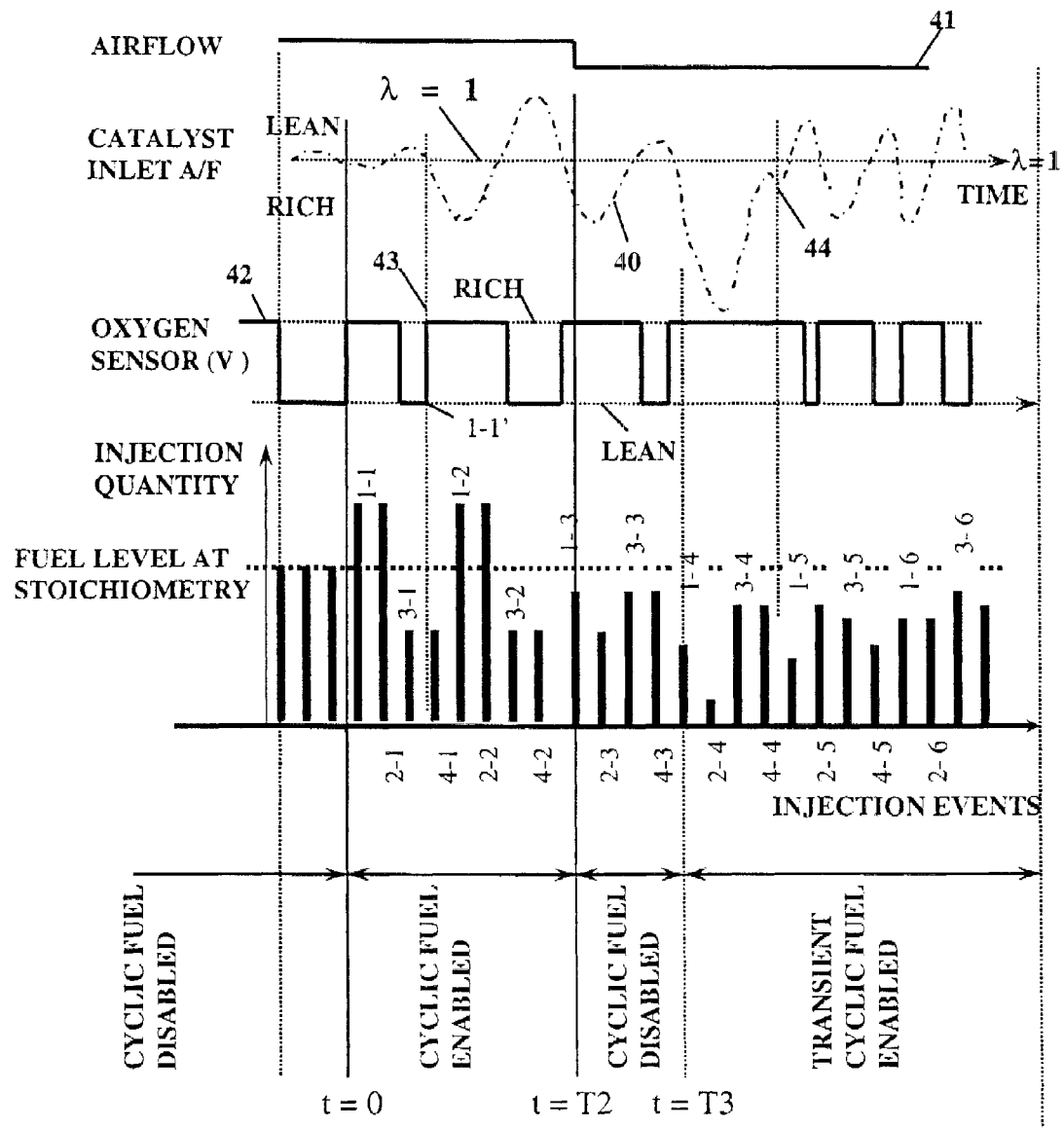
FIG. 6 shows affects of using individual cylinder A/F transient cyclic fuel control on the exhaust A/F ratio characteristics entering a catalytic converter, shown in the dash-dotted line, after a transient load condition caused by a throttle change, according to one preferred embodiment of the present invention.

The following explanation provides an illustrative example of how using transient cyclic fuel control (herein referred to as TCFC) methods improve A/F control by causing large, momentary changes from the stoichiometric levels of fuel quantities delivered to selected individual cylinders. These large, momentary fuel quantity changes may be used to reduce overall exhaust gas A/F fluctuations, during both open and closed loop fuel control, caused by engine transient load changes and thus improve overall catalytic converter efficiency. FIG. 6 illustrates individual cylinder fuel injection events and resulting exhaust gas A/F changes of a typical engine configuration, for example, a 4 cylinder engine using a 4-stroke combustion cycle. FIG. 6 illustrates A/F conditions as measured at, for example, sensor location 13 versus time. An ideal A/F sensor, for ease of illustration purposes, having an instantaneous output A/F response and a response time delay similar to 13 is used for this example. This ideal A/F sensor's output is shown in the dash-dotted line labeled 40 and is compared to the output voltage of a switching type oxygen sensor 13. Sensor 13 voltage output signal is depicted as the square wave signal shown in the bold solid line labeled 42 just below curve 40. An engine load transient occurring at time, t=T2, is depicted by the solid line labeled 41 showing commanded engine airflow levels provided from device 14, such as throttle position sensor's output. Curve 40 shows the air-fuel ratio characteristics of the respective cylinders' exhaust gases' from manifold 8, that subsequently feed into the catalyst element 1, 2 or 16, while the cylinders' input fuel rates are varied. Each of the pulses shown in the bar graph of FIG. 6 represents an individual fuel injector(s) 15 delivering a specified fuel quantity to each engine cylinder. Fuel quantity delivered to each cylinder is indicated by the height of each bar in FIG. 6.

FIG. 6 shows a sequence of ECU 7 controlled events starting at time t=0 when rich-lean cyclic fuel control is enabled. Rich-lean cycling had been enabled at t=0 after a period of normal stoichiometric closed loop fuel control operation prior to time t=0. At a time t=T2 a load change indicated by 41 causes cyclic fuel control is disabled. Cyclic fuel control is disabled at this time due to the occurrence of a large engine transient load change depicted by a change in engine commanded airflow 41 at time t=T2. The reduced airflow output, shown by 41, from device 14 causes a rich transient A/F exhaust gas condition beginning approximately at time t=T3, when gases from the first individual cylinders affected by the transient change enter into manifold 8 and then flow to 10 or 22. Note there's a significant delay before the exhaust A/F change at time T3 resulting from the load transient caused by the commanded airflow change at time t=T2. This delay is due to using a 4-stroke engine cycle that requires almost one engine revolution before a changed fuel injection event or load change can cause affect exhaust A/F conditions and also due to sensor 13 response time characteristics. ECU 7 may use the oxygen sensor 13 synchronization detection method previously explained, based upon prior feedback delays $\theta_O$, to anticipate time delays between a cylinder event fuel change, such as caused by an engine load change, and the associated detected output change occurring in sensor 13.

For explanation purposes, each individual cylinders' fuel injection events are sequentially labeled in FIG. 6 with its cylinder number followed by a dash and then a value indicating the number of engine cycles since t=0. Therefore, the first fuel injection event at t=0 is labeled 1-1 for cylinder 1 in the first engine cycle and subsequent injection events are labeled 2-1, 3-1, 4-1, 1-2, 2-2, 3-2, 4-2, and so on (note for this example the engines' cylinder firing order is chosen, for simplicity, as 1-2-3-4). Odd cylinders are labeled above the indicated fuel quantity depicted by the bar height. Even numbered cylinders are labeled along the time axis for the bar graph labeled INJECTION QUANTITY in FIG. 6 that shows fuel quantity delivered to each cylinder's injector. For example, in this illustration using a 4 cylinder engine there would be a delay of about 360 engine crankshaft degrees between a fuel injection event and the corresponding exhaust gas A/F change at the catalyst's input to 1, 2 or 16. This 360 degree delay may be measured, for purposes of this example, from the time that each individual cylinders' fuel quantity is injected into the intake valve port with the 4 stroke engine cycle used for this example shown in FIG. 6. Therefore, the illustration in FIG. 6 depicts an approximate crankshaft delay of about 2 fuel injection events between the ideal A/F output characteristics 40 and their respective cylinder event causing the exhaust A/F change. This is chosen in order to simplify subsequent explanations. Output voltage from the oxygen sensor 13 shown as solid line labeled 42 has a further delay from the ideal A/F sensor due to its response time characteristics during the specific engine operational conditions, such as longer delays typical during rich to lean than lean to rich conditions. Actual sensor 13 sampling of each individual cylinder exhaust A/F changes is based upon ECU 7 stored values of previously measured sensor feedback delays $\theta_O$ explained before.

FIG. 6 shows rich-lean cyclic fuel control of grouped cylinder fuel injection events (see, for example, description of FIG. 3) being disabled at t=T2 due to a large change in commanded airflow 41 and subsequently causes transient cyclic fuel control (TCFC) also being enabled at time t=T2. TCFC fuel corrections are delivered by ECU 7, for example, as a multiplier value of the engine's total fuel requirements during selected crankshaft angle conditions. Fuel quantity to cylinder 2-3 is reduced from the stoichiometric quantity delivered at the injection events prior to event 1-1 because of a TCFC "probe" fuel correction plus transient open loop fuel corrections caused by the engine load transient changes at time t=T2. TCFC initiates a "probe" fuel change, for example, by decreasing the quantity of fuel injected at the first event when a load change exceeding an ECU 7 stored profile occurs and causes TCFC to be enabled. In the example shown in FIG. 6, the "probe" fuel change is delayed and delivered to event 2-3, versus event 1-3, because the load transient occurring at time t=T2 occurs after the injector for cylinder 1-3 has already injected fuel. Magnitudes of the "probe" fuel change are determined based upon ECU 7 stored multiplier values based on engine parameters such as past and present outputs of sensor 13. TCFC corrections may use multipliers within a range of approximately 0 to 1.3 based upon ECU 7 measured present and past engine parameters of engine operational conditions surrounding transient load changes. There may be an ECU 7 stored control delay and sensor 13 sampling delay, after each prior TCFC fuel quantity correction, before each subsequent TCFC correction value is used so as to insure control stability. The TCFC control and sampling delays, stored in ECU 7 memory, may be based upon calculated crankshaft angle delays and sensor 13 response delays that are adaptively corrected using the oxygen sensor synchronization method explained previously.

Cylinder injection event 1-3 is the first to be partially impacted by the engine transient load change occurring at t=T2 and event 2-3 is affected by the full impact of the transient change. Injection events 1-3 and 3-3 may use only open loop transient fuel corrections that are based upon the detected load condition changes and other past and present ECU 7 control input parameters anticipating rich exhaust A/F, such as airflow changes at 41. Exhaust gases subsequently resulting from injection event 2-3 will be fully impacted by the load transient at t=T2 and enter catalytic converters 10 or 22 from manifold 8 at about the time of injection event 4-3. Amounts of fuel delivered at injection 4-3 is modified by the TCFC correction values based on sensor 13 outputs prior to event 4-3 and by various engine parameters measuring load condition changes. Since sensor 13 output is lean prior to injection event 4-3 the same amount of fuel is used as for prior events 1-3 and 3-3 in this example for illustration purposes. These TCFC and open loop fuel correction values are selected from calibration values stored in ECU 7 memory based upon past and present ECU 7 parameter measurements resulting from the transient load change. Closed loop adaptive transient fuel correction multipliers may be determined, for example, by ECU 7 combining TCFC multipliers with open loop transient fuel corrections. These corrections may also be combined together with the slower changing closed loop feedback fuel control correction values. Slower closed loop feedback control may have its normal feedback control gain values modified when TCFC is enabled so the various fuel corrections may be more readily integrated. Closed loop adaptive transient fuel correction multipliers are adjusted based upon subsequent sensor 13 output changes over time from earlier correction values as explained below.

The following explanation provides a further explanation of various fuel correction values that may be integrated by ECU 7 into a total fuel correction multiplier for the fuel injection quantity shown by FIG. 6. Fuel injection quantity at event 1-4 is reduced further from the initial transient open loop control and TCFC "probe" corrections used at 1-3. An additional "probe" TCFC fuel change is used when sensor 13 still remains rich after the first large "probe" delivered during event 2-3. The earlier fuel corrections immediately after TCFC is enabled at time t=T2, fail to cause toggling of sensor 13 from expected rich conditions. Event 4-3 would have been the first injection event to be allowed by ECU 7 for using another individual cylinder TCFC "probe" fuel quantity change, if sensor 13 output had still been rich. However, A/F conditions at event 4-3 remained lean from prior engine operation partly due to when cyclic fuel control had been previously enabled and so no TCFC multiplier change are made until injector event 1-4. Each TCFC "probe" injection event's occurrence is enabled from a calibration based value determined adaptively by the crankshaft angle delay stored in ECU 7 memory. This adaptive delay is based upon the previously explained 4-stroke cycle characteristics and is approximately 2 injection events in this example. It may sometimes be preferable to use a TCFC correction multiplier of 1.0 when the output of sensor 13 has indicated lean, for longer than a ECU 7 determined time period, following transients typically causing rich engine operation. This may effectively delay TCFC correction multiplier changes to the total closed loop adaptive transient fuel correction multipliers so stability may be improved while allowing larger correction changes to be used for rich sensor 13 output conditions. Therefore, the next TCFC correction change doesn't occur until injection event 1-4 since sensor 13 indicated lean during the period before injection event 4-3 due to actual operational conditions.

FIG. 6 shows TCFC corrections issued, for example, at every third successive injection event based upon selected calibration values and other ECU 7 parameters, such as sensor 13 status. Preferably, TCFC may gradually distribute the total commanded reduction in fuel quantity over multiple injection events when a larger than normal total fuel reduction is commanded by ECU 7 in order to minimize engine torque fluctuations and resulting perceived changes in smoothness. The following explanation gives an example of such a situation. In this descriptive example, event 2-4 becomes the second portion of the total TCFC probe fuel change as discussed above. The remainder of the total TCFC "probe" change, not included at event 1-4 because the TCFC fuel correction multiplier is divided between 2 cylinder events, causes event 2-4 fuel quantity to be reduced so as to minimize perceptible engine output torque fluctuations. Under low engine load conditions it's sometimes possible to make larger reductions of fuel injection quantities without noticeable engine output torque changes. Even after the first "probe" fuel change at event 2-3, the A/F from sensor 13 has shifted rich before time t=T3 and this causes ECU 7 to issue a second TCFC probe by using further step reductions from the fuel quantity reductions delivered at events 1-4 and 2-4. The fuel reduction shown at event 2-4 therefore occurs mainly for maintaining engine smoothness since the "probe" change commanded by ECU 7 at event 1-4 may have been too large for conditions. Since a portion of the "probe" correction was delivered during event 2-4 this results in the next allowed TCFC correction being enabled and occurring at event 1-5.

Typically, when ECU 7 implements a TCFC step change, ECU 7 then waits a predetermined time period until sampling the exhaust gases from previously modified individual cylinders that may then be detectable at sensor 13. Values of this predetermined time period for the sensor 13 sampling delay may be based upon ECU 7 stored values derived from sensor feedback delays $\theta_O$ representing estimated total engine system delays.

Subsequent reductions in injected fuel quantities, shown at events 3-4 and 4-4, are caused by closed loop adaptive transient fuel correction changes resulting when sensor 13 output remains rich. These further reductions are needed, even after all previous open loop transient fuel corrections during events 1-3 to 4-3, since sensor 13 output still indicates rich. These subsequent reductions may be viewed as representing the integral portion of the closed loop adaptive transient fuel correction, for example, as in a typical PID controller configuration. Subsequent integral portions of the fuel correction multiplier may be determined, for example, by the response versus time of sensor 13 to the prior TCFC "probe" and transient open loop correction fuel changes.

The TCFC exhaust gas A/F response, from the TCFC "probe" reduction at injection events 1-4 and 2-4, occurs at the time indicated by dotted line 44 on the ideal A/F response curve 40. The quantity of fuel at 1-5 is further reduced from injection 1-4 event, by using a lower TCFC "probe" correction multiplier, since exhaust gases from the prior TCFC event at 1-4 should be available at sensor 13 output at the time indicated by dotted line 44, but it remains rich. No additional step TCFC fuel reductions are controlled following TCFC event at 1-5, however, since sensor 13 output finally cycles lean shortly after time 44 so any remaining portion of the TCFC "probe" fuel change to be issued at event 2-5 is cancelled. The next TCFC fuel correction occurs at event 4-5 and the TCFC "probe" correction multiplier value is now increased from its value at event 1-5 since sensor 13 toggles lean again as a result of the last TCFC correction. Sensor 13 toggling occurs as a result of both the previous closed loop adaptive transient fuel corrections and the TCFC correction at event 1-5. The TCFC "probe" correction multiplier value is again increased at event 3-6 from 4-5. The TCFC correction multiplier is now greater, to prevent further fuel quantity reductions, so this again increases the total closed loop adaptive transient fuel control correction values stored in ECU 7 memory from events 1-6 and 2-6 since sensor 13 again toggles lean in the interim period.

The function of TCFC "probe" is to continue toggling sensor 13 output until all transient fuel quantity changes go to zero or when, for example, the TCFC enabling period exceeds a ECU 7 selected value based upon detected transient conditions. ECU 7 determines the total dynamic transient fuel correction multiplier values, for example, by using multiple iterations of successive approximations. Stored values within ECU 7 may also be provided for determining the range of TCFC fuel correction multiplier values used when TCFC is initially enabled, based upon sensor 13 response to prior correction values during previous engine load change transients. Values of fuel correction multipliers for the "probe" and subsequent fuel injection events from prior transient load changes may also be stored in ECU 7 to provide more accurate values for the initial estimated correction multipliers based upon adaptive learning of prior exhaust gases' conditions using oxygen sensor feedback. In the TCFC operation example described above, there were intentionally fewer injection events than typical in a transient load change for ease of illustration. Use of adaptive learning, based upon sensor 13 and 21 feedback following prior transient load changes with similar operational conditions, reduces the number of TCFC compensated injection events. Typically 25 to 100, or sometimes more, cylinder injection events may be modified by TCFC corrections during many typical transient load changes. The unique approach of using TCFC to control large, momentary changes in individual cylinder fuel injection events by monitoring oxygen sensor feedback from their respective individual synchronized cylinder's exhaust A/F events differentiates this method from others.

Use of TCFC during engine load transients causing lean exhaust gas A/F conditions requires slight adaptations in the method used to cause sensor 13 toggling about stoichiometric. TCFC corrections used during engine transients, resulting from increases in engine loading, may require different control methods than during engine load reduction transients for a number of the following reasons. Increases in cylinder pressure while the intake valve is open, and when fuel injection has already occurred, can cause lean operation. Typically, most fuel control systems known to one skilled in the art inject fuel asynchronously, when an increase in throttle position occurs, to provide additional fuel for partially resolving lean operation in the above example from increased engine load. TCFC may be used to control these additional asynchronous fuel injector's opening time periods following engine load increases, by detecting the magnitude of the lean A/F transient using rich "probe" fuel changes to individual cylinders as discussed before.

TCFC can be used to determine both synchronous and asynchronous fuel requirements for subsequent cylinders' exhaust gases A/F conditions that oxygen sensor 13 can possibly detect. For example, if there were to have been an increase in engine load change in FIG. 6 at time t=T2, injector event 4-3 would be the first possible cylinder that sensor 13 output could provide detectable A/F feedback reflecting the increased load change. This is the first cylinder detectable by sensor 13 output changes from the prior load change. There's a delay in sensor 13 output changes due to sensor feedback delays $\theta_O$ including delays resulting from the 4-stroke engine cycle. Asynchronous and synchronous injector events 1-3 to 3-3 could use adaptive transient fuel corrections stored in ECU 7 memory from prior engine load changes with similar operational conditions. This would provide an improvement over use of asynchronous fuel injections to all cylinders for enrichment during periods of a load increase. Asynchronous fuel injections used for enrichment are typically based upon driver or operator commanded throttle pedal changes. This is typically a matter of necessity due to response delays in load sensor 9 outputs that prevents instantaneous detection of rapid load changes and also since intake valves may close before sufficient fuel can reach some cylinders.

TCFC may also be used to return air-fuel towards stoichiometric conditions quickly when such asynchronous enrichment causes sensor 13 rich saturation after an engine load increase. ECU 7 then stores corrections for subsequent events having similar load condition changes to reduce over enrichment. Another method of partially compensating for fuel deficiencies in the first few cylinder's after a sudden load increase is to delay operator or driver demanded airflow changes using device 14. ECU 7 can estimate the required fuel enrichment for the driver demanded engine airflow increase by estimating the associated future engine load change needed to satisfy this demand and inject the appropriate fuel quantity to account for the upcoming load increase, before activating device 14. Since this delay needs to be only a few cylinder events, it's only slightly detectable by the driver since these cylinders now develop greater torque output from the added fuel before device 14 actually increases airflow. A similar method can be used for load decreases resulting from a driver demanded engine airflow decrease by reducing fuel flow to the appropriate cylinders before device 14 reaches the new reduced level of commanded airflow. ECU 7 can halt or delay incipient fuel injection events until updated fuel quantities can be determined based upon imminent airflow changes needed for decreases in a driver's engine power demands.

For engine fuel systems that do not use an in-cylinder fuel injection system, there may be some other ways to compensate for such lean exhaust gas A/F transients without decreasing fuel economy. An in-cylinder fuel injection system can add more fuel into the cylinder even after the closing of the intake valve and thus subsequently reduces magnitudes of lean transient A/F conditions at the catalyst. Adding fuel to successive cylinder fuel injection events can also partly compensate for such lean exhaust gas A/F transients by returning the catalyst's operation to stoichiometric more quickly. However, any added fuel is wasted from a fuel consumption standpoint since it will not eliminate the associated transient engine power loss caused during the prior lean operation. For these reasons, and since sensor 13 switching delay increases when its output is saturated rich, magnitude changes of TCFC correction values are preferably selected to be smaller than those used during changes associated with reductions in engine load. This result in a less aggressive A/F compensation during increased engine load changes due to the catalyst's oxygen storage characteristics. A catalyst is more tolerant to fuel correction errors on the lean side when applying more aggressive TCFC correction magnitudes during rich, exhaust gas A/F load transients because of its oxygen storage capability. However, the converse isn't always true when erring on the rich side. Therefore other compensation methods, for load changes detected by sensor 9 increases causing lean A/F transients, should preferably first use methods described above. One such method, for example, may be delaying device 14 actuation momentarily until correct fuel quantities can be delivered to the first cylinders affected by an imminent load increase. ECU 7 may store airflow change characteristics for device 14, during certain conditions where an imminent engine load increase, so fuel quantity corrections can be made prior to controlling an actual airflow change.

Transient fuel control is dependent on measured values of feedback delays $\theta_O$ described before to allow rapid control corrections by measuring individual cylinder A/F changes with sensor 13 immediately after a load 9 change. ECU 7 can obtain this delay period by, for example, measuring the period between the cylinder combustion associated with injection event 1-1 and the dotted time line labeled 43 when sensor 13 output shifts rich resulting from cyclic fuel control being enabled as illustrated in FIG. 6. Sensor 13 output's shift rich, resulting from cyclic fuel control being enabled at time t=0, is labeled 1-1' in FIG. 6 for illustration. Preferably, the second or later lean-rich transition after enabling cyclic fuel control should be used to monitor sensor 13 output in order to minimize sensitivity from prior occurring, normal A/F fluctuations. The number of cylinders selected to be in the groupings of rich and lean controlled cylinders may also be preferably chosen to provide a stabilized response change of sensor 13, without effects from remaining transient conditions in manifold 8 due to prior conditions. Measured system-sensor 13 response delays, from the TDC compression defined reference point, for each individual cylinder having the commanded lean-rich A/F transition may then be stored in ECU 7 memory. These values may be stored versus appropriate engine parameters for use during future ECU 7 fuel control changes.

Alternately, identifying of the time for each individual engine cylinders' fuel changes causing subsequent changes in exhaust gases' conditions can be accomplished by causing a sequence of at least two transitions in oxygen sensor output conditions. The first transition in oxygen sensor output conditions is preferably caused by enabling controlled changes in fuel quantity to at least one selected grouping of cylinders that result in exhaust gas conditions to be leaner than stoichiometric. Controlling gas conditions to be significantly leaner than stoichiometric, such that no further sensor 13 output changes occur during the monitoring time period when sensor feedback delays $\theta_O$ values are being determined, is preferable to improve measurement accuracy. The second transition in oxygen sensor output conditions may then be caused by enabling a second controlled changes in fuel quantity to a grouping of cylinders that result in exhaust gas conditions to be slightly richer than normal stoichiometric A/F fluctuations. The measured time delay determining sensor feedback delays $\theta_O$ is then the time difference, between the time when the exhaust valve of the first cylinder operated richer than stoichiometric opens into manifold 8, and the time when sensor 13 output changes to indicate rich. This measured time delay then provides an input value to ECU 7 that can be used to calculate the total sensor feedback delays $\theta_O$. based upon dynamic exhaust valve timing control characteristics from device 25 when variable valve timing is used. This time delay may be relative to the defined TDC reference point when used for determining crankshaft angle delays. Synchronizing injector 15 operation with actual exhaust gas A/F changes causing sensor 13 output signal changes improves control stability. Synchronization also provide a form of closed loop control system feedback lag compensation while providing methods for reduced cylinder to cylinder variations from the stoichiometric control point by providing individual injector quantity compensation. Alternatively, a wide range or linear type oxygen sensor could also be used to detect the rich-lean A/F transitions caused by cyclic fuel control to synchronize sensor 13 sampling for changes resulting from the respective individual cylinder events.

Synchronization is also advantageous to provide compensation for steady state closed loop control A/F fluctuations caused by individual cylinders. Closed loop control A/F fluctuations from the stoichiometric control point caused, for example, by individual injector 15 flow variations from factors such as degradation and manufacturing tolerances, can thus be reduced to improve catalytic converter efficiency. ECU 7 may determine the required change for individual cylinders, not operating at stoichiometric conditions, during steady state closed loop fuel control by use of sensor 13 synchronization method described above. This is accomplished by ECU 7 sampling sensor 13 output for each individual cylinder after the appropriate sensing delay. This delay is based upon stored values of sensor feedback delays $\theta_O$ for present engine conditions. Depending on sensor 13 output at this sampled time period, individual cylinder fuel flow correction multipliers for the associated engine operational conditions, such as from speed sensor 11 and load sensor 9, are stored in ECU 7 memory. These corrections may be stored in memory as, for example, in a multidimensional table, for subsequent fuel injection events of the specified cylinder. Revised individual fuel corrections may be determined, for example, using multiple iterations of successive approximations by varying, for example, the magnitude of the closed loop fuel control proportional fuel step change used for each individual cylinder. This proportional step is modified as necessary to cause sensor 13 toggling about stoichiometric during normal closed loop fuel control for each individual cylinder when engine conditions are sufficiently stable.

As is known to one skilled in the art, this proportional step is typically controlled only to cause an oxygen sensor toggling about a defined control point as a result of sensor output changes caused by all cylinder exhaust gases' events. This differs from a method when using individual cylinder closed loop fuel control based upon sensor 13 synchronization. During individual cylinder closed loop fuel control ECU 7 may cause oxygen sensor 13 toggling, or output state changes, for each cylinder's exhaust gases. These sensor 13 output state changes also include those A/F conditions resulting from the most recent and previous combustion events. Exhaust gases' conditions may be cycled between rich and lean stoichiometric conditions, among the most recent and previous combustion events, by having different ECU 7 controlled fuel injection quantities. Sensor 13 output change toggling may therefore be controlled by appropriate ECU 7 selection of closed loop proportional steps having different fuel quantities between different cylinders as well as between each cylinder's prior and most recent combustion events. This may allow determination of the minimum change in fuel quantity for each individual cylinder during many stoichiometric conditions. The result of ECU 7 modifying the proportional step for each cylinder may be to provide a higher toggling frequency of the oxygen sensor 13 output under certain engine operational conditions. ECU 7 determines the minimum fuel change in fuel quantity needed to cause a change in oxygen sensor output for a specified cylinder between present and prior combustion cycles. ECU 7 then compares these associated minimum fuel changes needed for all other individual cylinders, for example during stoichiometric conditions, and stores a fuel quantity offset for each individual cylinder after adjusting all cylinders' offsets such that at least one cylinder has a zero offset. These ECU 7 determined fuel changes for each individual cylinder, based upon synchronizing sensor 13 response to prior correction values, are then stored, for example, as a fuel rate correction multiplier or quantity offset, in ECU 7 memory. These individual offsets are stored for various future ECU 7 control operations and are continuously updated when conditions allow. As is apparent to one skilled in the art, the above method of compensating for individual cylinder fuel variations detected at the oxygen sensor's output could also be performed at any defined A/F control point. This can be accomplished by the use of a linear or wide range type oxygen sensor and such modifications are included in the scope of invention.

In another embodiment, sensor 13 and/or 21 could be a wide range type oxygen sensor providing a linear output of the exhaust gas A/F ratio and provide a measurement to ECU 7 for controlling the magnitude of the TCFC and closed loop adaptive transient fuel correction multipliers. This may provide more rapid compensation of transient A/F disturbances and return the exhaust gas condition to stoichiometric operation more quickly than when using a switching type oxygen sensor in some conditions. Exhaust gas A/F would return to stoichiometric in a shorter time period due to fewer approximations being required compared to performing successive TCFC correction approximations when using of a switching type oxygen sensor. Use of wide range or linear oxygen sensors (UEGO) for 13 or 21 would also allow controlling aggregate A/F ratio of an engine's cylinder's cycling between rich and lean at almost any defined A/F control point versus just stoichiometric. Wide range oxygen sensors are significantly more costly and may not always provide sufficient advantages over switching type sensors for fully justifying their added cost. Other methods, using devices other than wide range or linear oxygen sensors such as gas sensors, that also provide some form of direct indications of exhaust gas A/F conditions, may also be employed to improve transient A/F compensation. Such alternatives to one skilled in the art, for providing feedback to TCFC correction by detecting other engine parameters, such as cylinder pressure or spark plug ionization current, by using other indications of exhaust gas A/F change are included in the scope of this invention.

The sixth objective of this invention is to illustrate various embodiments of control method improvements and engine hardware changes that further increase the capabilities of the prior objectives. While various engine hardware changes may be more costly to implement, typically, they may also provide additional advantages for the diagnosis and engine control methods described in this invention. It is therefore beneficial to more completely describe various engine hardware changes that can expand the potential benefits derived from the present invention.

In a further embodiment of the invention shown as in FIG. 7, the engine system may have an in-cylinder fuel injection system and use wide range or linear oxygen sensors at 13 and/or 21. FIG. 7 includes exhaust gas sensors 23 and/or 24 to directly monitor concentrations of hydrocarbon gases (HC) or nitrogen oxide gases (NOx) for such functions as, for example, improving identification of catalyst efficiency and for detecting initiation of exothermic catalyst reactions. Further, an in-cylinder fuel injection system, alternately called direct gasoline injection, may be included to provide an expanded range for lean engine operation to both reduce fuel consumption and expand the allowed range of exhaust gas air-fuel ratio cycling without concern for engine misfiring, especially during cold engine operation. An in-cylinder fuel injection system can improve the control range of allowed exhaust A/F ratios without incipient misfire. This engine design improvement allows an extended fuel control range for exhaust A/F ratios, without incipient misfire. Lean side deviations exceeding 50% or more from stoichiometric operation are possible and therefore significantly increase the concentrations of oxygen in exhaust gas for greatly increasing potential rates of catalyst heating. Range of lean engine operation can be extended to more than 40 A/F without misfire by the use of in-cylinder injection systems, thereby significantly increasing the available oxygen levels to the catalyst when rich-lean cyclic fuel control is enabled. Such systems allow lean engine operation almost immediately following cold engine starting and can provide rapid catalyst heating by controlling selected engine cylinders to operate rich, typically by causing, for example, a secondary fuel injection late in the cylinder's combustion event.

Expanded lean cylinder operation without misfire may provide greater engine control flexibility and range of engine operating conditions where cyclic fuel control methods can be used more effectively. During rich exhaust gas transients, such as after engine load reductions, greater concentrations of oxygen can be delivered to the catalyst sooner by using lower TCFC correction multipliers to individual cylinders. These leaner TCFC corrections can also be used at higher engine load levels since potential of engine misfiring is significantly reduced due to in-cylinder injection system's greater lean A/F range. A wider range of rich-lean cylinder groupings is also possible due to expanded lean misfire limits, such as allowing more flexibility in adjusting A/F cycling frequency and improving perceived engine smoothness. Fewer cylinders need to be operated lean during rich-lean cyclic fuel control due to the expanded engine operational range without lean misfire allowing more flexibility for adjusting frequency of rich-lean cycling away from body structure resonant points.

Figure 8A:
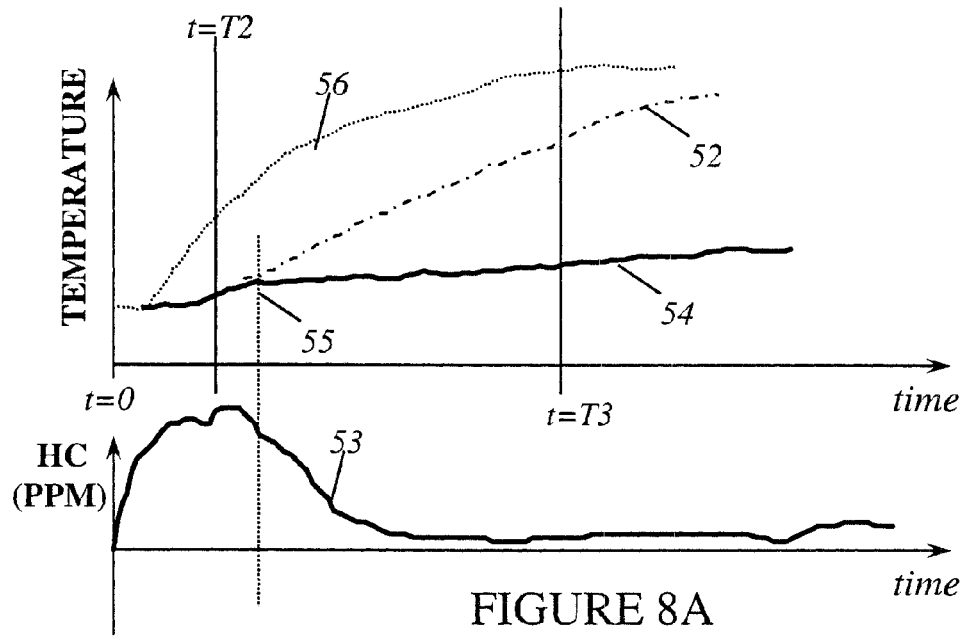
FIG. 8A shows an engine's catalyst temperature characteristics versus the output of a HC gas sensor used to detect onset of catalyst chemical exothermic heating shortly after a cold start, according to one preferred embodiment of the present invention.

Actively detecting initiation of exothermic chemical reactions prevents activating fuel changes for catalyst heating too early before the catalyst has reached sufficient temperatures. Gas sensors with the capability of detecting changes in concentrations of HC or NO gases, occurring as the catalyst's conversion efficiency increases after a cold engine start, can also be used to detect or confirm initiation of exothermic activity. Gas sensor 23 and/or 24 may also provide additional inputs to ECU 7 for making more accurate assessments of overall catalytic converter condition. FIG. 8A illustrates how using a HC gas sensor at location 23 allows detection of initiation of catalyst chemical exothermic heating shortly after cold engine starting during stable, idle conditions. FIG. 8A shows comparisons of the catalyst temperature sensor 5 output shown in curve 52 with the curve 53 showing HC sensor 23 hydrocarbon gases' concentrations' output. These changes occur from exhaust gases' conditions entering catalyst element 1. FIG. 8A shows all characteristics described versus time after the engine is cold started at time t=0. Also in FIG. 8A, curve 56 shows temperatures of catalyst inlet exhaust gases from manifold 8 entering into catalyst 1. Curve 54 in FIG. 8A depicts a malfunctioning catalyst temperature characteristics from sensor 5 compared to a good catalyst's temperature response shown in curve 52. Curve 52 has a lower rate of temperature rise from sensor 5 output until a time labeled 55 when an increased rate of heating occurs as shown by its divergence from curve 54 and indicates initiation of catalyst exothermic heating. Shortly prior to time 55 there is sudden decrease in the detected levels of HC from sensor 23, as shown by curve 53 in FIG. 8A, when the catalyst first becomes chemically active after warming from hot exhaust gases.

ECU 7 may first determine conditions indicating initiation of catalyst 1 exothermic heating, for example, by detecting catalyst temperatures when a sudden decrease in HC levels from sensor 23 occurs. ECU 7 may then store these associated temperature conditions for catalyst activation in ECU 7 memory for subsequent engine starts so that conditions for starting of catalyst exothermic heating may be more clearly defined. The HC gases' concentration decrease occurring when the catalyst becomes chemically active may happen before significant changes in temperature characteristics are detected by sensor 5 due to time lagging effects caused from both the sensor 5 and the catalyst's thermal mass. HC concentration from sensor 23 may then be a leading indicator for catalyst exothermic heating activation. Due to the relationship between catalyst temperature characteristics from sensor 5 and HC sensor 23 changes, catalyst temperature can be used in subsequent engine starts to determine the approximate time and temperature when catalyst activation occurs. This information can be used to improve accuracy of temperature modeling algorithms that may be used to estimate exhaust temperature conditions caused, for example, by varying engine speed and load conditions after an engine cold start. ECU 7 may also subsequently use catalyst temperature characteristic data from sensor 5 and/or 19 to confirm actual initiation of catalyst chemical activation.

It may therefore be advantageous to store these catalyst temperature characteristics form sensor 5, such as first and second derivatives versus time, in ECU 7 memory when catalyst chemical activation is detected by HC sensor 23 for future engine starts. ECU 7 may also store related engine parameter conditions detected when catalyst activation is detected from sensor 23 such as, total engine run time vs. cold start temperatures before catalyst activation and the corresponding catalyst temperature characteristics at activation. These ECU 7 stored values indicating catalyst activation from prior cold start conditions may then be used to allow more precise detection of subsequent catalyst activation and also provides earlier enabling of engine control changes to speed catalyst heating.

Figure 8B:
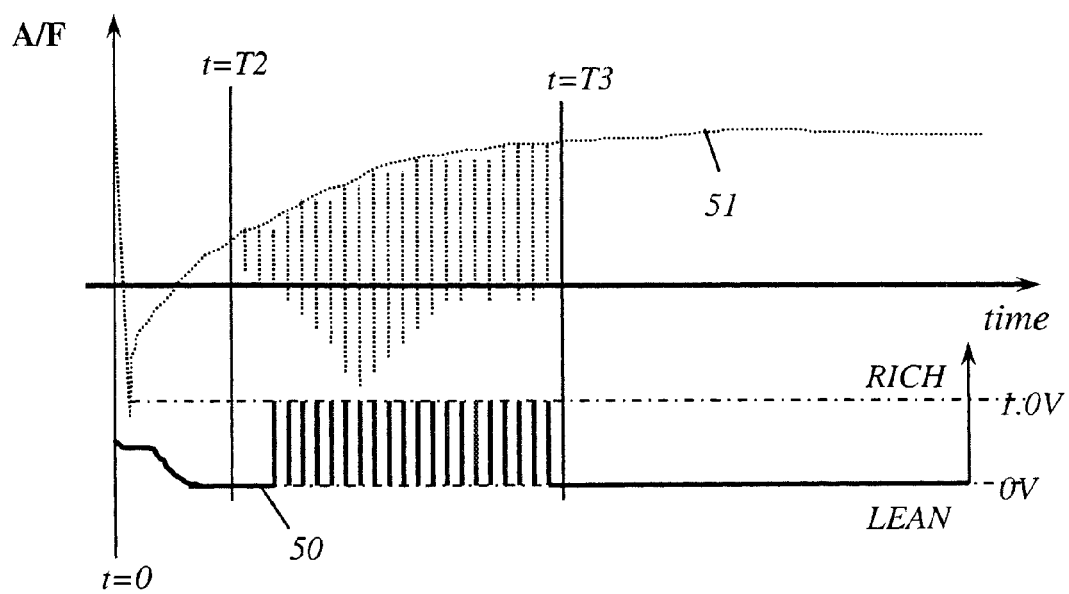
FIG. 8B shows an engine's cold start exhaust A/F ratio characteristics during idle conditions shown in the dotted line versus corresponding switching oxygen sensor output using an alternative embodiment having an in-cylinder fuel injection system together with the disclosed invention. This illustration shows use of a lean A/F during open loop fuel control with A/F cycling enabled when catalyst exothermic reactions are sustainable, according to one preferred embodiment of the present invention.

FIG. 8B illustrates the A/F ratio control characteristics of an engine having an in-cylinder fuel injection system. This system allows lean engine operation shortly after cold engine starting. Curve 51 shown in FIG. 8B illustrates how A/F conditions entering, for example, catalyst 1 can be changed earlier than catalyst activation, based upon previous ECU 7 stored conditions from catalyst activation during prior cold starts, after enabling cyclic fuel control. ECU 7 enables cyclic fuel control at time t=T2 using reduced magnitudes of A/F cycling based upon previously detected conditions of the catalytic converter's overall conversion capabilities during prior engine cold start events. Status of the catalyst's condition is previously determined using catalytic converter diagnostic methods already described. Reduced magnitudes of cyclic fuel control may be used at time t=T2 and then increased as ECU 7 detects confirmatory indications of catalyst exothermic heating from sensor 5 and/or 19 temperature characteristics. The resulting A/F ratio cycling of the gases entering catalyst 1 is shown fluctuating about stoichiometric conditions in curve 51 to increase the concentrations of oxygen and CO in the exhaust gases entering the catalyst and speed heating. When A/F ratio conditions begin fluctuating about stoichiometric conditions, as shown in curve 51, due to increased magnitudes of rich A/F cylinder changes shortly after time t=T2 in FIG. 8B, the switching oxygen sensor output from sensor 13 begins toggling from predominantly lean A/F conditions. Cyclic fuel control A/F ratio cycling may then be disabled by ECU 7 at time t=T3 after catalyst temperatures from sensor 5 indicate conditions of maximum catalytic converter conversion efficiency.

Gas sensor reliability and accuracy, under a wide range of engine operational conditions, remains unproven and requires methods to diagnose their proper function. ECU 7 can provide methods to confirm proper gas sensor functioning by use of methods disclosed below. ECU 7 can compare a gas sensor's output from sensors 23 and/or 24 when it detects the onset of catalyst exothermic heating based upon outputs of, for example, temperature sensor 5 and/or 19 following an engine cold start. ECU 7 may then monitor for associated large reductions in concentrations of, for example, HC or NO gases from sensor 23 and/or 24 that also occur with catalyst chemical activation to verify proper sensor operation. A malfunction can be indicated in the event that output change characteristics from gas sensor's at 23 and/or 24 does not correlate with previously determined characteristics stored in ECU 7 memory, such as from catalyst temperature diagnostic assessments and detection of initiation of catalyst exothermic heating. Early toggling of sensors 13 and/or 21 during rich cold start conditions provide additional data inputs to aid diagnosis of gas sensors 23 and/or 24 during enabling of cyclic fuel control for catalyst heating. ECU 7 can compare both the measured temperature characteristics from 5, 19 or 26 and early toggling 13 or 21 characteristics indicating initiation of catalyst exothermic heating for more accurately assessing proper operation of gas sensors 23 or 24 during controlled operating conditions.

Gas sensors located at 23 and/or 24 in FIG. 7 also improve the capability for ECU 7 to diagnose catalytic converter malfunctioning and improve engine control to reduce total air pollutants. Sensors 23 and/or 24 can provide direct measurements of exhaust concentrations of HC or $NO_x$ gases and directly indicate catalytic converter malfunctions. However, a gas sensor's detection range and resolution needed to perform direct detection of failed catalysts or malfunctioning engine emission control systems presently may need to be improved further for more widespread application. Significant reductions in cost of gas sensors may also be required before their use can become widespread. Gas sensor performance may be verified by comparison to sensor 5 catalyst temperature characteristics for providing a method of diagnosing both sensors' proper operation.

It may be advantageous to confirm proper gas sensor functioning by using ECU 7 to compare sensor 23 and/or 24 outputs to other sensors' characteristic during specified conditions, for example, after a cold engine start. For example, sensor 5 outputs can be used as one method to determine initiation of catalyst heating after cold starting while using sensors 13 and/or 21 to confirm these conditions. Such comparison methods can be employed during the interim period before improved gas sensors become available. Discrepancies in detecting onset of catalyst activation as determined by sensor 23 and sensor 5 cause ECU 7 to indicate a potential fault diagnostic condition. When ECU 7 identifies a potential fault diagnostic condition, additional past and present engine parameter measurements, such as from oxygen sensors 13 and 21, are used to identify the root cause of any discrepancies detected between sensor 23 and sensor 5.

Many of the methods described in the previous embodiment using an in-cylinder fuel injection system can also be attained in engines using other fuel injection systems, such as intake port injection systems, albeit with limitations under certain conditions. Foregoing descriptions are provided to indicate the additional engine control algorithms, such as improved A/F control, diagnosis and catalyst heating, made possible by control of an individual cylinder's exhaust gas concentration as disclosed in this invention. Total air pollutants produced during the vehicle's lifetime can be significantly reduced by taking advantages of the synergies between a catalytic converter's toxic gas conversion capacity and improved control of an individual cylinder's exhaust gases' concentrations.

Rather than by controlling an individual cylinder to operate lean using fuel control, alternate engine hardware configurations may also be designed to provide another method to allow oxygen into manifold 8. In another embodiment, engine 6 in FIG. 7 can have a pump providing pressurized intake air into the cylinder to be above pressures in manifold 8 and may also be equipped with a fast acting electronic valve control system. This electronic valve system 25 would control gases into and out of each cylinder and into manifold 8 plus have the capability to allow both valves to be opened simultaneously. Preferably, this electronic valve control system would have capability to provide variable valve lift to the engine cylinder's intake and exhaust valves for controlling airflow to individual cylinders based upon operator's power demands. This variable valve lift system may thus eliminate the throttle valve controlling airflow into the intake manifold 27 and subsequently into individual cylinders.

Excess oxygen may then be provided to the catalyst by this electronic valve system by controlling both intake and exhaust valves to be opened simultaneously, for example, near the end of the engine's exhaust cycle. Then the pump device providing positive pressure over exhaust manifold 8 conditions, such as a supercharger, induces airflow into the cylinder. Actual cylinder airflow levels may then be based upon the ECU 7 controlled intake and exhaust valve opening periods thereby allowing oxygen from the pressurized intake air source to flow directly into manifold 8. Normal engine operation could be maintained during lower load conditions with such configuration, because of the reduced time needed to fill individual cylinders from the pressurized air source, while using significantly delayed intake valve opening timing. Such a method of providing oxygen to manifold 8 may be used in conjunction with most of the methods disclosed in this invention. Use of fast acting electronic valve system for providing oxygen to manifold 8 may also be used during catalyst heating shortly after engine cold starting, for providing oxygen to the catalyst during rich A/F transients and to heat the catalyst for diagnosing its conversion efficiency characteristics. Various similar modifications to the engine system known to one skilled in the art to provide equivalent exhaust gases concentration changes may also be made for providing the methods disclosed herein without departing from the inventive concepts thereof.

In other embodiments for monitoring catalyst efficiency, the system may, for example, determine how quickly the catalyst temperature increases to a calibrated threshold above an initial temperature after enabling cycling fuel control for catalyst heating or determine the rate of change in catalyst temperature over time. Monitoring the catalyst's subsequent temperature decrease, after disabling cyclic fuel control, may be done by ECU 7 to confirm the catalyst temperature's return to values near those prior to enabling cyclic fuel control, for example, to verify stable engine conditions that have indeed remained unchanged. Monitoring the catalyst's subsequent temperature decrease, after disabling cyclic fuel control, may also be done determine catalyst malfunctioning and/or also confirm increased temperatures when rich-lean air-fuel cycling is enabled.

As is apparent to one skilled in the art from reading the specification, the present invention is not limited to the above embodiments but may be modified and changed in various respects without departing from the scope or spirit of the invention. For example, two or more standard temperature sensor may be used, rather than one standard temperature sensor. Further, the cyclic fuel control could be provided by another computer rather than an ECU 7 such as a body computer. The engine may be a 4 cylinder, 6 cylinder, or more cylinder engine and have configurations such as an opposed, "V-type" or straight cylinder arrangement. Another embodiment may include a catalyst integrated into the ports of manifold 8 or the cylinder head rather than being only included in a catalytic converter. Finally, the invention could be applied to various fuel injection systems such as an in-cylinder fuel injection or dual port injector system. Thus, the invention is intended to cover alternatives, modifications, and equivalents, which may be included within the spirit and scope of the invention as defined by the claims.

All publications, patents, and patent applications cited herein are hereby incorporated by reference in their entirety for all purposes.

What is claimed is:

1. A method of synchronizing individual engine cylinder fuel changes to their respective changes in exhaust gases, including the steps of:
  correlating controlled fuel changes between individual injectors with an electronic control unit and subsequently detecting with a sensor and determining with the electronic control unit an exhaust A/F ratio changes greater than normal A/F ratio variations; and
  determining and storing in memory a time delay determined from a time difference between causing the fuel change and the detected exhaust A/F ratio changes.

2. A method according to claim 1, further comprising the step of:
  determining an oxygen sensor time response characteristics for assessing proper operating condition of the oxygen sensor using the time delay period stored in memory.

3. A method according to claim 1, further comprising the step of:
  detecting exhaust gases' conditions with an oxygen sensor;
  detecting at least one engine parameter sufficient to determine stable exhaust gases' conditions for monitoring during a first time period;
  causing a sequence of changes in fuel quantity to at least one selected grouping of cylinders, during a second time period, differing from the fuel quantity in said first time period, so as to produce a change in exhaust gases' A/F conditions differing from the exhaust gases' conditions detected during the first time period;
  monitoring a time period, from a selected reference point, for the time of the first change in said A/F conditions that are caused by said changes in fuel quantity during said second time period; and
  storing in memory the monitored time period from the selected reference point.

4. A method according to claim 3, whereby the oxygen sensor detecting exhaust gases' conditions is a switching sensor having two discrete output voltage characteristics for conditions richer and leaner than stoichiometric.

5. A method according to claim 1, further including the steps of:
  detecting exhaust gases' conditions with a switching oxygen sensor;
  detecting at least one engine parameter sufficient to determine stable engine operational conditions during;
  sampling the switching oxygen sensor output during a first period, at a time determined by the initial presence of a selected individual cylinder's exhaust gases;
  causing a minimum change in fuel quantity into selected individual cylinder sufficient to produce a change in the switching oxygen sensor output, from the selected individual cylinder's exhaust gases' conditions sampled in the first time period, during a second period;

comparing the minimum change in fuel quantity causing the change in the switching oxygen sensor output for the selected individual cylinder to associated minimums of all other individual cylinders during stoichiometric conditions; and establishing a fuel quantity offset for each individual cylinder by adjusting all cylinders' offsets such that at least one cylinder has a zero offset.

6. A method according to claim 1, further including the steps of:

detecting, during a first time period, transient engine load condition changes that may subsequently cause exhaust gases' air-fuel ratio to deviate from a defined control point;

causing a change in fuel quantities to one or more selected individual engine cylinders, differing from quantities in the first time period, during a second time period for adjusting for the effects of the transient engine load condition changes;

measuring effects of the one or more selected individual engine cylinders' exhaust gases' conditions resulting from the changes in fuel quantities, by sampling during predetermined time periods, during said second time period; and making modifications in fuel quantities supplied to another selection of one or more selected individual cylinders, after measuring the one or more individual cylinders' exhaust gases' conditions that result from the prior changes in fuel quantities to the one or more selected individual cylinders, so as to cause air-fuel ratio fluctuations about the defined control point.

7. A method according to claim 6, further including the steps of:

providing selected individual cylinder injection probe events, after a predefined number of normal fuel injection events, to have corrections in magnitudes of fuel quantity to counteract effects of load changes; and adjusting the corrections in magnitudes of fuel quantity to selected individual cylinders, based upon oxygen sensor feedback of exhaust gases' conditions resulting from prior said probe events by said sensor sampling at predetermined times so as to cause the exhaust gases' conditions to cycle about a defined control point at an earlier time following the load change.

8. A method of individual cylinder fuel control compensating for transient engine load changes, including the steps of:

providing an internal combustion engine, an exhaust system, and an engine control system, the engine control system including an engine control unit, an oxygen sensor, and a one or more fuel injector(s), for completing and including the steps of:

monitoring engine exhaust gases with the oxygen sensor;

detecting conditions with the engine control unit indicating a load change and enabling individual cylinder fuel control;

enabling a change in fuel quantity to at least one selected individual cylinder with the one or more fuel injector(s), to produce a change in exhaust gases' A/F conditions that adjusts for effects of the load change;

detecting exhaust gases' conditions resulting from each individual cylinders' said change in fuel quantity by sampling at predetermined times; and controlling subsequent changes in cylinder's fuel quantity with the engine control unit and one or more fuel injector (s), such changes depending on effects that each previous said change in fuel quantities has on subsequent exhaust gases' A/F conditions detected for each individual cylinders' combustion event, for cycling of gases' A/F about a defined control point and compensate exhaust gases' A/F conditions for said load changes.

9. A method according to claim 8, whereby the change in cylinder's fuel quantity is implemented gradually by transitioning the controlled fuel changes into individual cylinders over a number of cylinder firing events to minimize perceived changes in engine smoothness caused by step changes in engine cylinders' torque levels.

10. A method according to claim 8, whereby said cycling of gases' A/F about a defined control point provides conditions for determining dynamic catalyst oxygen storage characteristics during non-stoichiometric conditions for modifying subsequent fuel changes into the individual cylinders for more quickly reaching the defined control point.

11. A method according to claim 8, wherein the changes in fuel quantity are determined using stored correction values based upon oxygen sensor feedback during prior engine load changes of similar characteristics, such said feedback from subsequent prior combustion events having said fuel quantity causing said cycling of gases' A/F about a defined control point.

12. A method according to claim 8, whereby said oxygen sensor is a wide range linear type device allowing more rapid correction of measured exhaust gases' A/F ratio deviations from defined control points.

13. A method of early cycling an oxygen sensor's output, during non-stoichiometric transient engine load change conditions, including the steps of:

providing an internal combustion engine, an exhaust system, and an engine control system, the engine control system including an engine control unit, an oxygen sensor, and a one or more fuel injector(s), for completing and including the steps of:

causing estimated fuel changes into selected individual cylinders with the one or more fuel injector(s) by the engine control unit; and modifying subsequently said estimated fuel changes into selected individual cylinders with the one or more fuel injector(s) by the engine control unit using a successive approximation approach based upon feedback determined by sampling the oxygen sensor's output during predetermined time periods.

14. A method according to claim 13, further including the step of:

controlling fuel quantities, for selected individual cylinders, based upon monitoring exhaust gases' A/F conditions at predetermined times, in order to determine necessary fuel quantity corrections for subsequent selected individual cylinders' combustion events that will result in cycling of catalyst inlet gases' A/F about a defined control point.

15. The method according to claim 14, further comprising the step of:

providing excess oxygen into catalytic converter inlet gases', which includes the steps of:

providing an electronic valve control system; and controlling with the electronic valve system both an intake valve and an exhaust valve of an engine to be opened simultaneously when pressure conditions in an intake manifold exceed those in an exhaust manifold of the engine.

16. A method according to 15, whereby said providing excess oxygen into the inlet gases of a catalytic converter produces catalyst heating by causing at least one engine cylinder's exhaust gases to be controlled richer than stoichiometric conditions.

17. The method according to claim 13, further comprising the step of:
synchronizing individual engine cylinder fuel changes to subsequent changes in exhaust gases' air/fuel conditions which includes:
detecting exhaust gases' conditions with a switching oxygen sensor;
detecting at least one engine parameter sufficient to determine stable exhaust gases' conditions for monitoring;
determining oxygen sensor conditions during a first time period;
causing a sequence of at least a first change in fuel quantity to at least one selected grouping of engine cylinders, said first change in quantity differing from a quantity present in said first time period, so as to produce at least one transition in oxygen sensor output conditions differing from said conditions detected during said first time period;
monitoring a time period from determining the time of a first transition in said oxygen sensor conditions that are caused by said changes in fuel quantity during said second time period; and
storing in memory said monitored time period.

18. A method according to claim 17, whereby additional recordings of said measured time are measured by causing a sequence of said transitions in oxygen sensor output conditions so as to determine a more accurate average for a value of said time period that can be stored in memory.

19. The method according to claim 13, further comprising the step of:
identifying an individual cylinders' oxygen sensor's response time, when an individual engine cylinders' fuel changes cause subsequent changes in exhaust gases' conditions, including the steps of:
causing a sequence of at least two transitions in said oxygen sensor's output conditions by enabling controlled changes in fuel quantity to at least one selected grouping of cylinders; and
measuring a time difference between the first individual cylinder having the second enabling controlled change in fuel quantity and a time of a second transition in oxygen sensor output conditions.

20. The method according to claim 13, further comprising the step of:
controlling individual cylinder fuel control, including the steps of:
compensating for transient engine load changes by delivering estimated fuel quantities into selected individual cylinders; and
modifying said estimated fuel quantities by monitoring subsequent exhaust gases' A/F conditions detected for the selected individual cylinders' combustion event at predetermined times, until said exhaust gases' A/F conditions fluctuate about a defined control point.

\* \* \* \* \*